United States Patent [19]
Janssen

[11] Patent Number: 6,098,062
[45] Date of Patent: Aug. 1, 2000

[54] ARGUMENT STRUCTURE HIERARCHY SYSTEM AND METHOD FOR FACILITATING ANALYSIS AND DECISION-MAKING PROCESSES

[76] Inventor: Terry Janssen, 9840 Faust Dr., Vienna, Va. 22182

[21] Appl. No.: 08/786,397

[22] Filed: Jan. 17, 1997

[51] Int. Cl.⁷ .................................................. G06F 15/18
[52] U.S. Cl. ............................................................ 706/59
[58] Field of Search ................................ 706/59, 61, 50, 706/47, 48

[56] References Cited

PUBLICATIONS

Janssen et al., Group decision support using Toulmin argument structures, Proceedings of the IEEE International conference on Systems, Man and Cybernatics, pp. 2704–2709, Oct. 1996.

*Primary Examiner*—Anton W. Fetting
*Assistant Examiner*—Sanjiv Shah

[57] ABSTRACT

A system and method for facilitating decision-making comprising a computer program causing linkage of data representing a plurality of argument structure units into a hierarchical argument structure. Each argument structure unit comprises data corresponding to a hypothesis and its corresponding counter-hypothesis, data corresponding to grounds that provide a basis for inference of the hypothesis or its corresponding counter-hypothesis, data corresponding to a warrant linking the grounds to the hypothesis or its corresponding counter-hypothesis, and data corresponding to backing that certifies the warrant. The hierarchical argument structure comprises a top level argument structure unit and a plurality of subordinate level argument structure units. Each of the plurality of subordinate argument structure units comprises at least a portion of the grounds of the argument structure unit to which it is subordinate. Program code located on each of a plurality of remote computers accepts input from one of a plurality of contributors. Each input comprises data corresponding to an argument structure unit in the hierarchical argument structure and supports the hypothesis or its corresponding counter-hypothesis. A second programming code is adapted to combine the inputs into a single hierarchical argument structure. A third computer program code is responsive to the second computer program code and is adapted to represent a degree of support for the hypothesis and its corresponding counter-hypothesis in the single hierarchical argument structure.

21 Claims, 79 Drawing Sheets

Toulmin-Based Logic Test - [List NCFAP by state for...]

File  Edit  Window  Help

State: OH    Crop: carrots                    Type:
Pesticide Name: OXAMYL

1992 Data

Acrage: 1,747.00
X Percentage: 24
= Acres Treated: 419.00

X Rate: 1.02
= Pounds of Active Ingredient Applied: 763.00

Record: 29  of 49

Return

TBL Test Questions

Toulmin-Based Logic Test - [TBL Test Questions]

File  Edit  Glossary  Instructions

Question for: Policy decision maker- No
RFP developer- Yes
Expert/scientist- Yes TBL has a positive effect on the process of collecting objective science (information) on pest management alternatives.

Answer (click on one)
Strongly agree
Agree
50/50 (no difference)
Disagree
Strongly disagree
No response

Optional comment (click on box and type)
TBL has made it easier to make and understand decisions - specifically on what crop/pest areas should be included in the USDA Pest Management Alternatives for Farmers Competitive Grants Program.

Record  Skip

Record: 1  of 74

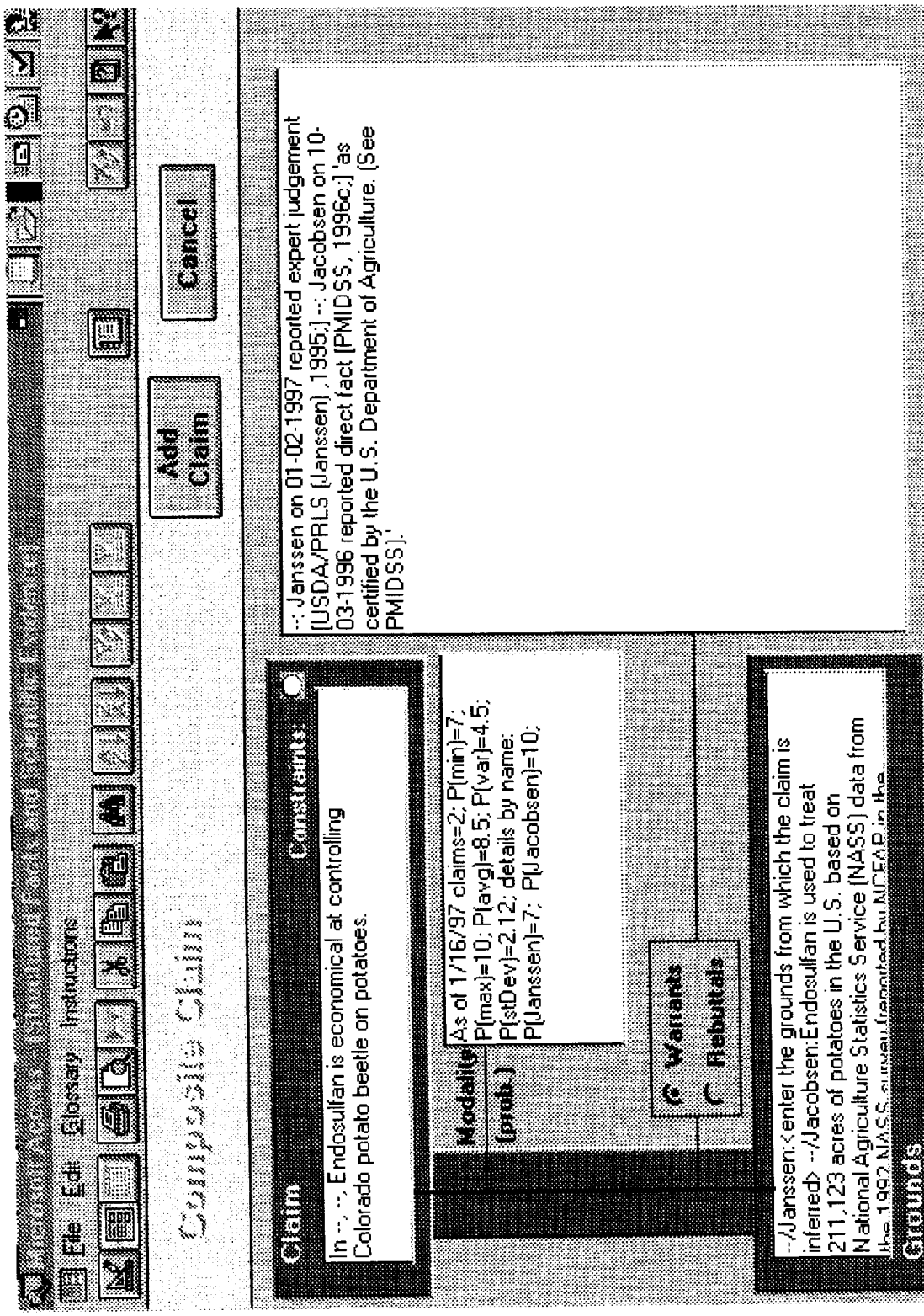
Figure 1200

Figure 18. PMIDSS, "AIS Data: 1992", Pest Management Information and Decision Support System Database, U.S. Department of Agriculture, Washington, D.C., 1996b.

Peterson, S., and Batley, S., "The fate of Endosulfan in aquatic ecosystems." Environmental Pollution, 1993, 82:143-152.

Additional Information Brought
to Bear on the Claim that
Endosulfan is Safe ($H^c_{3,1,2}$)

Backing:

as certified by expert E who made this claim

Warrant:

because of empirical observations and experimental results, and expert opinion that $H^c_{3,1,2,1}$, $H^c_{3,1,2,2}$ (and $H^c_{3,1,2}$ stated initially) are sufficient to infer this Grounds:

Endosulfan naturally degrades rapidly in the environment ($H^c_{3,1,2,1}$), and commodities on which Endosulfan is used do not retain trace amounts of Endosulfan ($H^c_{3,1,2,2}$).

Claim added by another expert $H^c_{3,1,2}$

Claim:

Endosulfan is safe, i.e., when used according to label it is not an health and environmental risk Modality:

so, probably

Rebuttal:

but there are other means of exposure that make it a risk, e.g. skin contact or ingestion from surface or ground water before it degrades

Figure 26.

Additional Information Brought to Bear on the Claim that Endosulfan is Safe to Human Health ($H^c_{3,1,2,2}$)

Backing: as certified in [USDA, 1996]

Warrant: because of experimental results

Grounds: Experimental results show that commodities (including 694 potato samples) to which Endosulfan was applied did not exceed tolerance [USDA, 1996]

Modality: so, certainly

Claim added by another expert $H^c_{3,1,2,2}$

Claim: Endosulfan is safe to human health, i.e. Commodities on which Endosulfan is used do not retain trace amounts of Endosulfan USDA, *Pesticide Data Program: Annual Summary Calendar Year 1994*, USDA Agriculture Marketing Service, Science and Technology Division, 1996.

Figure 30.

PRLS, "Pesticide Review List Survey Database," U.S. Department of Agriculture, Washington, D.C.

PMIDSS, "NCFAP Data: 1992", Pest Management Information and Decision Support System Database, U.S. Department of Agriculture, Washington, D.C., 1996c.

Roush, R.T., C.W. Hoy, D.N. Ferro, and W.M. Tingey, Insectide resistance in the Colorado potato beetle (Coleoptera: Chrysomelidae): Influence of crop rotation and insecticide use. J. Econ. Entomol., 1989.

PMIDSS, "NCFAP Data: 1992", Pest Management Information and Decision Support System Database, U.S. Department of Agriculture, Washington, D.C., 1996c.

Alford, R., 1994, Deployment... antifeedants in management of CPB, in G.W. Zehnccr, and Powelson, et al (eds.), Advances in potato pest management, ASP Press, St. Paul, MN. PP. 342-356
Murray, K., Alford, R. et al 1993, Interactive effects of an antifeeant used with Bacillus thuringiensis... on Colorado potato beetle, J. Econ. Entomology, 86:1793-1801.

ARGUMENT STRUCTURE HIERARCHY SYSTEM AND METHOD FOR FACILITATING ANALYSIS AND DECISION-MAKING PROCESSES

STATEMENT REGARDING FEDERALLY SPONSORED RESEARCH

This invention was made with government support under Contract No. W-31-109-ENG-38 awarded by the U.S. Department of Energy. The U.S. Government has certain rights in the invention.

BACKGROUND OF THE INVENTION

The present invention relates to a program and method for facilitating decision-making, and more particularly, the present invention relates to a computer program, system, and method that accepts inputs that bear on a decision in a structured format from a plurality of sources and arranges the inputs in a hierarchical structure that permits an evaluation of the inputs as they relate to the decision.

Decision-makers in businesses and government agencies are routinely called upon as part of their jobs to make decisions with the intention of achieving desired outcomes. One example is that of a regulatory decision-maker in a government agency charged with establishing policies and regulations with the intention of achieving a desired result. Often the assessment of the alternatives, and likely outcome of a proposed policy or regulation, depends upon relevant scientific research and knowledge. If the intent is to develop policies that are science-based, as opposed to personal or political, then use of sound scientific grounds in the decision-making process improves the probability that the desired outcome will result from a policy or regulation.

Unfortunately, despite the intentions of the decision-makers, the policy and regulation making process is not always tightly linked to relevant scientific evidence. One possible reason for this is that gaps exist between scientists and policy makers, where it is often difficult or impossible for a policy maker to understand, and effectively use, all the relevant scientific evidence that is available.

In general, public testimony and anecdotal evidence suggest that many policy makers/regulators would like to draw upon all pertinent scientific evidence, but simply cannot. In some cases, not enough research has been completed; and in cases where a large volume of research does exist (often with varying degrees of uncertainty, and debate over interpretation), it is often organized in a way that is inscrutable to the typical policy maker, who is not a scientist. "Science assessment", the collection and assessment of scientific information and evidence in support of policy decision making, does not in itself solve the inscrutability problem, because science assessments do not necessarily document and organize the scientific arguments in a way that nonscientists can understand.

The problem, more precisely, is that it is often difficult for the policy makers to understand how content specialty experts, scientists and engineers, arrive at their judgments, and what to believe when two experts give contradictory answers. This gives rise to the inscrutability problem. In other words, there is a plethora of research, often reaching somewhat different conclusions, and it is organized and presented in a way that is difficult for a policy maker to understand in relation to the policy issue that needs resolution. Also, the science or technology assessment and review process often takes too long to accomplish because experts are inefficiently networked. The problem is further compounded by lack of an efficient structure for eliciting relatively complete, precise and accurate claims, rebuttals, and counterclaims directly from the experts, in a way that is practical and efficient. After the assessment, the details of how a science assessment question was answered and why are often lost, because of incomplete documentation as the details or elements of the arguments are not recorded and archived properly.

Policy makers may go through large science and technology assessments that require multiple experts in order to fully cover the range of issues surrounding the policy question. The problem begins with the need to assess an option. Experts are tapped to provide expert opinions and supporting evidence, but the experts are often located in various locations around the country or world. The process is time consuming, because the experts need to be contacted and provided with explanations of what portion of their expertise is needed in order to provide useful input to the science or technology assessment. The expert's response is usually a summary, without the details of how they came to that assessment. The grounds and backing for the specific assessment that is given by the expert are usually not documented well if at all. If two experts give contradictory assessments, it is usually difficult for the policy maker to understand how their arguments compare, such as the different grounds and backing each bring to bear on their claims. The policy maker attempts to choose between them, by deciding which argument, or hypothesis, has the greatest degree of support. When information is missing, the policy maker may have to go back to the experts to get clarifications. This process of considering of the science or technology, identifying missing information and going back to the experts, can take weeks or longer. As a result of this, the process is prone to omission of important details.

Decision and policy makers often find it difficult to understand and consider the respective expert's science or technology assessments and how they relate to the given policy question because the assessment may omit many of the details, such as the grounds and backing upon which conclusions were drawn and the confidence that the expert has in those conclusions. It is difficult for policy makers to understand and assess the arguments put forth by experts who have conflicting expert opinions. In addition, it is difficult for the policy makers to see hidden bias on the part of the expert for or against an option. Further, it is difficult to see how the arguments presented by the expert relate to the original science or technology assessment question.

Experts intuitively assess the degree of support that the scientific evidence brings to bear on their claims or hypotheses, but this assessment is usually not explicitly stated and recorded. Peer review is may be required but there is, very often, no means whereby the peer review group can systematically review the assessment through use of all the grounds and backing that led to the assessment conclusions. The group usually just does not have the information structured in such a way that they can systematically see the grounds and backing that has been brought forth by the expert making the claim, therefore making it difficult to assess the degree of support that should be associated with the hypothesis or claim.

After the decision or policy makers collect the respective pieces of the assessment and bring them together in context of the policy question, they often ask another group to provide a peer review. If an expert does not agree with a claim made in the assessment, he or she may provide a rebuttal, and in some cases a counterclaim. Here again, there is lack of structure and systematic means of engaging in this process. It is time consuming, often taking many months before this step can be completed.

Once the expert's review has been provided, the policy maker should be able to understand and properly consider the expert's claims and counterclaims. If the assessment is believed to be adequate, as judged by those conducting the assessment, then it needs to be documented for use by policy makers. If it is felt to be not adequate, the assessment process needs to continue through another cycle. This can be a time consuming and costly process and efforts to make it more efficient and timely would be desirable.

There are at least six common factors in large science assessments which make it hard for policy decision makers to understand (inscrutability). First, there is too much information (information overload) and insufficient structuring of the facts and evidence presented by the various experts. Second, often it is not clear how the data are brought to bear on what has been claimed because arguments are not explicitly stated and are difficult to understand in the context of the policy question: (e.g., there is inadequate linkage of the available and relevant scientific data and information to what has been claimed, it is hard for policy decision makers to get information; and experts and policy decision makers are working together from different disciplines and often different geographical locations). Third, each discipline involved in the assessment has its own field dependent knowledge and field specific vocabularies. Fourth, there are different (analytical) frames of reference without clear structure to how they relate. Fifth, different experts present contradictory claims. Sixth, there are issues outside of scientific inquiry influence the assessment, such as social norms, political goals, economics (profits) and different value systems, which are a necessary and inseparable part of the assessment.

These factors commonly effect science assessments because, there is the need to bring the arguments put forth by experts or scientists to bear on policy decisions, and these arguments are often contradictory and conflicting. These science assessments are typically monumental tasks which are plagued with this gap between experts and policy decision makers, failed use of information and resulting poor policy decisions. The need for structure to address the above list of contributing factors is common to the science assessment, in general.

An example of the type of policy decision-making process that utilizes a large complex science assessment science assessment is the program being conducted by the U.S. Global Change initiative. Experts from several countries and multiple scientific disciplines are working with policy decision makers in an effort to get international regulation of pollutants and practices that are adversely effecting the worlds changing climate and ecosystems. Global change encompasses the full range of natural and human-induced changes in the Earth's environment and includes changes in the global environment (including alterations in climate, land productivity, oceans or other water resources, atmospheric chemistry, and ecological systems) that may alter the capacity of the Earth to sustain life. The goal of the global change science assessment is to support national and international policy decision making. This science assessment has major consequences for society; and if properly understood and considered by national and international policy decision makers, the consequences can be positive.

The Global Change science assessment is only one of many. Another example is acid rain science assessment. There are thousands of experts in the fields of human health, ecology, material, visibility, sociology, and economics involved in the science surrounding acid rain policy making.

Still another example of this type of science assessment is the assessment being conducted for pest management policy decision making. The pest management (e.g. pesticide) policy making activities performed by the U.S. Department of Agriculture and U.S. Environmental Protection Agency require science assessment because the effectiveness of pest management is based on plant biology, entomology, chemistry, toxicology and several other disciplines. Pest management has become dependent on pesticides, which is a major concern to U.S. federal and state policy decision makers, because most pesticides pose risks to human health and the environment.

Government regulation of pesticides is primarily done by the U.S. Environmental Protection Agency (EPA), however other agencies of the U.S. government are involved including the U.S. Department of Agriculture (USDA). In general, EPA is responsible for identifying pesticides that cause cancer in humans or animal as specified by the Federal Insecticide Fungicide and Rhodenticide Act (FIFRA). Under the Delaney Clause of FIFRA, companies need to show that pesticides do not cause cancer in humans or animals. Under this law, if any dosage of a pesticide causes cancer, it must be regulated.

Science assessment is conducted as part of the pest management policy decision making process to assess the risk, such as the human dietary risk from residues that result from use of a pesticide on food. For example, a pressing concern is the discovery that pesticides get into infants' diets. EPA is conducting science assessment to find acceptable levels (tolerances) of these toxicants that infants can be exposed to with a reasonable risk. It is not likely that regulations will result in the absolute elimination of pesticides in diets, but a special coordinated effort is underway by EPA, USDA and the Department of Human Health and Safety (HHS) to safeguard the health of infants and children since they are believed to be at greater risk than adults. These assessments are supported by scientific findings; experts, primarily from companies that profit from the sales of pesticides, are required to provide scientific findings and data to EPA (test results) as supporting evidence that a pesticide they want to register for use does not cause cancer.

USDA contributes to the policy decision making process under a working relationship with EPA These science assessments identify viable alternatives to the pesticides that EPA has or is considering regulating. Under this arrangement USDA and EPA cooperate (1) to find viable alternatives to pesticides under regulatory review, (2) to identify areas of priority need, and (3) to award research grants to worthy proposals in those areas of need. Science assessment is required for all three.

Logistics present a problem in the policy-making process. Federal policy decision makers primarily reside primarily in Washington, D.C. and the experts primarily reside in Land Grant Universities in the states and territories. There are only a few USDA and EPA policy makers who have a limited amount of time and resources for science assessment in the policy development process, but they are required to tap hundreds of experts from many different disciplines in the Land Grant Universities.

The USDA and EPA policy decision makers may also find it difficult to understand and properly consider claims being put forth by the various experts. A pesticide regulation may take away a pesticide that is the current and perhaps only means of controlling a pest, and this can cause devastating pest damage to the commodity and result in huge financial losses for the growers. The scope of the required science assessment can be enormous considering the number of commodities that must be considered, the number of pests that effect each commodity, and the number of pest management tactics (chemical and non-chemical) that are plausible for controlling each pest on each commodity. For even a single decision, these decision-makers consider expertise from experts in multiple disciplines concerning the viability of a single alternative. These policy decision makers may also consider whether crop/pest areas are priorities for government funded research, a difficult task considering that there are hundreds of types of commodities grown in the U.S. and each commodity has multiple pest problems (insects, rodents, fungi, weeds and other types of pests).

Another complexity of these science assessments is that the hundreds of pest management tactics have varying degrees of effectiveness. Furthermore, pests adapt for survival through genetic resistance, usually causing an effective pest management tactic to eventually lose its effectiveness, and the timing and practices of pest management effect the rate at which genetic resistance develops in the pests. For example, a pesticide used alone for several years may lose its effectiveness due to genetic resistance in the near-term, but used at reduced rates in combination with other chemical or non-chemical tactics the genetic resistance may not occur until many years later.

Contradictory arguments provided by the experts significantly increase the magnitude of the problem. For example, in the 1995 Pesticide Review List Survey, there were many cases where experts had conflicting reports on the effectiveness of alternative pest management tactics, and it was not clear in many cases whether these reports were based on sound scientific data or not. There are two aspects that stand out for improvement here: first, better data, such as yield and quality data, need to be collected, and second, data need to be brought to bear (linked) to the arguments of effectiveness that are being put forth.

Still another aspect that causes additional complexity is that a claim put forth at one point in time is subject to rebuttal at some point in the future, such as when the effectiveness of an alternative changes, or when an expert attempts to replicate a field study in which effectiveness data are collected, but the results are contradictory.

In this example the gaps between these policy decision makers and experts may cause the policy decision makers to make decisions without considering all relevant arguments: when the experts do not clearly and concisely convey the important information, and make their arguments explicit, then the policy decision makers are not able to understand them. This problem was evident when policy decision makers were considering which crop/pest problems should be included in the 1995 Pest Management Alternatives for Farmer RFP. They depended on the experts for the sound scientific evidence to build an arguments for or against including a particular crop/pest problem in the RFP by doing science assessment involving respective experts. The policy decision makers surveyed the experts for information and received responses back, but the grounds for the arguments and how the arguments were warranted were not documented: (1) the experts were not tapped effectively, (2) the policy decision makers did not understand (inscrutability), (3) consequently they did not properly consider all the relevant information that was known about the alternative pest management alternatives, and (4) it would have taken too long to do a comprehensive peer review—even though they used the system of experts within the Land Grant University system that USDA had constructed for this very purpose. To bridge this gap, these decision makers should have arguments explicitly stated by the experts that are easy to understand and fully consider in the policy decision making process.

To recap, the magnitude of pest damage from policy decision making makes the stakes high, either to agricultural production or to human health and environment. In the absence of an effective means of tapping the experts, and understanding and considering the arguments, the decisions may just be politically driven, without basis in sound objective science. There are many examples like the ones above where information exists, but failure to use it leads to poor policies. Policy decision makers typically want sound scientific evidence to bear on policy decision, but are frustrated by this gap between them and the experts.

In general, prior art efforts to use scientific assessments to make sound policy decisions have failed when the scope of the assessment encompasses a large number of sources. Prior efforts have not been effective at capturing the arguments being put forth by the experts. They have not captured the grounds (data with references) upon which conflicting claims of experts are based, and they have not properly lined claims to supporting data.

Accordingly, it is an object of the present invention to provide an improved system and method that can facilitate decision-making, particularly when the decision-making utilizes for support a large number of sources. It is a further object, to provide a method wherein scientific assessment can be effectively utilized in a decision-making process.

SUMMARY OF THE INVENTION

To achieve the above and other objectives, the present invention provides a system and method for facilitating a decision-making process comprising a computer program that causes linkage of data representing a plurality of argument structure units into a hierarchical argument structure. Each argument structure unit comprises data corresponding to a hypothesis and its corresponding counter-hypothesis, data corresponding to grounds that provide a basis for inference of the hypothesis or its corresponding counter-hypothesis, data corresponding to a warrant linking the grounds to the hypothesis or its corresponding counter-hypothesis, and data corresponding to backing that certifies the warrant. The hierarchical argument structure comprises a top level argument structure unit and a plurality of subordinate level argument structure units. Each of the plurality of subordinate argument structure units comprises at least a portion of the grounds of the argument structure unit to which it is subordinate. Program code located on each of a plurality of remote computers accepts input from one of a plurality of contributors. Each input comprises data corresponding to an argument structure unit in the hierarchical argument structure and supports the hypothesis or its corresponding counter-hypothesis. A second programming code is adapted to combine the inputs into a single hierarchical argument structure. A third computer program code is responsive to the second computer program code and is adapted to represent a degree of support for the hypothesis and its corresponding counter-hypothesis in the single hierarchical argument structure.

BRIEF DESCRIPTION OF THE DRAWINGS

FIGS. 13–39 are diagrams of argument structure units developed in an exemplary embodiment of the system of FIG. 1.

DETAILED DESCRIPTION OF THE PRESENTLY PREFERRED EMBODIMENTS

I. Overview

Figure 1:
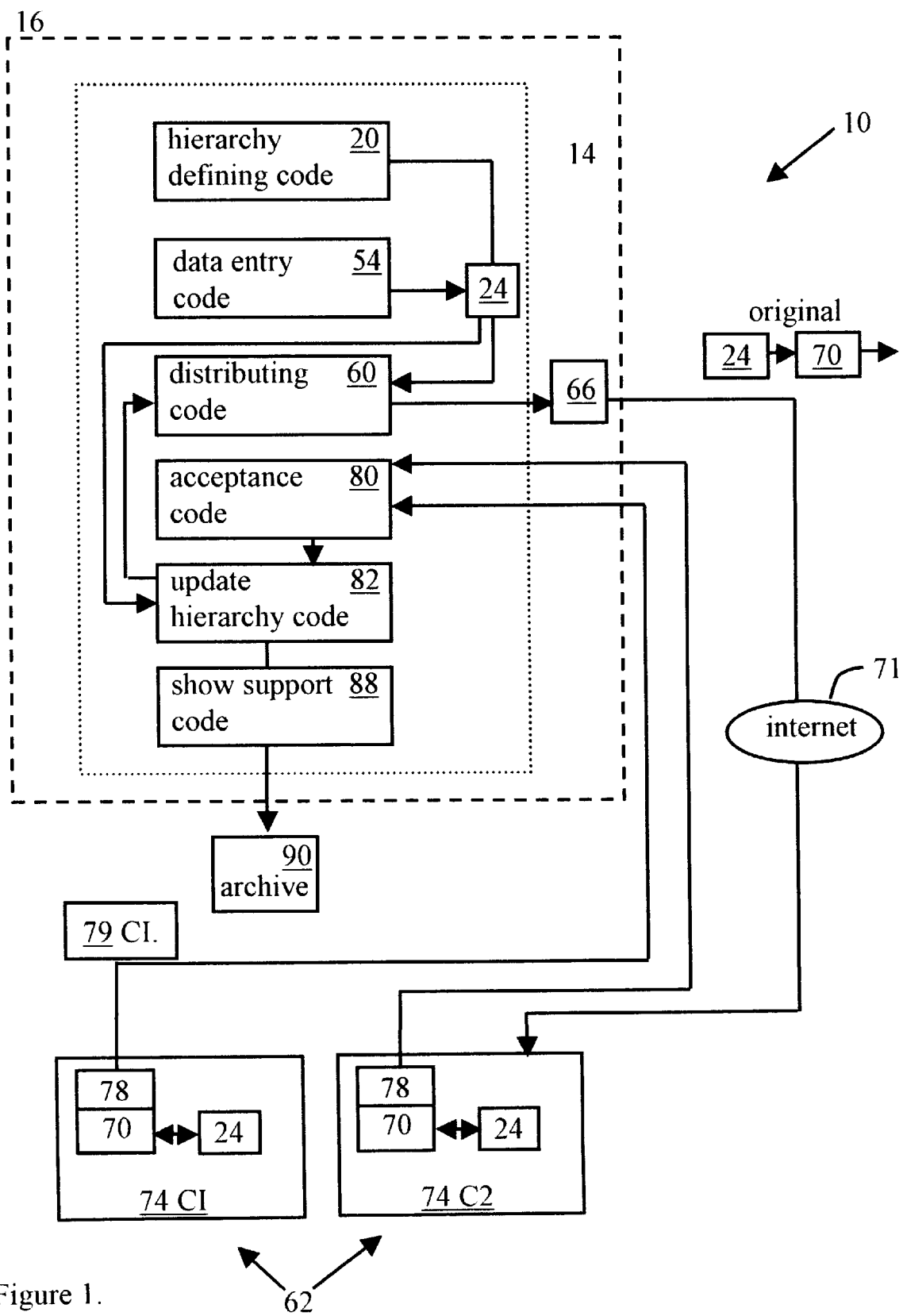
FIG. 1 is a block diagram showing one embodiment of system for facilitating decision-making.
Figure 2:
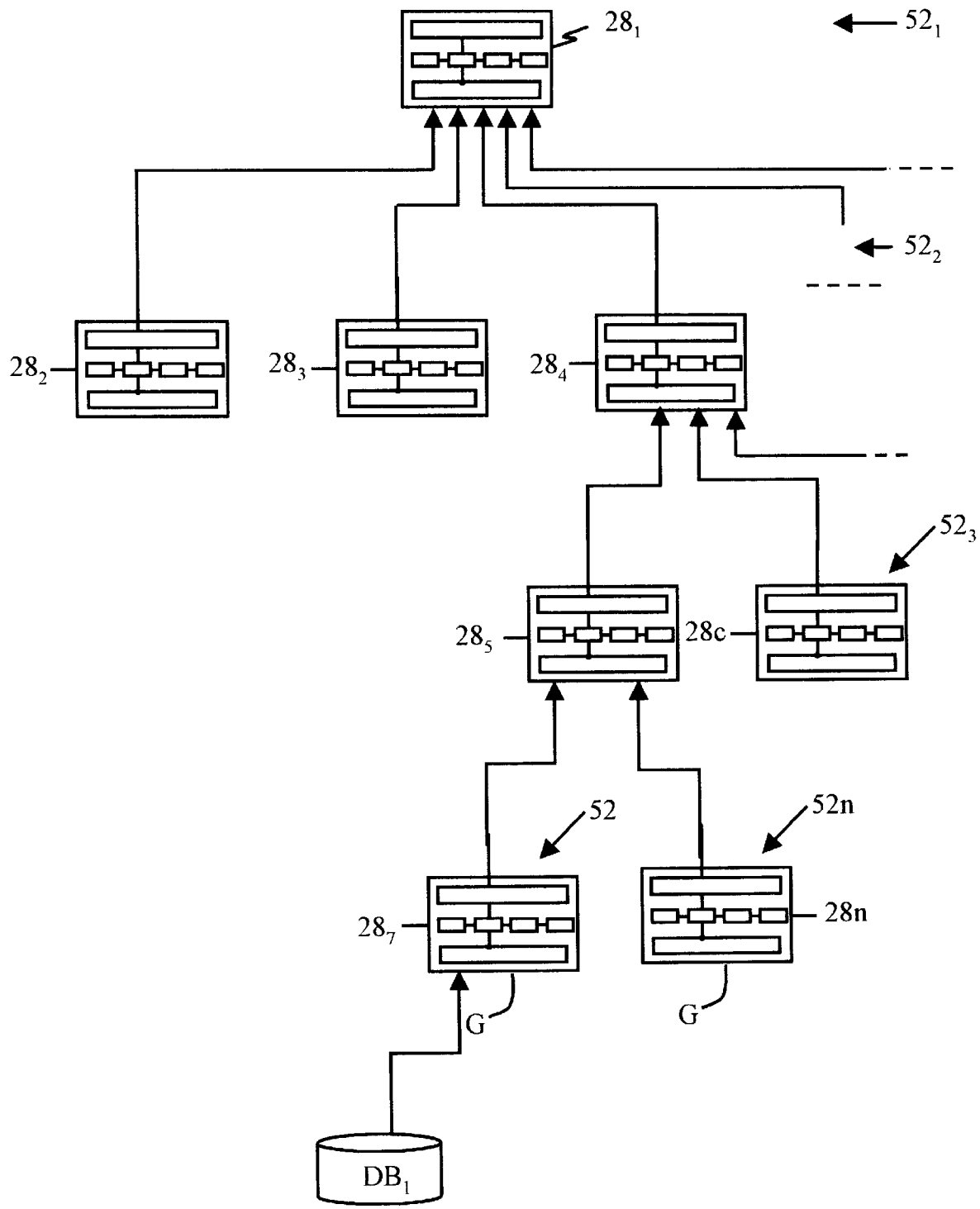
FIG. 2 is a block diagram showing an exemplary embodiment of the hierarchical argument structure in FIG. 1.
Figure 3:
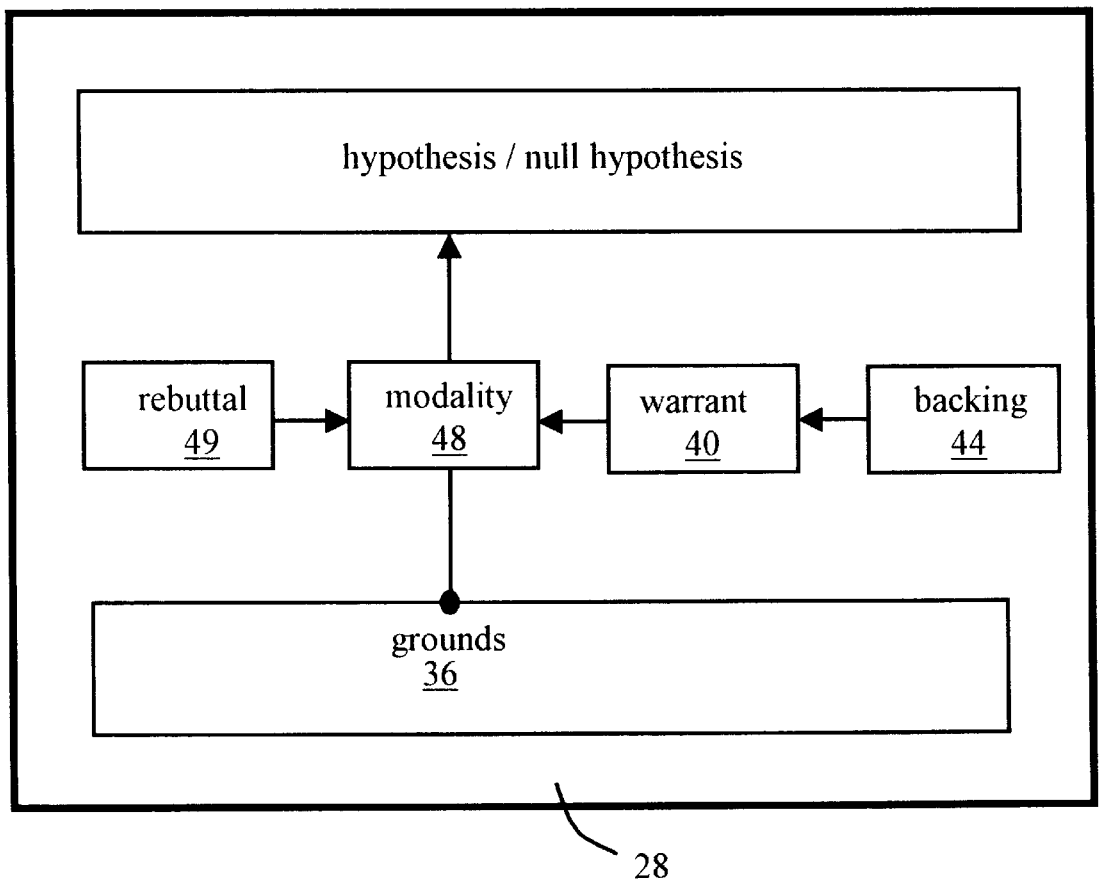
FIG. 3 is a block diagram showing the components in one of the argument structure units shown in FIG. 2.

Referring to FIG. 1, a present embodiment of the decision-making facilitating system 10 includes a software program 14 running on a computer 16. The software program 14 includes a first programming code means 20 adapted to define a hierarchical argument structure 24. As represented in FIG. 2, the hierarchical argument structure 24 is comprised of a plurality of argument structure units $28_1$, $28_2$, $28_3$, $28_4$, ... $28_n$. As illustrated in FIG. 3, in general, each of the argument structure units 28 has a similar internal format. Each argument structure unit includes data 32 that represents a "claim" or "hypothesis" and its corresponding "counter-claim" or "null hypothesis." In addition, each argument structure unit 28 includes data 36 that represents "grounds" that provide support for the "claim" (or "hypothesis") or its corresponding "counter-claim" (or "counter-hypothesis" or "null hypothesis."). In a present embodiment, each of the argument structure units 28 also includes data 40 that represents a "warrant", data 44 that represents "backing", and data 48 that represents a "modality" of the argument structure unit 28. Optionally, the argument structure unit 28 may also include data 49 that represents a "rebuttal." The meanings of these terms are explained below. The data in the argument structure unit 28 are arranged so that the modality links the hypothesis to the grounds and the warrant provides backing for the modality. The rebuttal also bears on the modality.

Referring again to FIG. 2, one of the argument structure units 28, i.e. unit $28_1$, is the top-level argument structure unit in the hierarchical argument structure 24 and the remaining argument structure units $28_2$, $28_3$, $28_4$, ... $28_n$ are subordinate argument structure units in the hierarchical argument structure 24. The subordinate argument structure units $28_2$, $28_3$, $28_4$, ... $28_n$ may be directly subordinate to the top level argument structure unit $28_1$, or may be directly subordinate to other subordinate argument structure units.

In the hierarchical argument structure 24, each subordinate argument structure unit forms all or part of the grounds (e.g., "grounds 36" or "G") for the argument structure unit to which it is subordinate. Therefore, the hierarchical argument structure 24 is comprised of a plurality of levels $52_1$, $52_2$, ... $52_n$ in which one or more subordinate argument units in a level comprise the grounds of an argument structure unit in the level directly above. The hierarchical argument structure 24 may have many levels.

At any level of argument structures units, the grounds of an argument structure unit may be comprised of subordinate argument structure units (i.e. at a level below), or may be comprised of data, or a combination thereof, as explained below. At the lowest levels of argument structures units, the grounds may be comprised of data.

In a present embodiment, each of the argument structure units may be considered to be a node in a hierarchy or network. Each of the nodes has a similar internal structure. Each of the nodes, except for a top level node, is subordinate to at least one of the other nodes.

Referring again to FIG. 1, in the present embodiment, a user-decision-maker operates the software program 14 to include data in the hierarchical argument structure 24. Specifically, the user-decision-maker includes data for the top level argument structure unit $28_1$ to define the hypothesis to be decided. The software program 14 includes a data entry programming code means 54 that provides for entry of these data by the user-decision-maker. The hypothesis to be decided is entered as data corresponding to the "argument" portion 32 into the top level argument structure unit $28_1$. In addition, the user-decision-maker may optionally include data in subordinate argument structure units 28 in one or more sub-levels subordinate to the top level argument structure unit. In this initial stage, the hypothesis is framed and meaningful underlying hypothesis are developed. These steps are also shown in the flow chart of FIG. 4 at steps 100 and 102, and in the flow chart of FIG. 5 at steps 200 and 202.

Referring again to FIG. 1, the software program 14 also includes a programming code means 60 adapted to distribute both the original hierarchical argument structure (i.e., "hierarchical argument structure $24_{original}$") and a means to make contributions thereto (e.g. "contributor programming code means 70") to a plurality of user-contributors 62. In one embodiment, the contributors are selected as being experts in their respective fields. In a typical embodiment, the user-contributors are located in various locations remote from the user-decision-maker and from each other. Accordingly, the system 10 may include appropriate hardware and/or software means 66 to distribute the original hierarchical argument structure 24 and the contributor programming code means 70 to the plurality of user-contributors 62 at remote locations. In one embodiment, the system 10 posts the original hierarchical argument structure 24 and the contributor programming code means 70 on a server connected to the Internet 71 so that the user-contributors 62 can download the hierarchical argument structure 24 and the contributor programming code means 70, by FTP, in an HTML page, and so on. In an alternative embodiment, the user-decision-maker may distribute the hierarchical argument structure 24 and the contributor programming code means 70 to the plurality of user-contributors as attachments to e-mail. In still further alternative embodiments, the user-decision-maker may distribute the hierarchical argument structure 24 and the contributor programming code means 70 by storing them on disks or other media and sending the media to the plurality of user-contributors. Any other suitable means of data distribution may be used, including local or wide area networks, and so on. This distributing process is shown at step 104 in FIG. 4.

In a present embodiment, as part of the system 10, each user-contributor runs the contributor programming code means 70 on a local workstation, e.g., one of the workstations 74$_{C1}$. . . 74$_{CN}$. The contributor programming code means 70 provides for the hierarchical argument structure 24 to be displayed to the user-contributor on the user-contributor's local workstation 74. The contributor programming code means 70 also allows the user-contributor to add additional argument structure units 28$_C$ to the hierarchical argument structure 24. Accordingly, the contributor programming code means 70 may be similar or identical to the data entry programming code means 54 used by the user-decision-maker, except that the contributor programming means 70 does not allow modification or deletion of any of the argument structure units already included in the hierarchical argument structure 24. This process followed by the user-contributor is shown at step 106 in FIG. 4 and at step 204 in FIG. 5.

As mentioned above in connection with FIG. 3, each argument structure unit 28 has a specific, uniform internal structure. In order for the user-contributor to use the contributor programming means 70 to add additional argument structure units to the hierarchical argument structure 24, the user-contributor is required to provide his or her input in the specific format, i.e. data corresponding to a "hypothesis 32", a "warrant 40", "backing 44", a "modality 48", "grounds 36", and optionally a "rebuttal 49." In this manner, the contributor programming means 70 both imposes a structure in which the user-contributor's input can be evaluated and provides for a comparison of one user-contributor's input to that of another. In a present embodiment, the contributor programming means 70 may provide a menu option that prompts the user-contributor for inputs for each of these items and may limit the types of information that the user-contributor may enter. For example, for the modality 48 input data, the contributor programming means 70 may provide a pop-up menu that limits the user-contributor to the following selections: "certainty", "probably correct", "presumably correct", and "low probability of correctness."

The system 10 also includes a means to forward the inputs 79 from the user-contributors. In one embodiment, each of the user-contributor's input data 79 may be sent directly over the Internet from the user-contributor's local workstation 74 after they have been entered by the user-contributor. For this purpose, the contributor programming means 70 may include additional programming 78 that uploads the user-contributor's input data 79 to a designated server address.

The system 10 further includes programming means that accepts the inputs 79 from each of the plurality of user-contributors. In one embodiment, this function is performed by a contributor input acceptance programming means 80 that is part of the software program 14 running on the first computer 16. The contributor input acceptance programming means 80 is responsive to the programming means 78 on each of the user-contributors' workstations that uploads each of the user-contributor's data 79. The software program 14 also includes programming means 82 that updates the original hierarchical argument structure 24 by augmenting it with the additional argument structure units 28$_{C1}$-28$_{Cn}$ provided in the inputs 79 from the plurality of user-contributors 62. This updated hierarchical argument structure 28$_{updated}$, is then redistributed or otherwise made available to all the plurality of user-contributors. This may be done using the same means (e.g., distributing programming code 60) used to distribute the original hierarchical argument structure 24. Each of the user-contributors is thereby permitted to view the contributions of each of the other user-contributors, e.g. using the contributor programming means 70. Each of the plurality of user-contributors is permitted to again provide input contributions to the now updated hierarchical argument structure 24$_{updated}$ by adding additional argument structure units. This may be done using the contributor programming means 70, as before. In this manner, each user-contributor may provide additional data that refutes a hypothesis or claim provided by another of the user-contributors. As before, none of the user-contributors is permitted to modify or delete any of the argument structure units already included by others in the hierarchical argument structure. When the hierarchical argument structure is viewed, in each node (unit) there is information that permits the user to determine information about the node, including an abbreviated description of the hypothesis or sub-hypothesis, the status (i.e. the step of processing), and the estimated degree of support for the hypothesis and the estimated degree of support for the counter-hypothesis. If there is information supporting a hypothesis (or sub-hypothesis), this is denoted by representation in a different color (for example, yellow). By clicking on the node, the information is displayed. If no information exists, clicking on a node brings up a screen that permits entry of information to support the claim.

This process of allowing user-contributors to add additional argument structures to bolster claims or hypotheses or to refute claims or hypotheses of others continues recursively until all user-contributor input is exhausted. This process is shown at step 108 in FIG. 4 and at step 210 in FIG. 5.

Although the process described above appears to have the user-contributors all make their input at the same time, in practice, the process may occur more gradually, and in a more distributed fashion, especially if the system is installed on the Internet. For example, if the original hierarchical argument structure is posted on a server on the Internet, a first user-contributor may make his or her input contributions to the hierarchical argument structure and the additional argument structure units may be added to the hierarchical argument structure immediately. Then, when the second and subsequent user-contributors access the hierarchical argument structure, it has already been augmented with the additional argument structure units provided by the first user-contributor. Making the hierarchical argument structure available in this manner is advantageous because it may reduce the iterations of updating.

Once all the user-contributors' inputs have been acquired, the hierarchical argument structure may be used by the user-decision-maker for decision-making. The completed hierarchical argument structure includes all the data representing the science assessment. In addition, the data are organized in a manner in which they can be weighed. For this purpose, a weighing and visualization programming code 88 displays the support for and against each hypothesis at each node in the hierarchy. Further, the backing, weight, and modality for each hypothesis and sub-hypothesis are plainly accessible. This weighing step is shown at 110 in FIG. 4 and at step 212 in FIG. 5. At this point, the entire hierarchical argument structure may be subjected to peer or contributor review again. This is represented by step 214 in FIG. 5.

Figure 4:
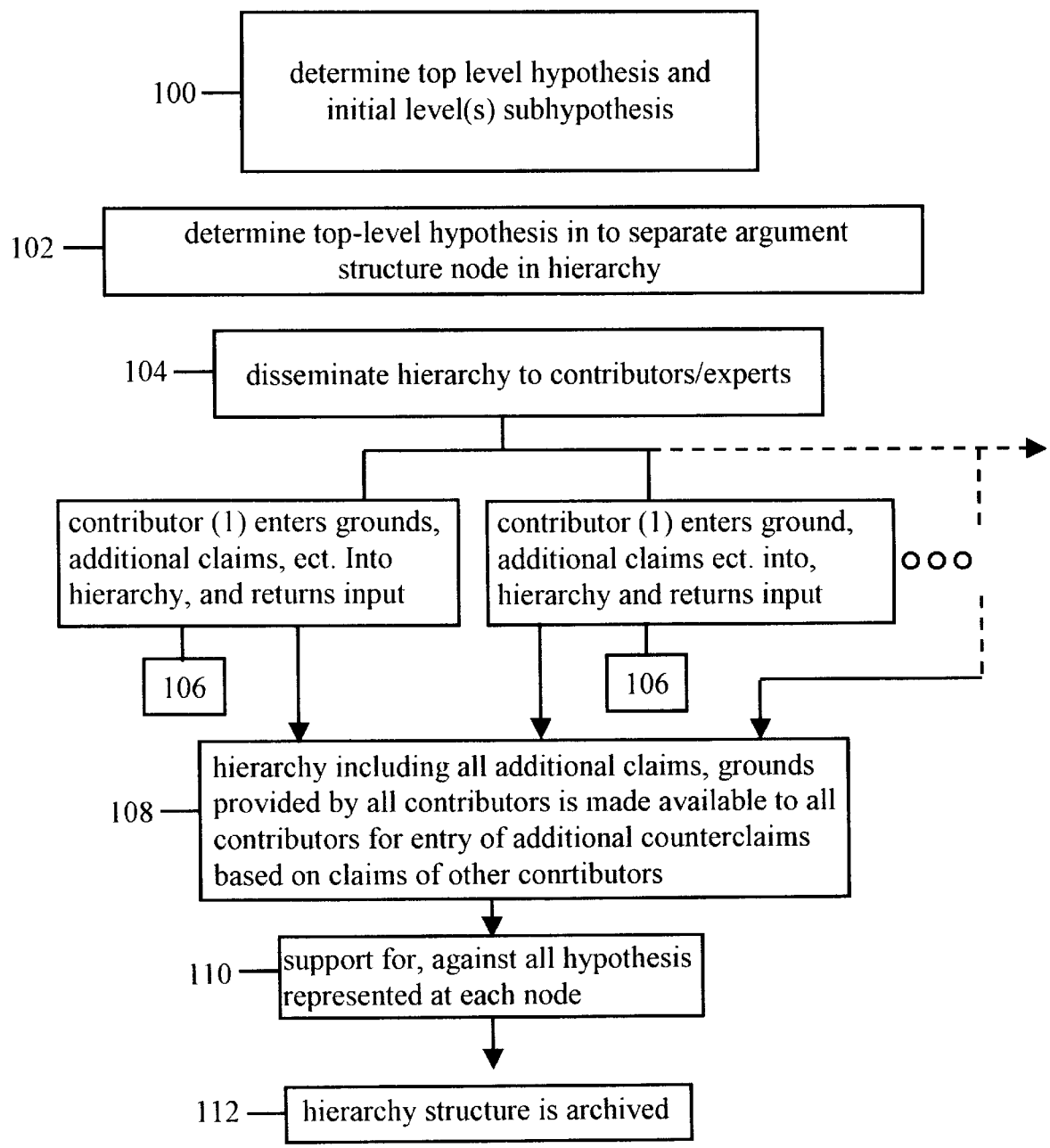
FIG. 4 is a flow chart outlining the steps performed in using the embodiment of FIG. 1.
Figure 5:
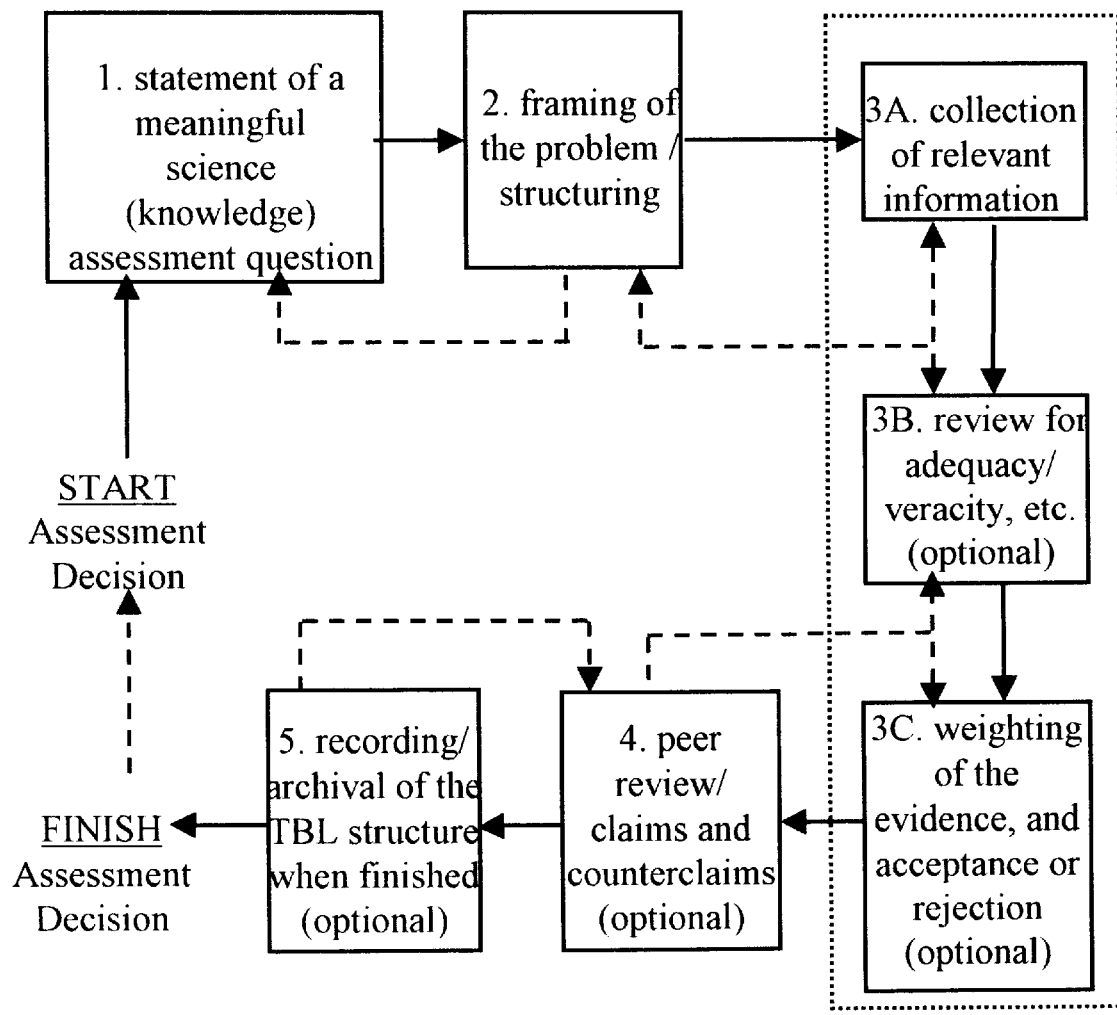
FIG. 5 is another flow chart outlining the steps performed in using the embodiment of FIG. 1.

Once a decision is made by the user-decision-maker using the completed hierarchical argument structure, the data in the structure 24 can be archived, (as shown at 90 in FIG. 1 and step 112 in FIG. 4 and step 220 in FIG. 5). In this manner, the user-decision-maker can show support for his or her decision. In addition, by having the hierarchical argument structure archived, it is possible to determine at a time in the future whether a decision should be revisited by noting if and how the underlying grounds warranting any of the claims have changed.

In one embodiment, the software program 14, including the first programming means 20 and the contributor programming means 70, are provided using Microsoft Access and Access Basic and the hierarchical argument structure 24 is provided as a database in Microsoft Access. In one embodiment, the first computer 16 and the user-contributor local workstations 74 are IBM PC's having an Intel 80386 or higher microprocessor and running DOS and Microsoft Windows 3.1 or higher. The first programming means 20 is stored on a hard drive of the computer 16 and loaded into RAM for execution. Similarly, the contributor programming means 70 are stored on hard drives of the computers used for the user-contributor workstations 74 and loaded into RAM's on the user-contributor workstation computers 74 for execution. In alternative embodiments, the first programming means 20 and the contributor programming means 70 may be provided using any suitable software development tool or computer language, including C++ or JAVA. In alternative embodiments, the contributor programming means 70 may be provided as an executable program downloadable in an HTML page over the Internet (e.g. a JAVA applet). In alternative embodiments, any other type of computer or operating system may be used for the computer 16 and the user-contributor local workstations 74.

FIGS. 12A–12OO

II. Internal Format of Argument Structure Unit

In a present embodiment, the argument structure units use a format referred to as "Toulmin Base Logic" ("TBL"). TBL is a graphic representation that illustrates a claim and the basis from which the claim is inferred. It is referred to here as an argument structure unit or a Toulmin structure since the primary focus is on the structure for representing arguments in science assessment.

An argument structure and its component parts are defined as follows. (For purposes of this disclosure, the following definitions are used, but it is understood that similar or equivalent terminology may be used to express similar concepts.)

A claim is an assertion of a truth.
Grounds provide the basis for the inference to that claim.
In general, grounds can be categorized by the means in which are warranted.
A warrant serves as assurance for a claim, and is certified by backing. In general, for the purposes here, claims in science assessment are generally licensed liscenced (warranted) by:
empirical observations;
expert judgments;
enumerative induction (statistics);
experiments (hypothesis test); and
direct fact.
A backing certifies the warrant; and it is considered the reason its validity and can come from a variety of means such as enumerative observation.
A modality is a subjective statement concerning the probability of the claim being true, given the grounds.
A rebuttal is a statement that weakens the modality of the claim based on evidence that the claim may not be true. It is a contradiction to the evidence used to warrant the claim, or conditions underwhich the claim will not hold true. A counter-claim is a form of rebuttal.

The grounds and backing of a claim can be any relevant quantitative information from experimental or empirical test results, statistical hypothesis testing, or results from modeling and simulation. The grounds and backing can also be any relevant qualitative information from direct facts, such as laws and regulations, observations and the expert's professional or personal opinions.

When an assumption or concession is made for the sake of argument, this claim is called an hypothesis (H). To accept a hypothesis it is required to establish that the degree of support (S) for the hypothesis (H) is greater than that for the counter claim or null hypothesis ($H^C$). If the support ($S^C$) for the counterhypothesis ($H^C$) is greater, the hypothesis is rejected.

An expert is considered to be someone regarded by their peers to be an expert because of their high degree of knowledge in a particular field relevant to the claim, such as chemistry, biology, entomology, high performance computing, or microelectronics. It is important to make a distinction between policy decisions, which are strategic, and tactical decisions which are more operational in nature and are used to implement a policy decision.

A natural language equivalent to a Toulmin argument exists since structure can be imposed using words rather than graphically with boxes and lines as in the Toulmin logic structure, but with due regard to Toulmin one should still describe the structure in words which requires reflecting on the conceptual and philosophical foundation laid out by Toulmin. Furthermore, there are several advantages to a graphical or structured depiction. First, visualization eases comprehension. The components of the argument are explicitly represented, meaning that it is easier to identify the particular elements of an argument, and these elements of the structure provide place holders for the elements, thereby facilitating elicitation of these elements. It is easy for the person filling in the boxes to see what is missing as well as the reasoning that has been put forth. In this regard it is easier to compare arguments between multiple experts, and between claim (H) and counterclaims (Hc) than between statements in generally unstructured discourse.

The same structuring can be applied to science assessment. Although an argument structure incorporating aspects of the teaching of Toulmin was selected for a present embodiment, it is understood that in alternative embodiments, the argument structure unit may have different formats or structures. In alternative embodiments, the argument structure unit may take the form of influence diagrams, Bayesian networks (which are oriented toward quantitative analysis); structured modeling, conceptual modeling, or a "Wigmore structured evidence" model (which is based on an elaborate set of symbols). In a present embodiment, the Toulmin argument structure is selected because it is relatively is easy to use and understand and is widely applicable. Science assessment is part of policy decision making and the Toulmin structure maybe more suitable that other approaches for policy related use.

Furthermore, the argument structure unit is easy for policy maker to understand and use in assessing science and technology assessment questions. One particular need in science assessment that is especially critical is the need to conduct the assessment on scientifically derived data. It is the warrant that links the data to claim being put forth. When data exists that supports a claim, then the Toulmin argument structure documents that linkage. Data need to be presented in way that describes the link to the claims being put forth and Toulmin structures provide that link.

There are other characteristics beyond those mentioned above that make the Toulmin structure a superior candidate for bridging the gaps between policy decision makers and Experts/Scientist contributors. First, it is informal and very general, and this is important because Toulmin structure must provide for statement of everything that needs to be stated, to be usefull in science assessment. The informality and generality makes it easy to state claims. Second, it can represent factual and value statements within single structured argument, and this is a necessity for arguments that involve both science assessment and political concerns. Value judgments are an integral part of any science assessment. Almost never is science assessed for answering policy questions without reference to some set of values. Third, Toulmin's approach requires development of warrant-establishing arguments as an integral part of the model. Explicit statement of the warrant allows policy makers to understand how the expert arrived at his or her claim. Fourth, Toulmin's approach requires the development of field-dependent criteria of analysis which makes it easier to discern credible from incredible, and good arguments from bad.

In science assessment, it is important to consider (1) whether the claim has met the standards for warranting a claim in the respective discipline in which the claim is made, and (2) issues such as whether the claim is scientifically sound, cogent, and conclusive. Arguments can be categorized several ways analytic/substantive valid/not valid conclusive/tentative deductive/inductive warrant-using/warrant-establishing As mentioned above, the argument structure units can be graphically linked from the claim box 32 of one unit into the Grounds box 36 of another.

III. Alternative Embodiments and Extensions

A. Integrated Database

Figure 6:
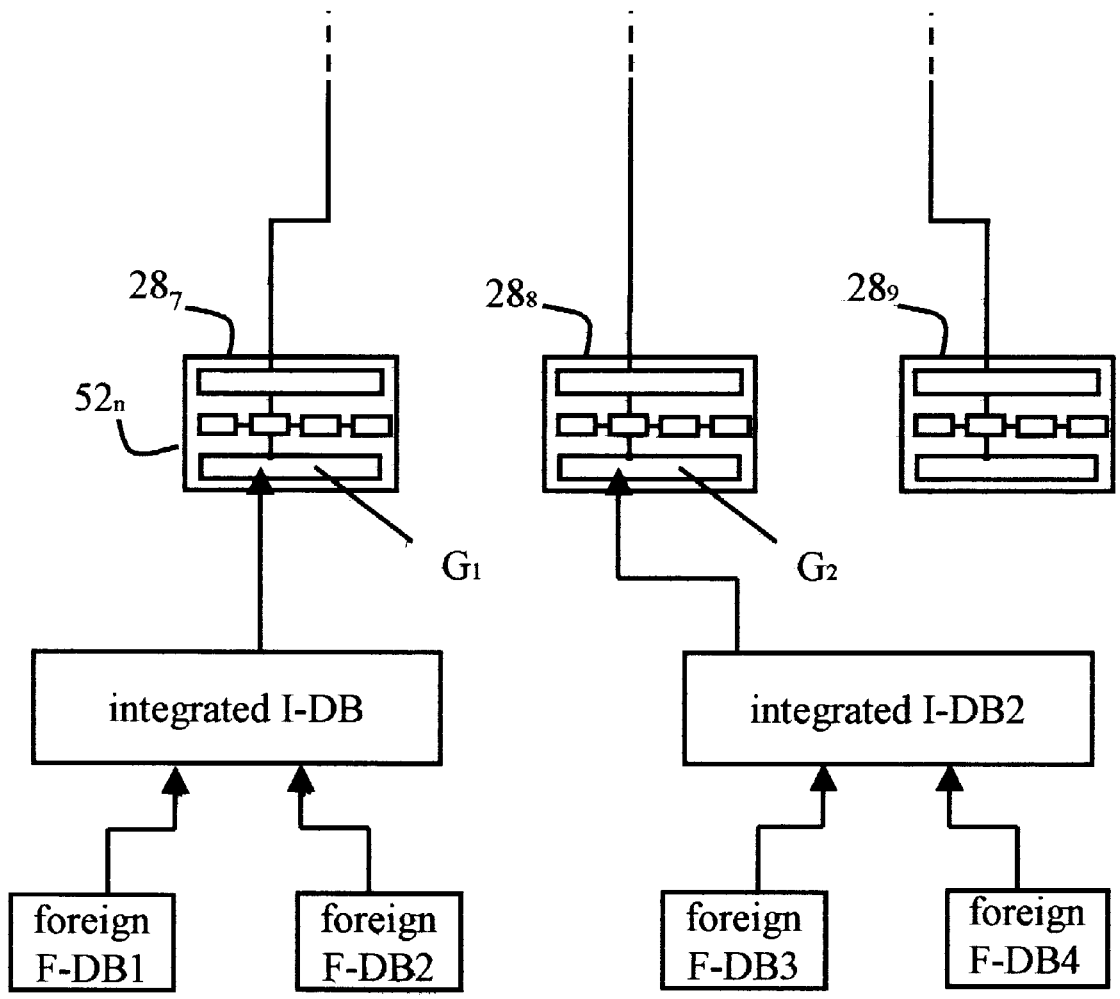
FIG. 6 is a flow chart showing a portion of another embodiment of the decision-facilitating system incorporating an integrated database.

Referring to FIG. 6, there is shown a flow diagram according to a further embodiment of the present invention. As mentioned above, in many policy and/or decision-making processes, the policy or decision maker attempts to make his or her decision based upon valid scientific assessments. In the embodiment shown in FIG. 1, a system is disclosed that provides for the generation of a hierarchical argument structure to which a plurality of expert/scientist contributors can provide input in a structured format so that a decision-maker can readily view how scientific assessment supports or rebuts a hypothesis. With the system shown in FIG. 1, a decision-maker can make use of what may appear to be conflicting expert positions because the hierarchical structure provides for the contributions of experts to be structured and supported by underlying grounds.

In many situations, it is envisioned that the hierarchical argument structures developed for decision-making based on scientific assessments will have scientific data at their lowest levels. This is because, ultimately, the positions (i.e., "claims" and/or "hypotheses") taken by the expert/scientist contributors will be based upon scientifically verifiable facts (data). Although expert/scientist contributors may disagree about how certain facts (or collections of facts) should be interpreted (i.e. in conflicting claims and/or hypotheses), there should be a body of scientific data at the lowest levels of the hierarchical argument structure. In the flow diagram of FIG. 2, this body of scientific data occupies positions as the "grounds" ("G") at the lowest level $52_n$ in the hierarchical argument structure 24.

As mentioned above, it is an advantage of the decision-making system disclosed herein that large quantities of scientific data can be effectively utilized in the decision-making process. For some of the types of decisions processes mentioned above, such as global warming, acid rain, pest/pesticide control, and so on, vast amounts of data have been accumulated by various organizations. In the past, much of these data have been difficult to use in decision-making processes because they have been stored in different databases, at different locations, with different formats, and so on. Information in various databases can be used in a decision-making process using the embodiment of the invention shown in FIG. 6.

In FIG. 6, there is illustrated the lowest level 54n of a hierarchical argument structure. The remainder of the hierarchical argument structure may be similar to the embodiment shown in FIG. 2. In the embodiment of FIG. 5, the hierarchical argument structure has been extended by the addition of an integrated database I-DB1. The integrated database $I-DB_1$ is used as the grounds "$G_1$" of the argument structure unit $28_7$. As shown, the integrated database $I-DB_1$ is formed from a plurality of other databases, i.e. foreign database, F-DB1, $DB_2$, and foreign $DB_3$. Similarly, for the grounds "$G_2$" of the argument structure $28_8$ is an integrated database $I-DB_2$. The second integrated database $I-DB_2$ is formed of the foreign databases $F-DB_3$ and $F-DB_4$. Note that the separate integrated databases may include some of the same data from the same foreign database $F-DB_3$. In this way an expert/scientist contributor who wishes to make a claim, e.g. II, in argument structure unit $28_7$, may utilize as the grounds for his or her claim scientific, data located in more than one location (e.g. database). This is useful in showing how a single claim may be supported by a wealth of material which may be located in various database. On the other hand, by integrating the data from a plurality of foreign databases, it may show that although a claim is supported by data in various databases, the data may be duplicative.

B. Terminology Conversion Dictionary

Figure 7:
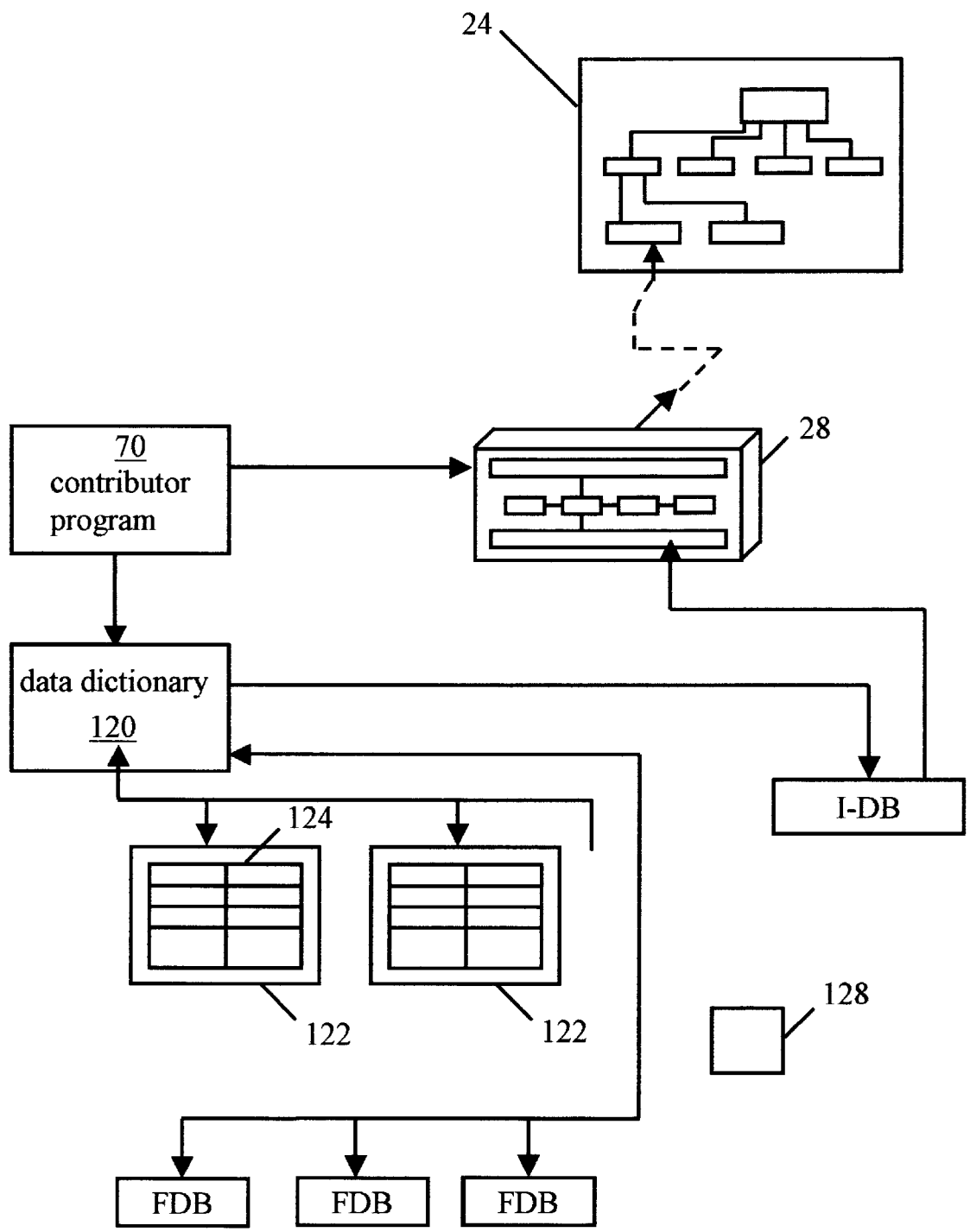
FIG. 7 is a flow chart showing a portion of another embodiment of the decision-facilitating system incorporating a data dictionary for use with multiple foreign databases.

In the previous embodiment, the extension of the hierarchical argument structure to include integrated databases enhances the ability of the hierarchical argument system to incorporate relevant scientific assessment information thereby facilitating the decision-making process. In a further embodiment, use of integrated databases is facilitated by a data dictionary model program 120 shown in FIG. 7.

As mentioned above, although there may be many databases that include scientific data that can be brought to bear on a decision by providing grounds upon which a hypothesis can be warranted, these databases may include such information in different formats and even different languages. In order to utilize these different databases, it may be desirable to form an integrated database, as described above.

The data dictionary program 120 works with the contributor programming means 70. The data dictionary model program 120 serves as a tool that can be used by the user-contributor to incorporate various foreign databases automatically. The data dictionary program 120 uses a plurality of translation tables 122. The tables 122 include keywords 124 from all the foreign databases. Common keywords are identified as well as synonyms. A set of common keywords and synonyms is formed as well as references from one terminology to another. The user-contributor is able to use the data dictionary 120 to form a query. The query formed by the user-contributor is then translated, if necessary, into the terminology and format each of the different foreign databases F-DB. The data dictionary program 120 then sends the queries to each of the foreign databases in the native format of the foreign database. Each of the foreign databases then returns appropriate data. Using these data returned from the foreign databases, the integrated database I-DB is then formed. The translation tables 122 and data dictionary are also used when the data are imported from the foreign databases since the data may require translation from the format, structure, and language of the foreign database into a "generic" format (or data model) of the integrated database. The integrated database I-DB is then used by the user-contributor to provide grounds for a hypothesis in the argument unit $28_7$ to be added to the hierarchical argument structure 24.

In forming the data dictionary program and translation tables, the foreign databases may be polled in advance to obtain their data elements, specifications, and so on. This may also typically involve creating appropriate indices and making adjustments of various parameters from one database format to another. Once the structures of each of the foreign databases is obtained, they may be queried to obtain the keywords, vocabulary, and other information that are used to develop the translation tables.

C. Automatic Claim Generator

Figure 8:
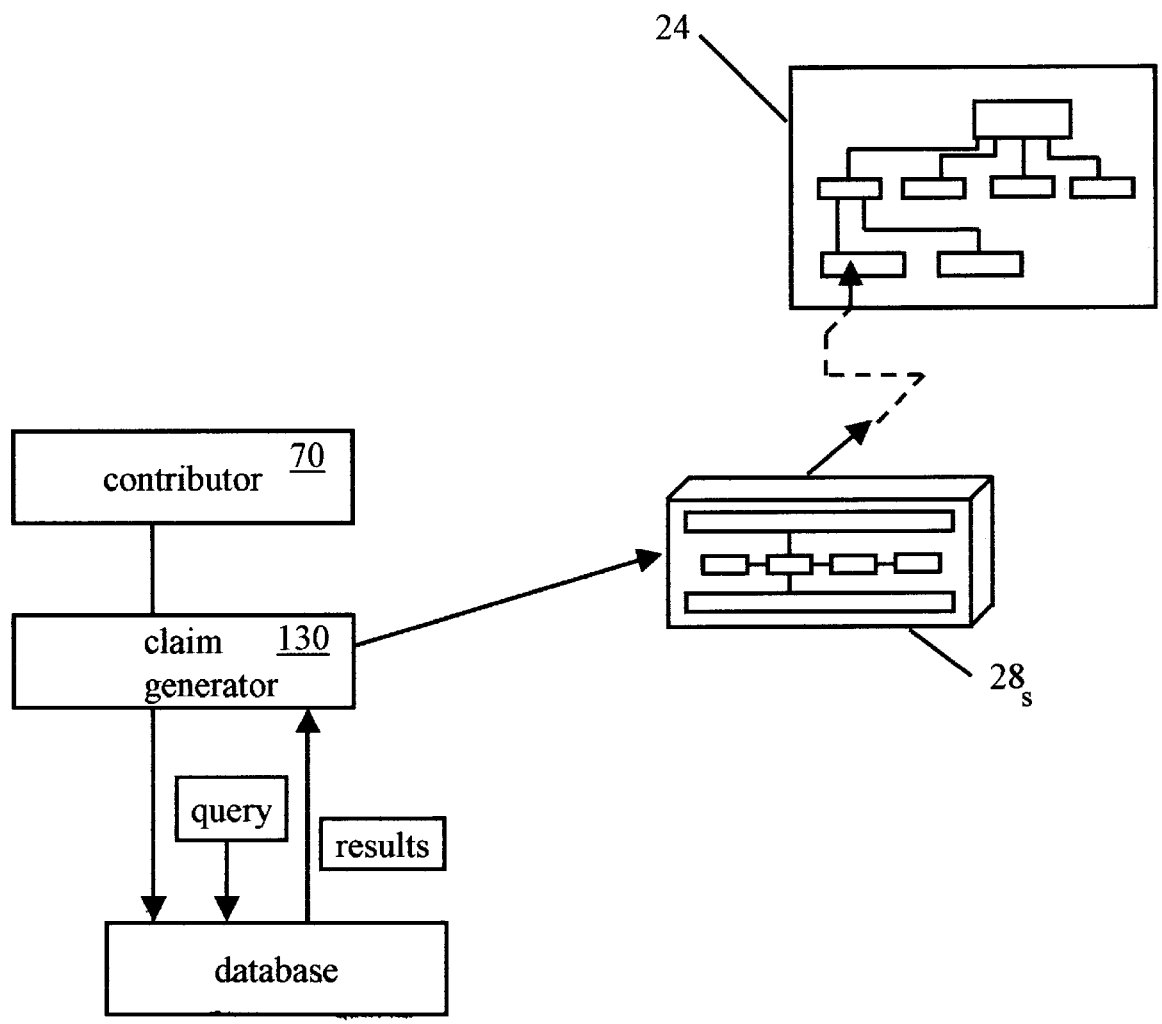
FIG. 8 is a flow chart showing a portion of another embodiment of the decision-facilitating system incorporating an automatic claim generator feature.
Figure 9:
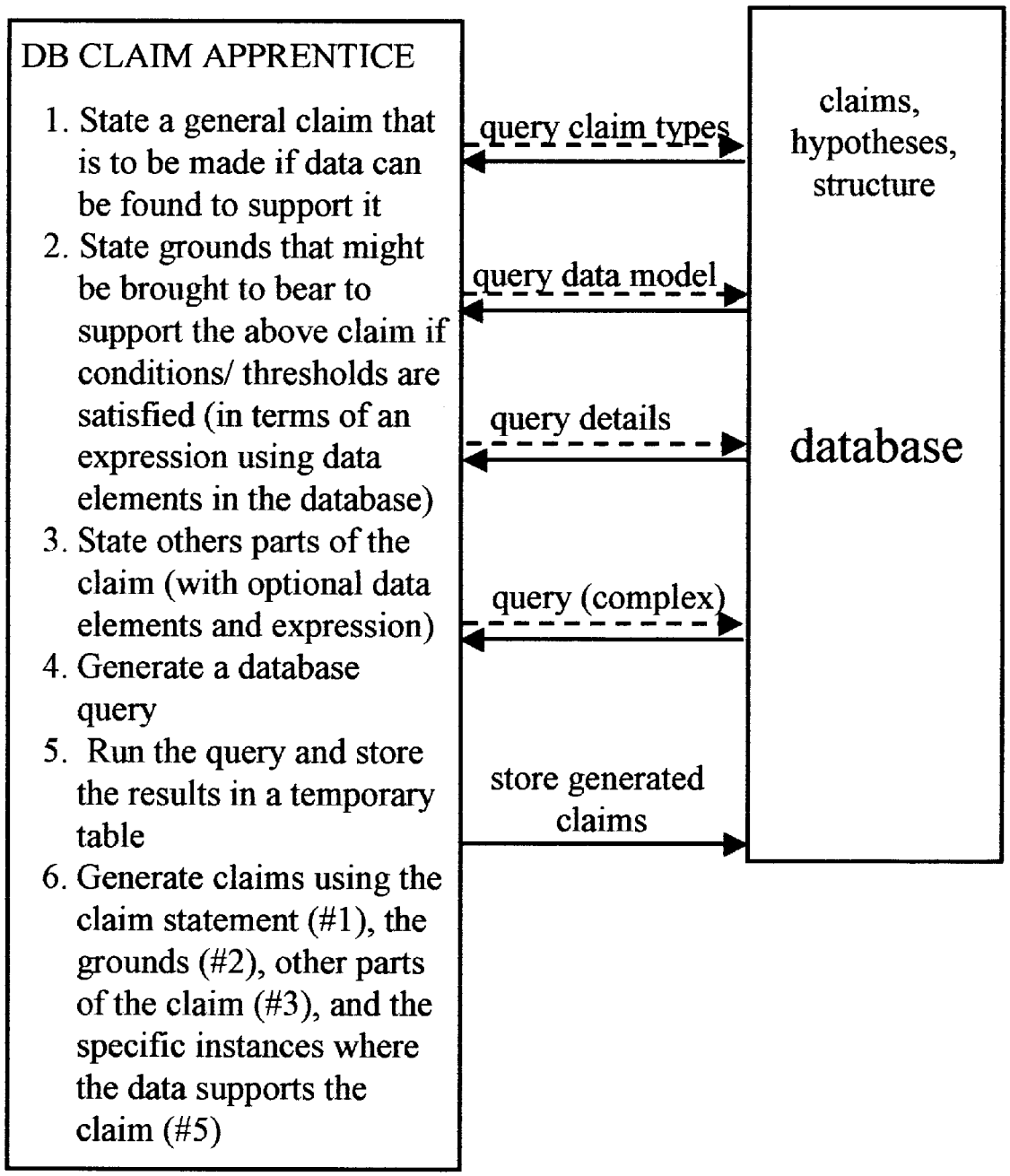
FIG. 9 is a diagram showing additional features of the automatic claim generator of FIG. 8.

Another embodiment of the hierarchical argument structure program provides for a feature that enables a user-contributor to automatically generate claims. As mentioned above, use of scientific databases provides the grounds for claims or hypotheses made by user-contributors. In the embodiment in FIG. 8, a claim generator program 130 works in conjunction with the contributor program means 70. The user-contributor operates the claim generator program 130 to query a database. The database may be a single database or may be an integrated database, as described above. The user-contributor may have a hypothesis that he or she wants to add to the hierarchical argument structure. The user-contributor may know (or may suspect but not be sure) that the database includes data that provides grounds that support the hypothesis. However, the user-contributor may not be aware specifically of all the data in the database the supports the hypothesis. The automatic claim generator program 130 accepts an input query from the user-contributor. The query is in a form of a search of the database for all data meeting certain criteria. The result of the query is all data that provides support for the hypothesis. If the claim generator program 130 finds data in the database that matches the query, the claim is automatically generated and an argument structure unit $28_S$, including the claim supported by the data, is added to the hierarchical argument structure. In this manner, a user-contributor may be able to access data and use the data in support (or against) a claim even if the user-contributor is not aware specifically of the data. The flowchart of FIG. 9 shows additional aspects of the automatic claim generation program 130

D. Facilitated Scientific Argument

Figure 10:
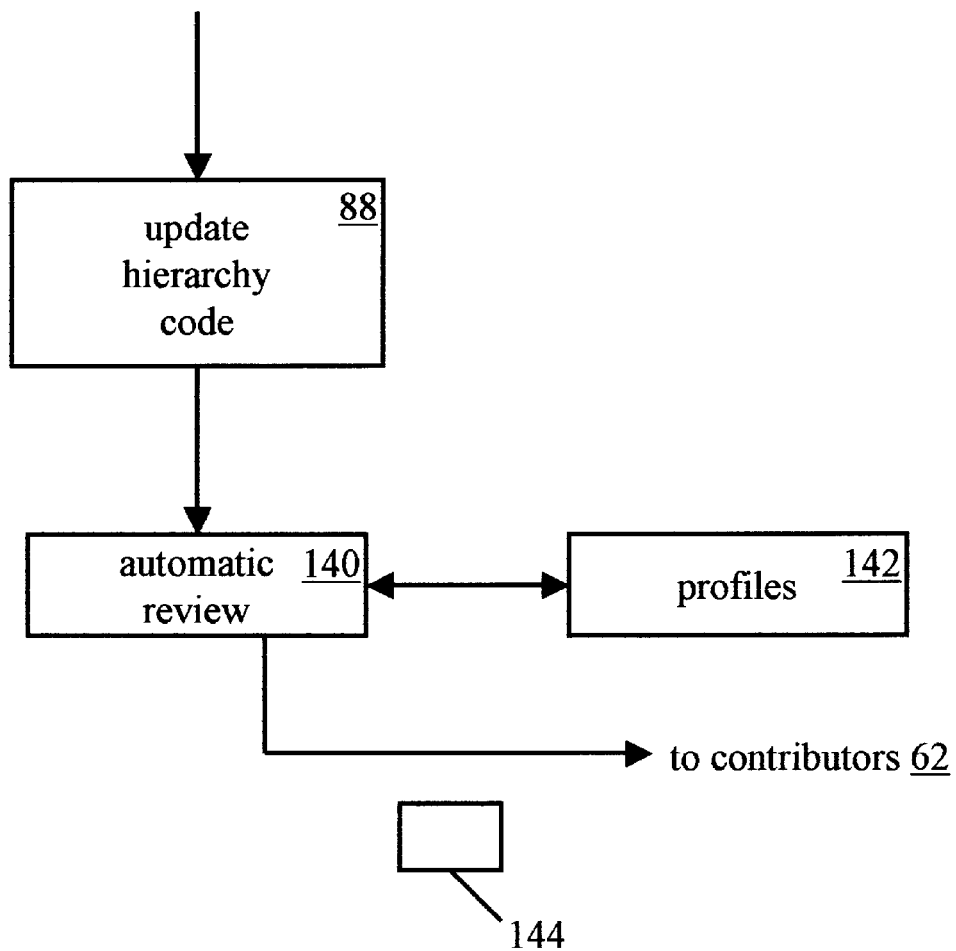
FIG. 10 is a flow chart showing a portion of another embodiment of the decision-facilitating system incorporating an automatic peer review feature.
Figure 11:
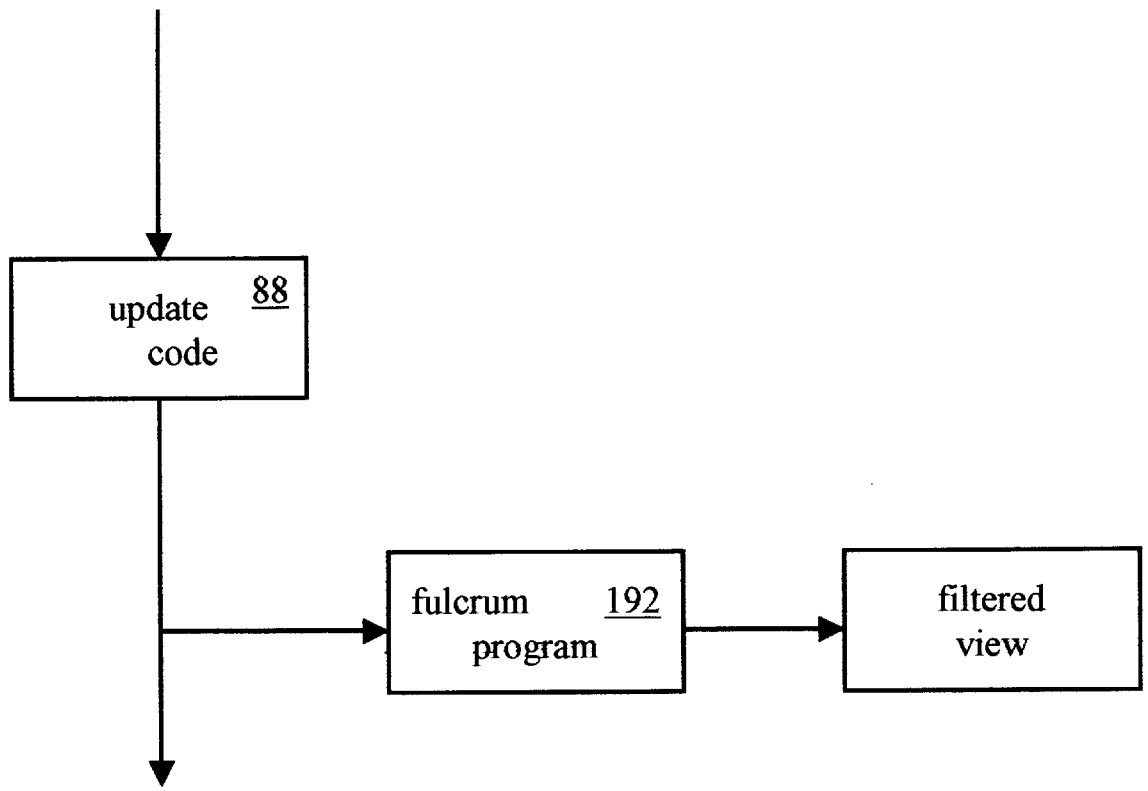
FIG. 11 is a flow chart showing a portion of another embodiment of the decision-facilitating system incorporating a fulcrum analysis of claims feature.
Figure 12A:
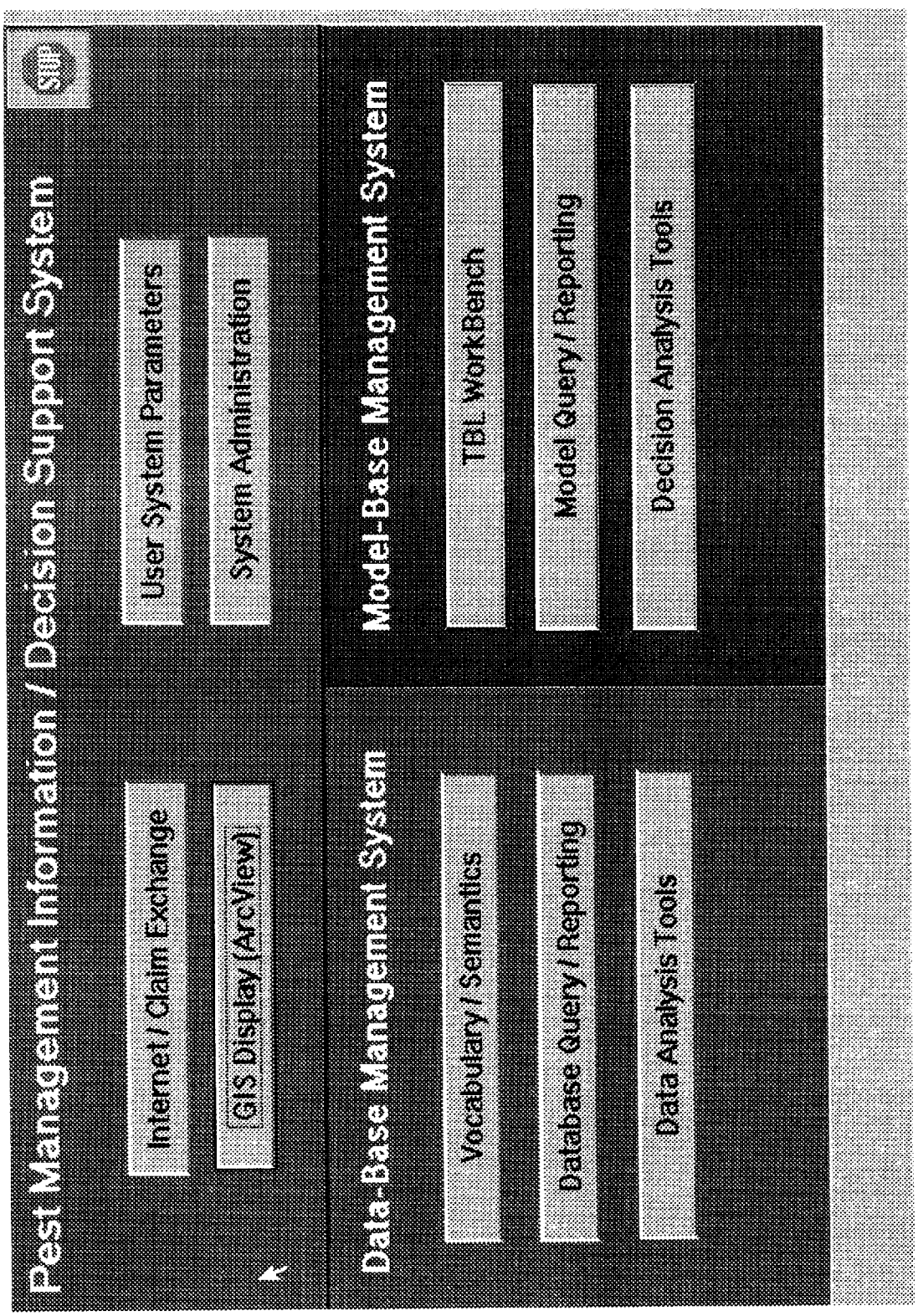
FIGS. 12A–12OO are screen displays showing use and operation of the software program, contributor programming code, and additional programming
Figure 12B:
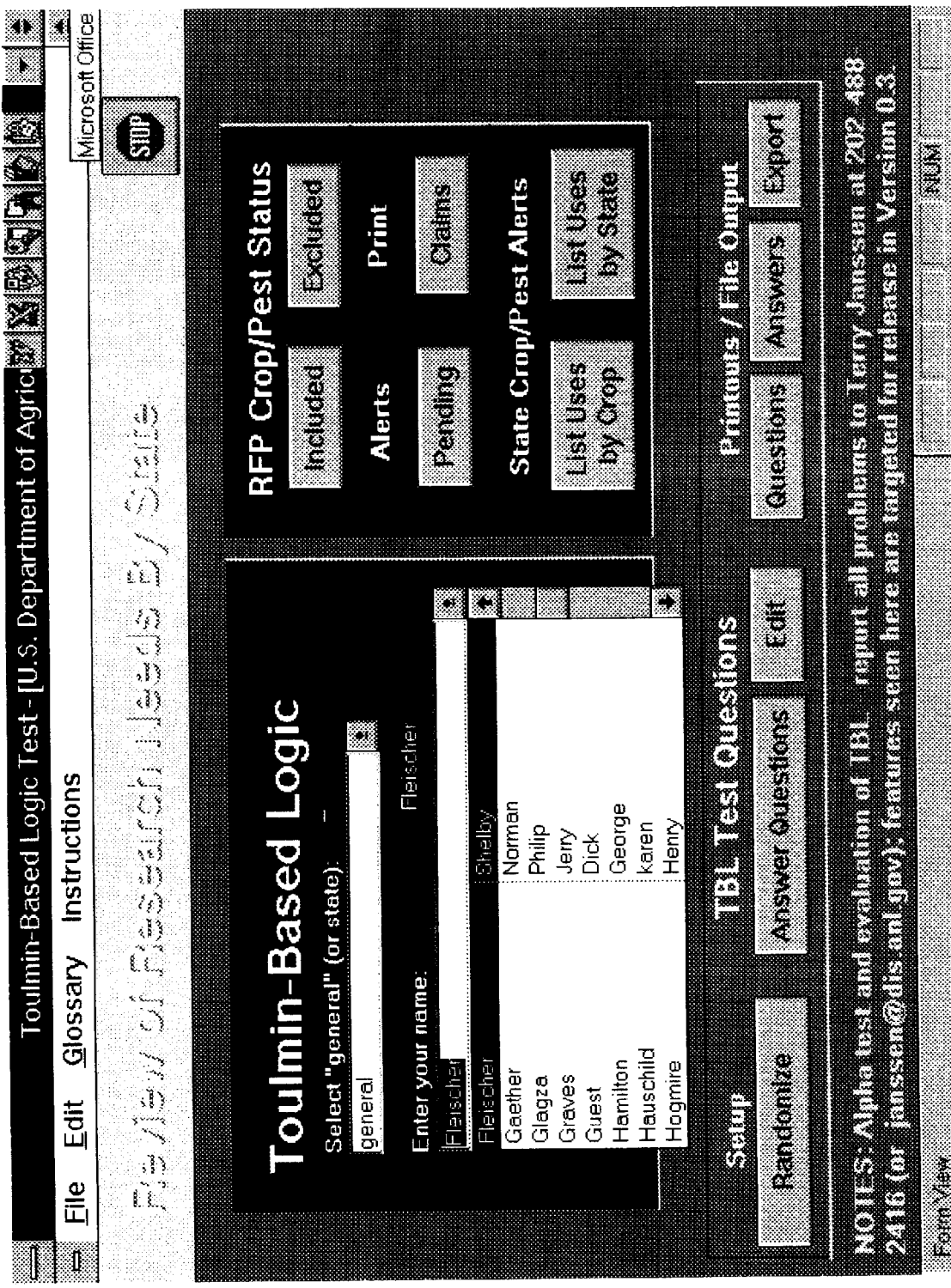
Figure 12C:
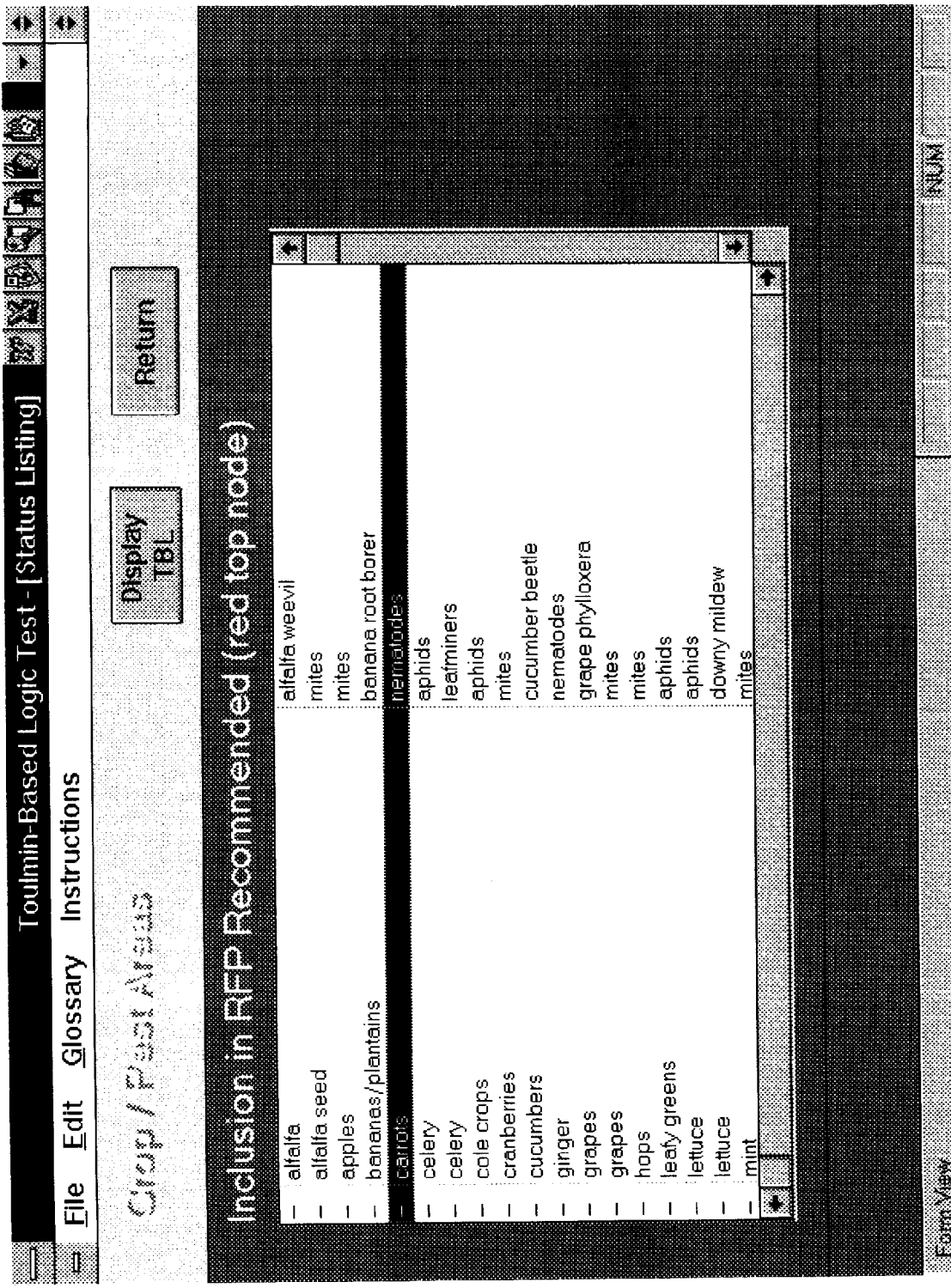
Figure 12D:
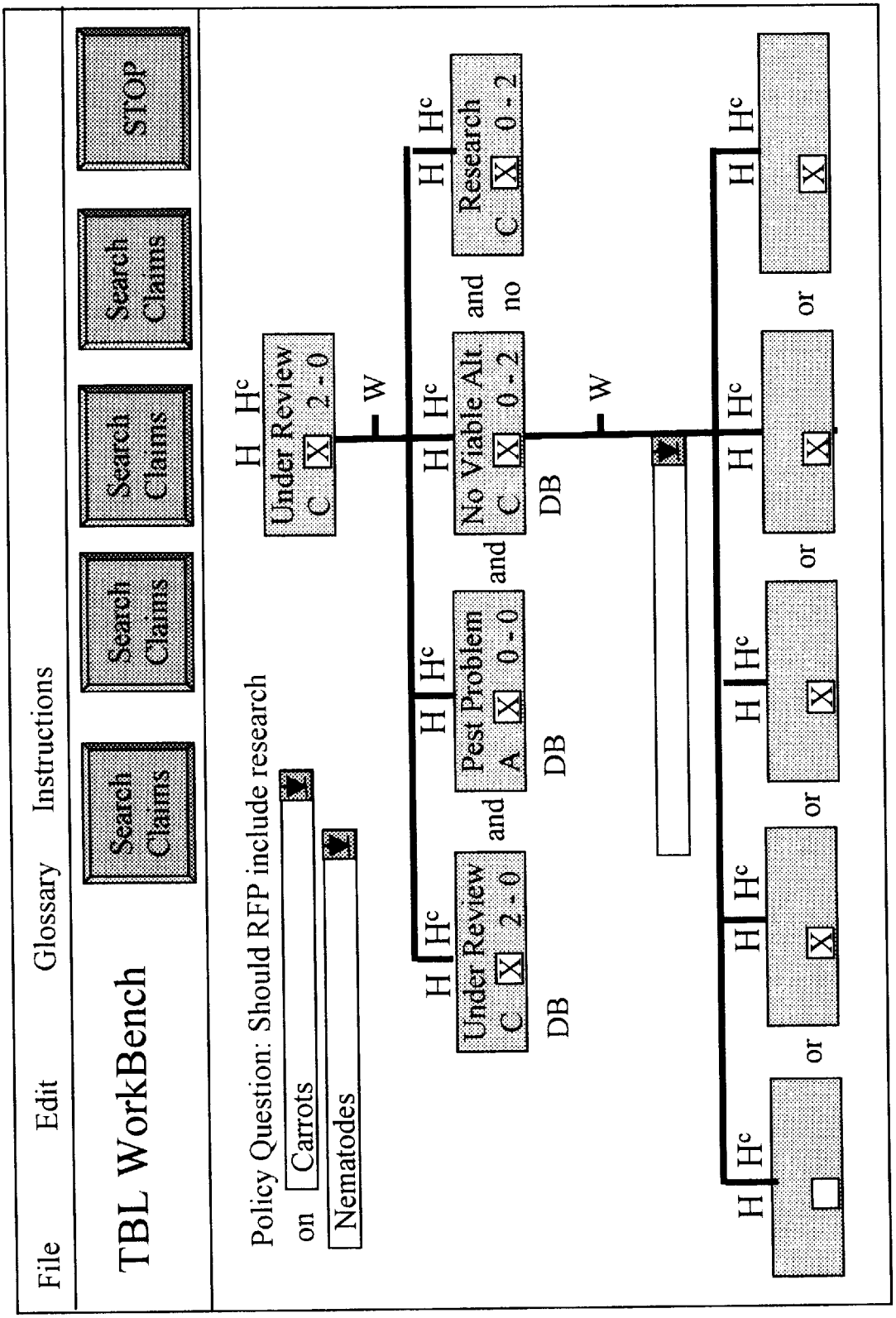
Figure 12E:
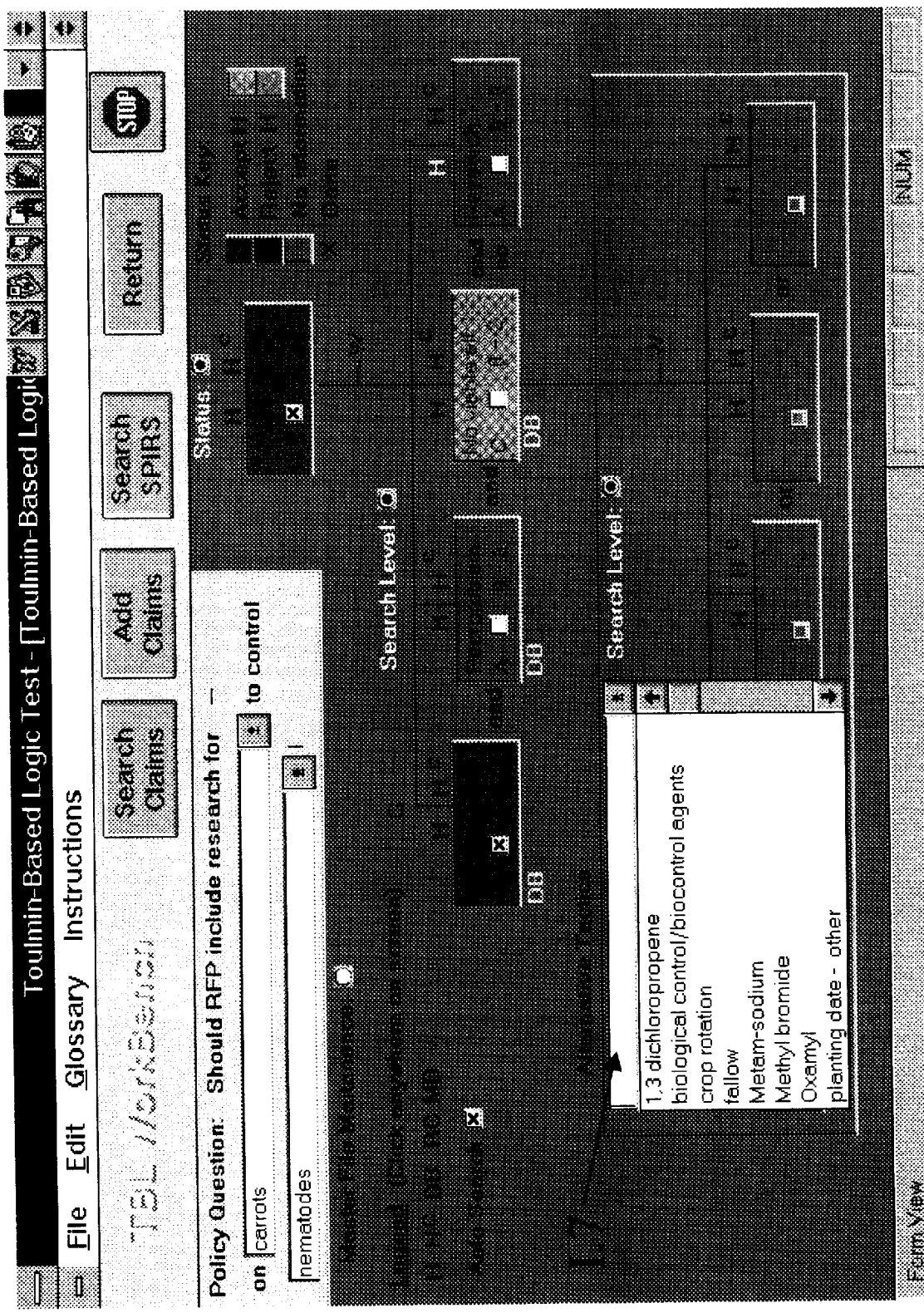
Figure 12F:
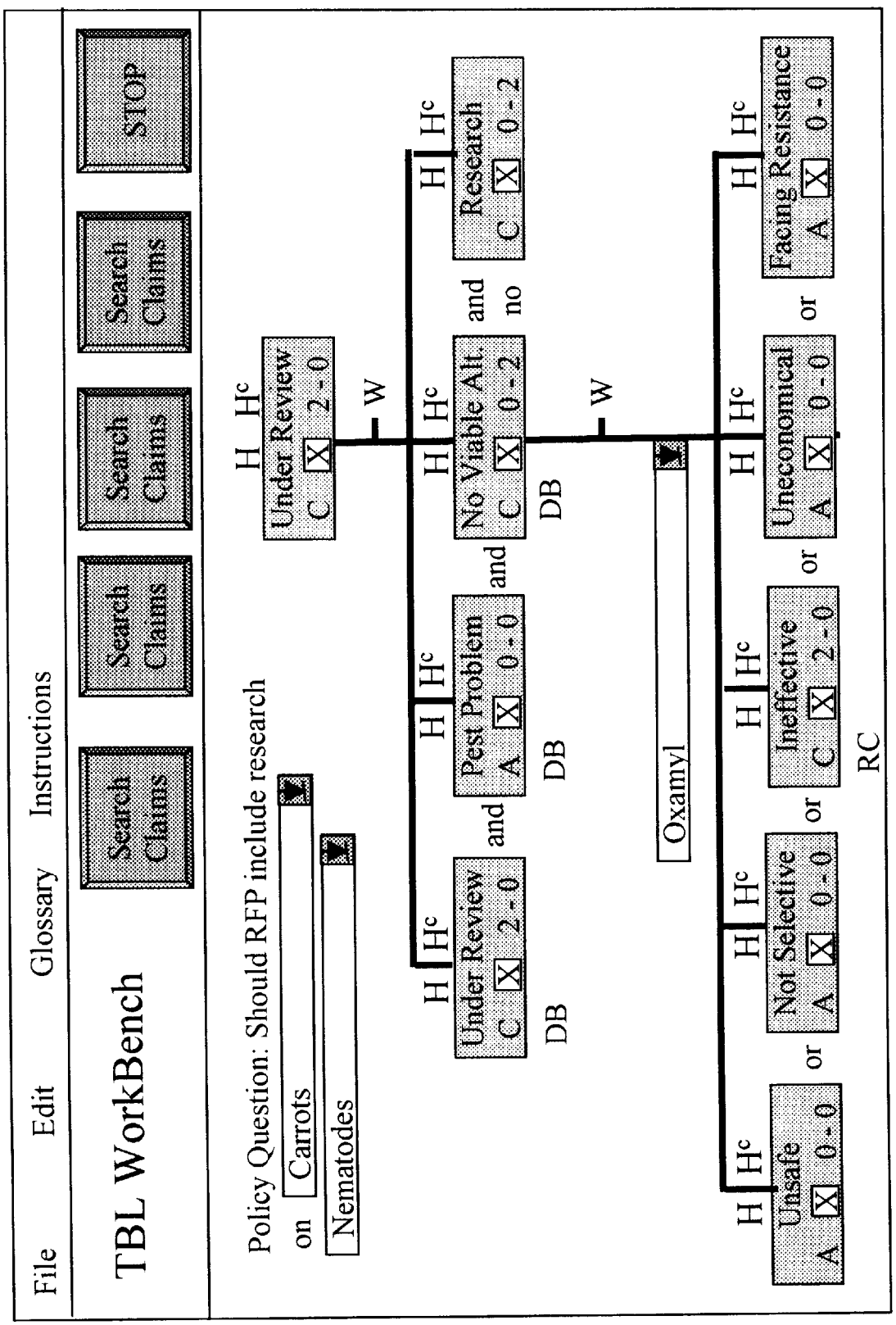
Figure 12G:
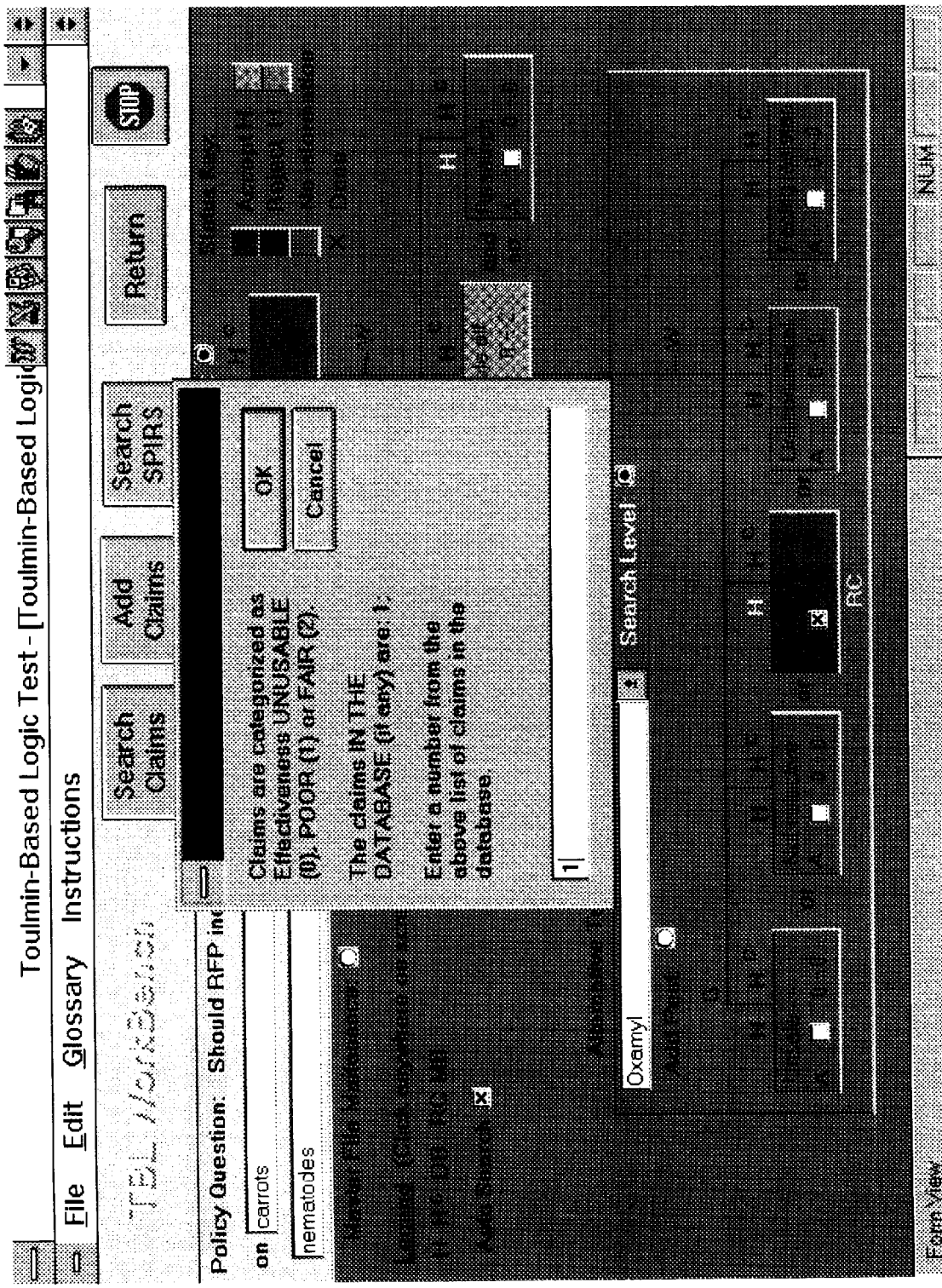
Figure 12H:
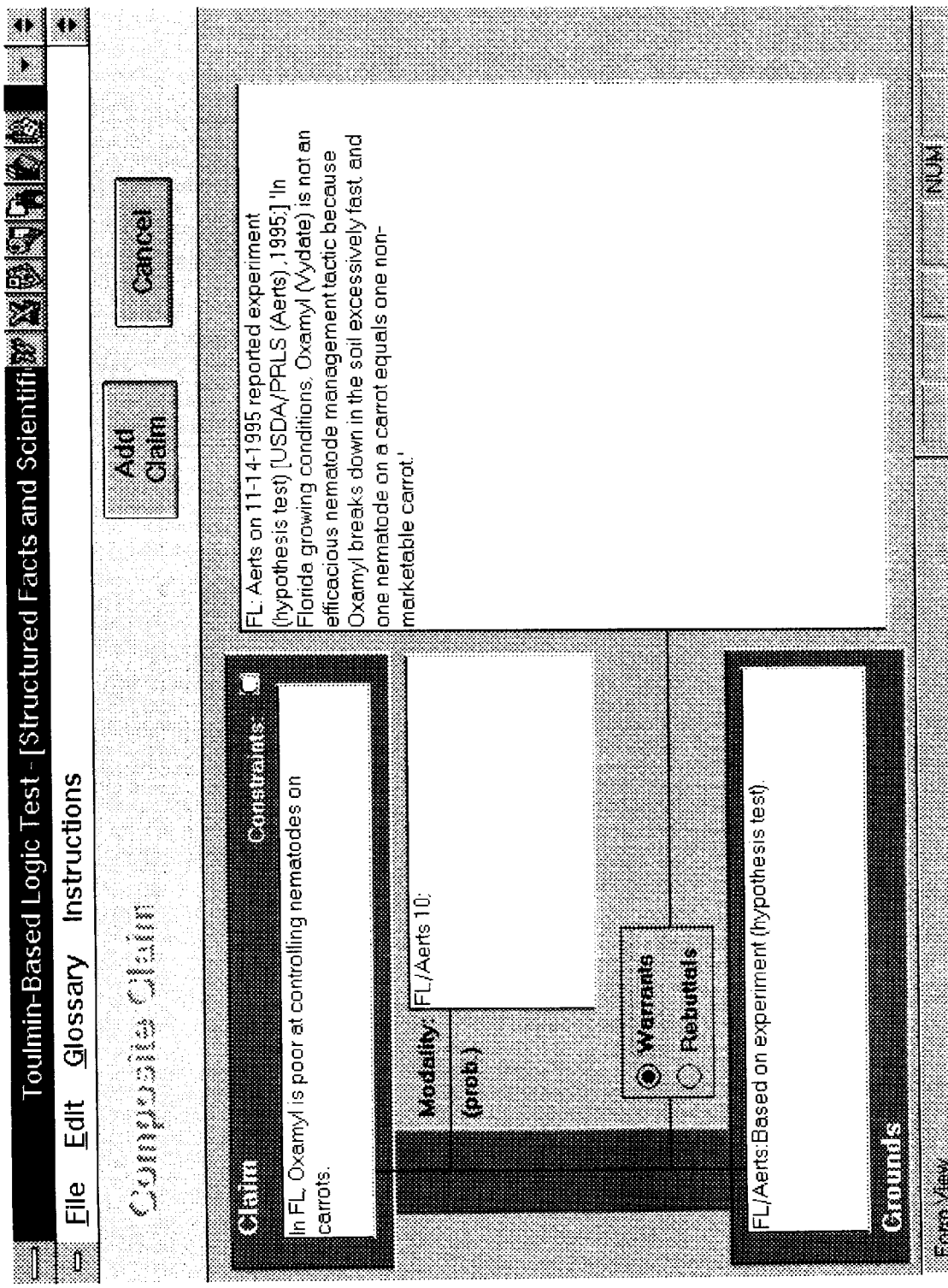
Figure 12I:
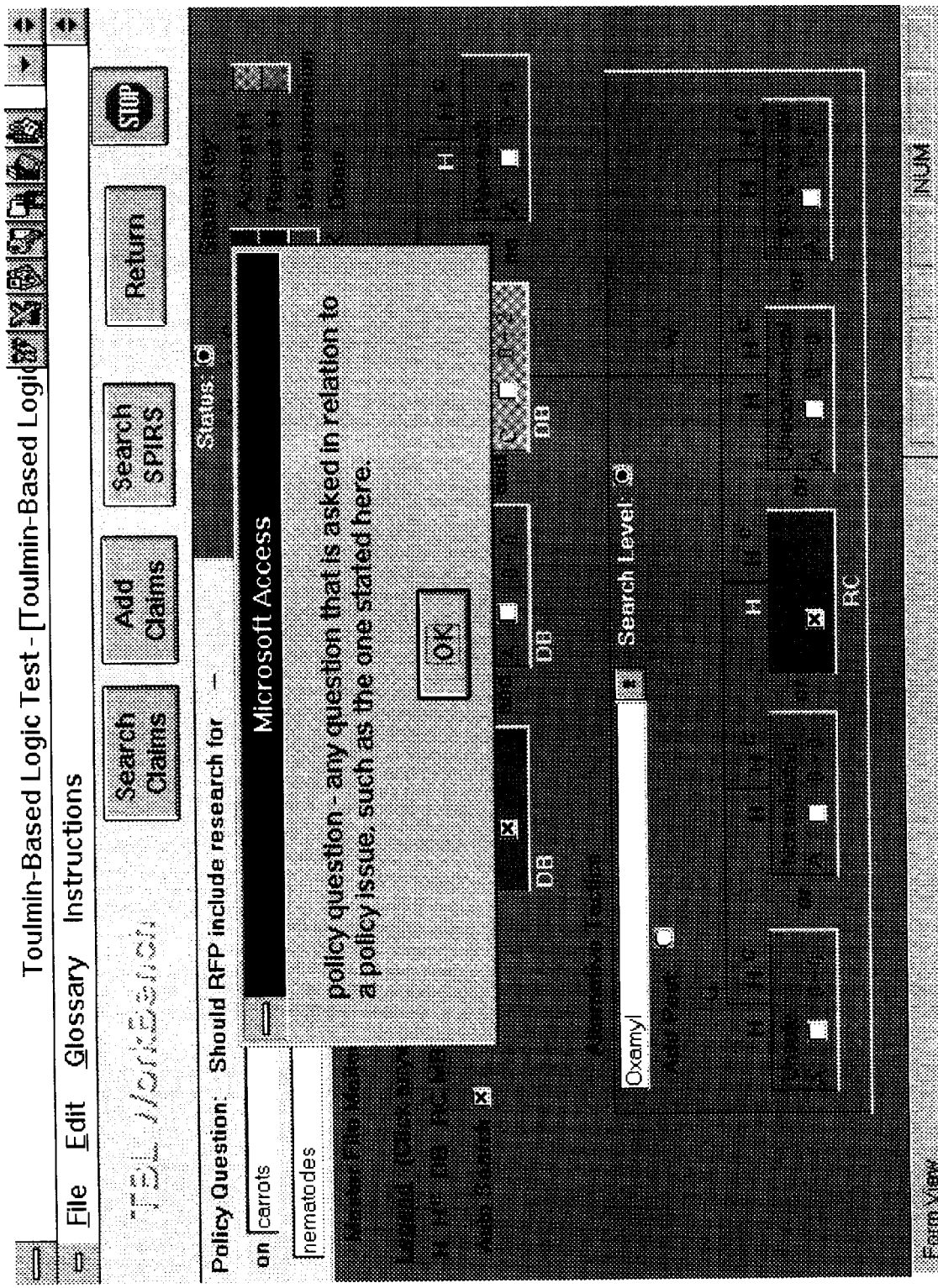
Figure 12J:
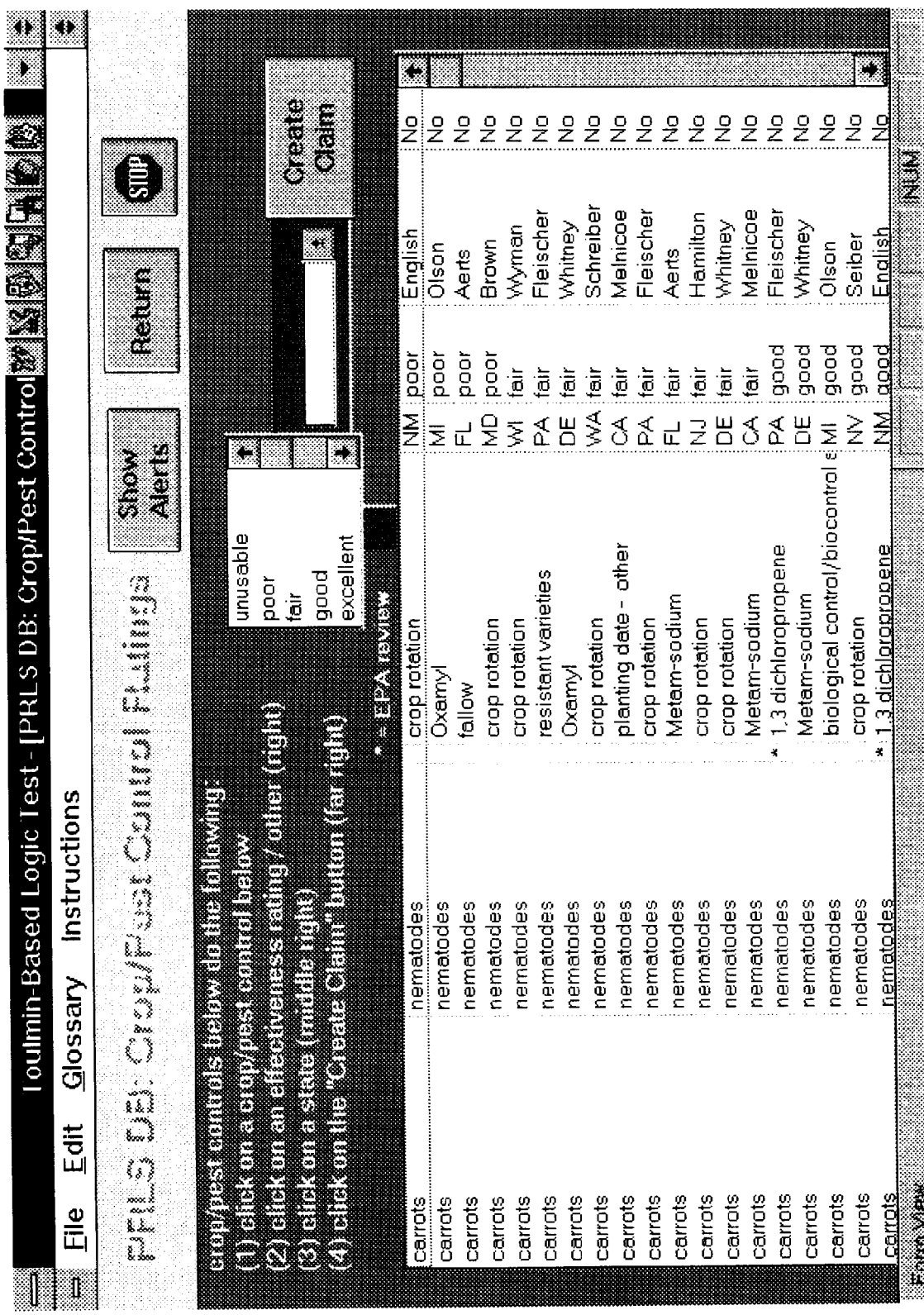
Figure 12M:
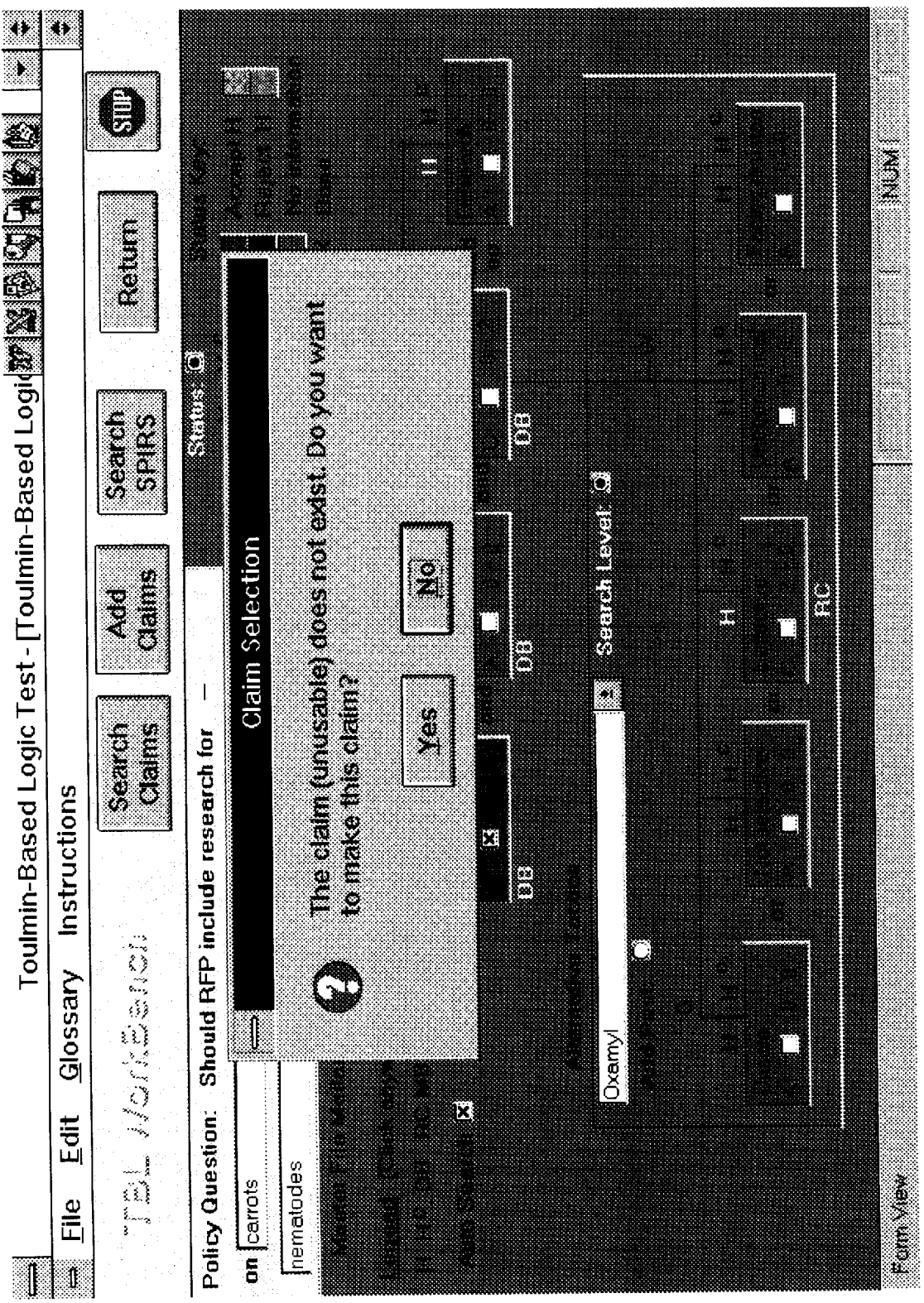
Figure 12N:
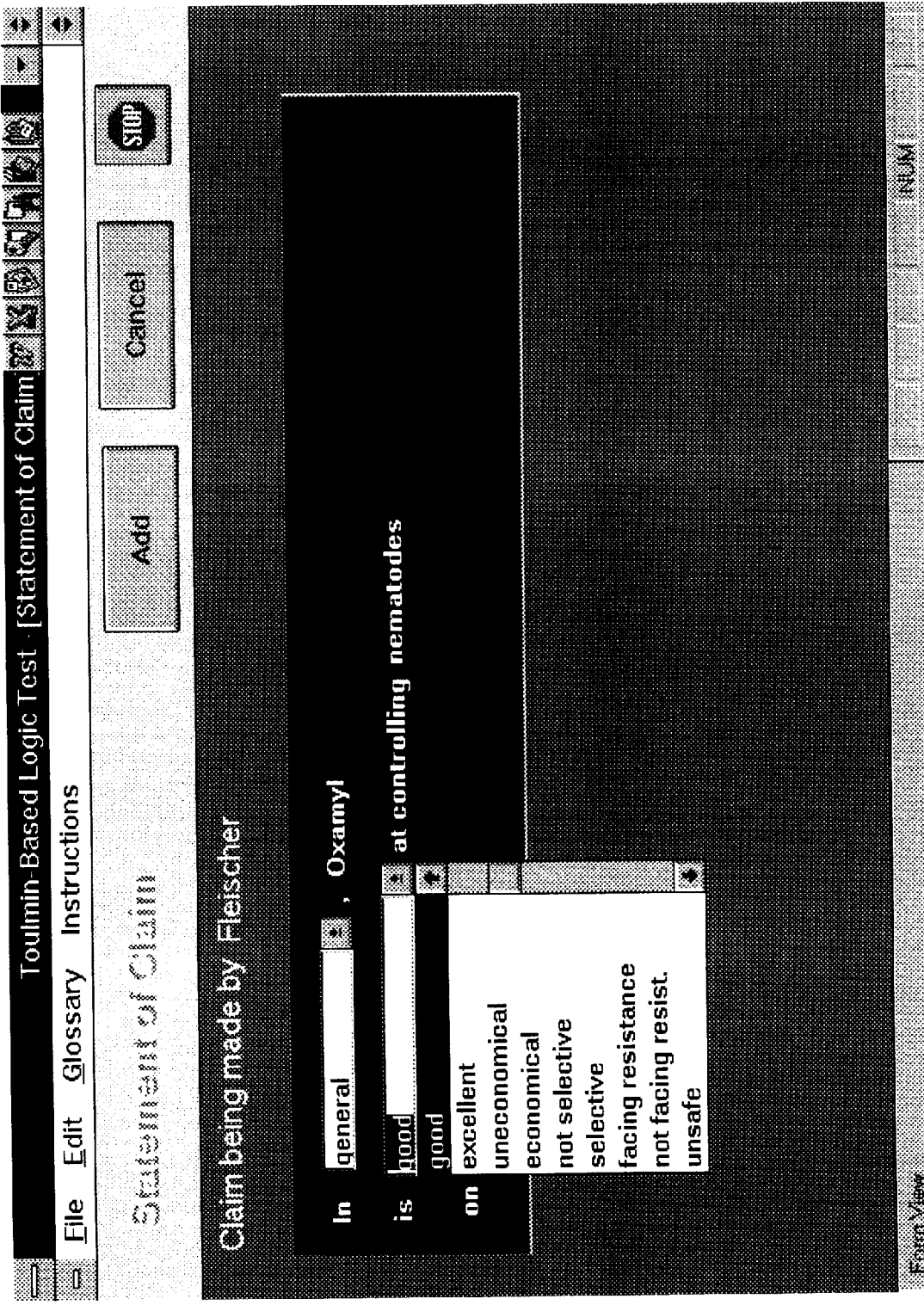
Figure 12O:
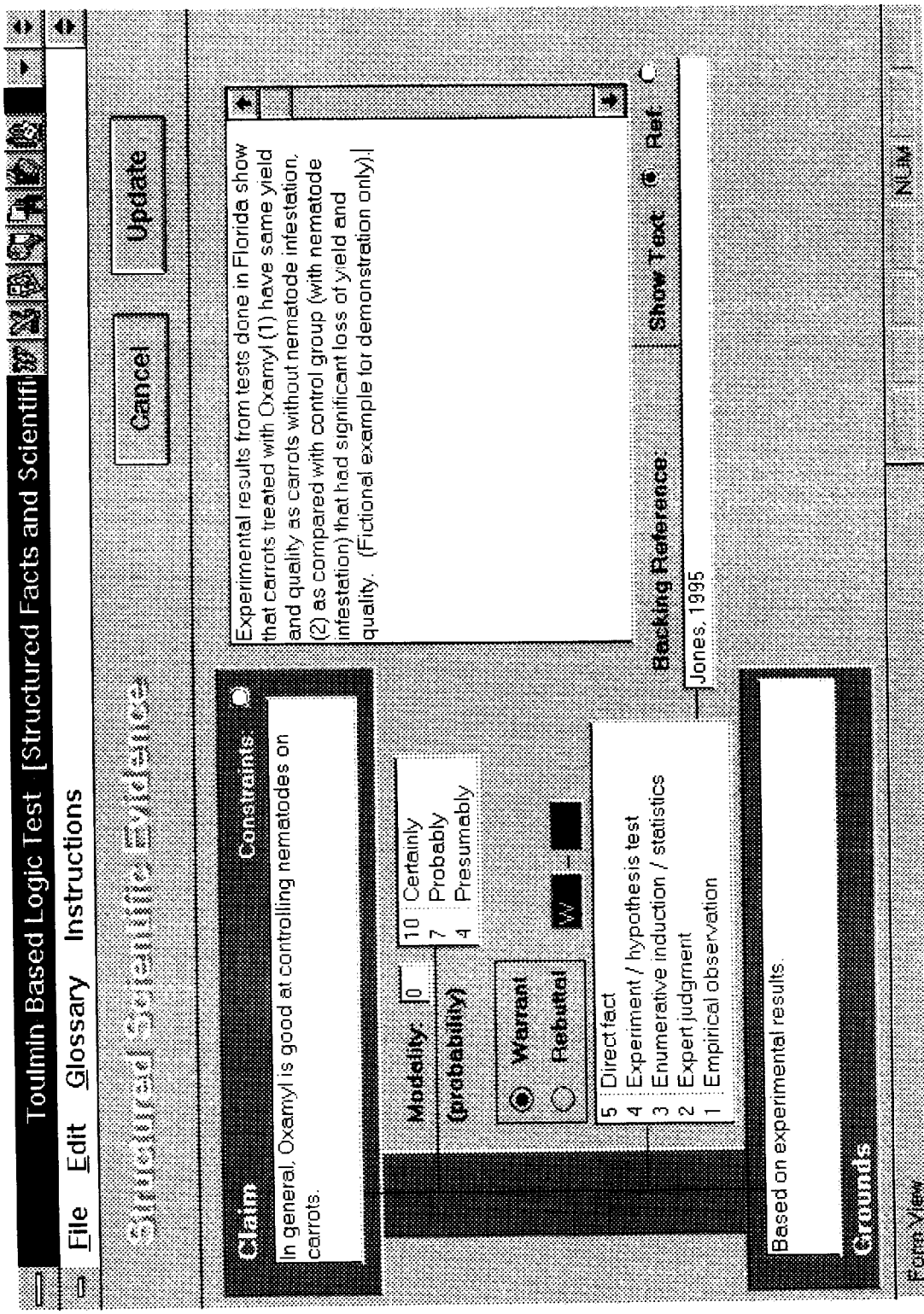
Figure 12P:
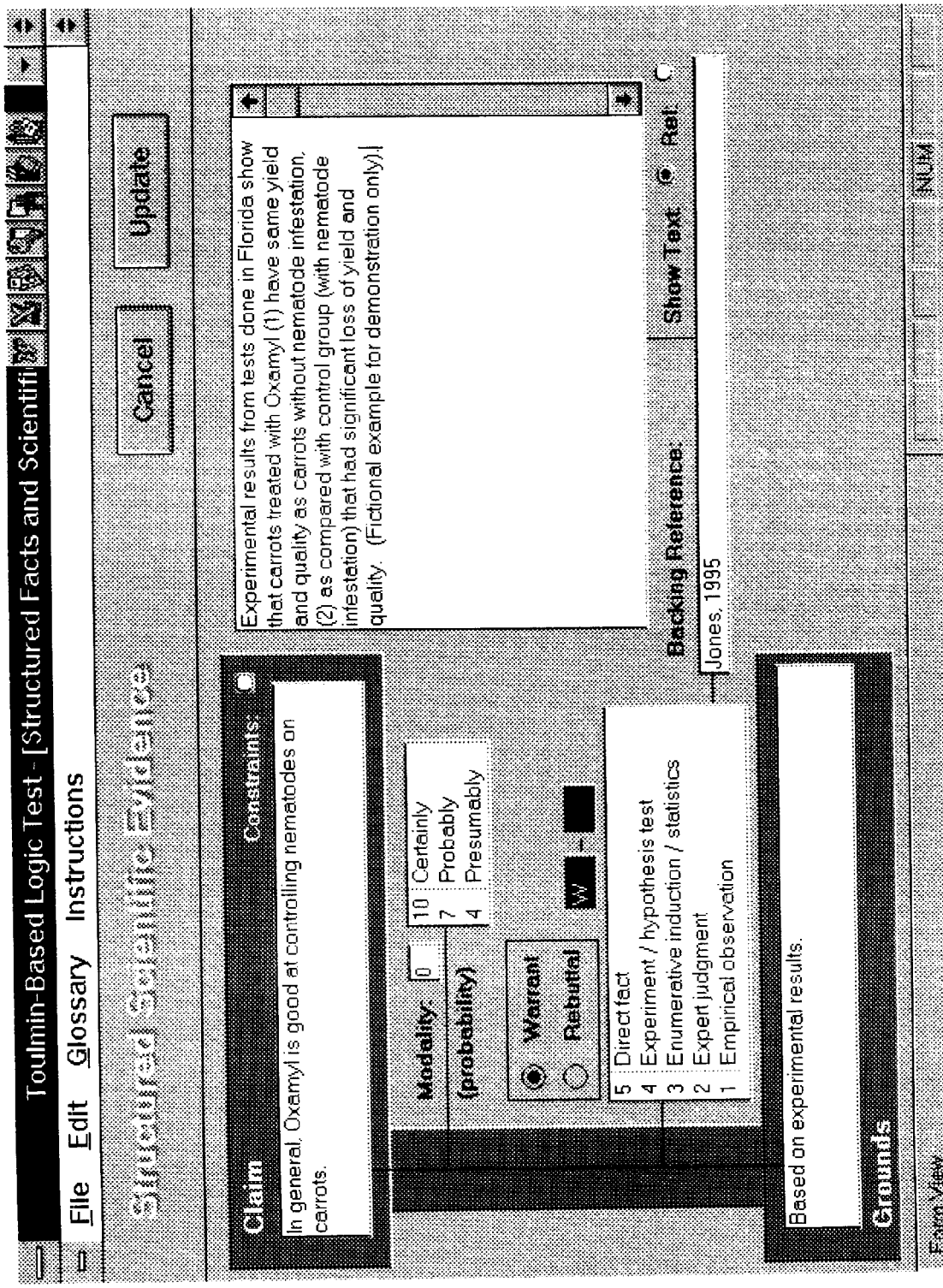
Figure 12Q:
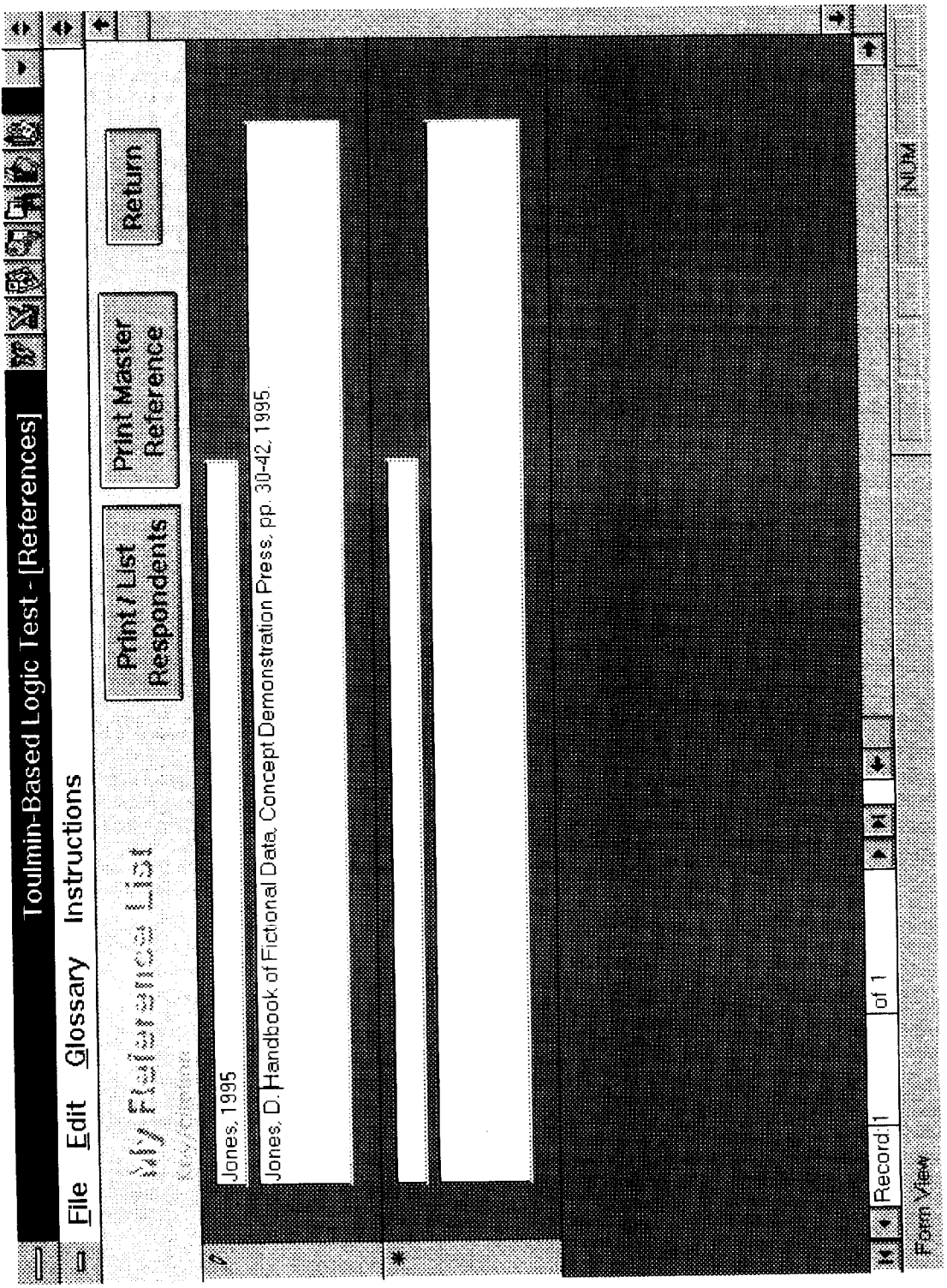
Figure 12R:
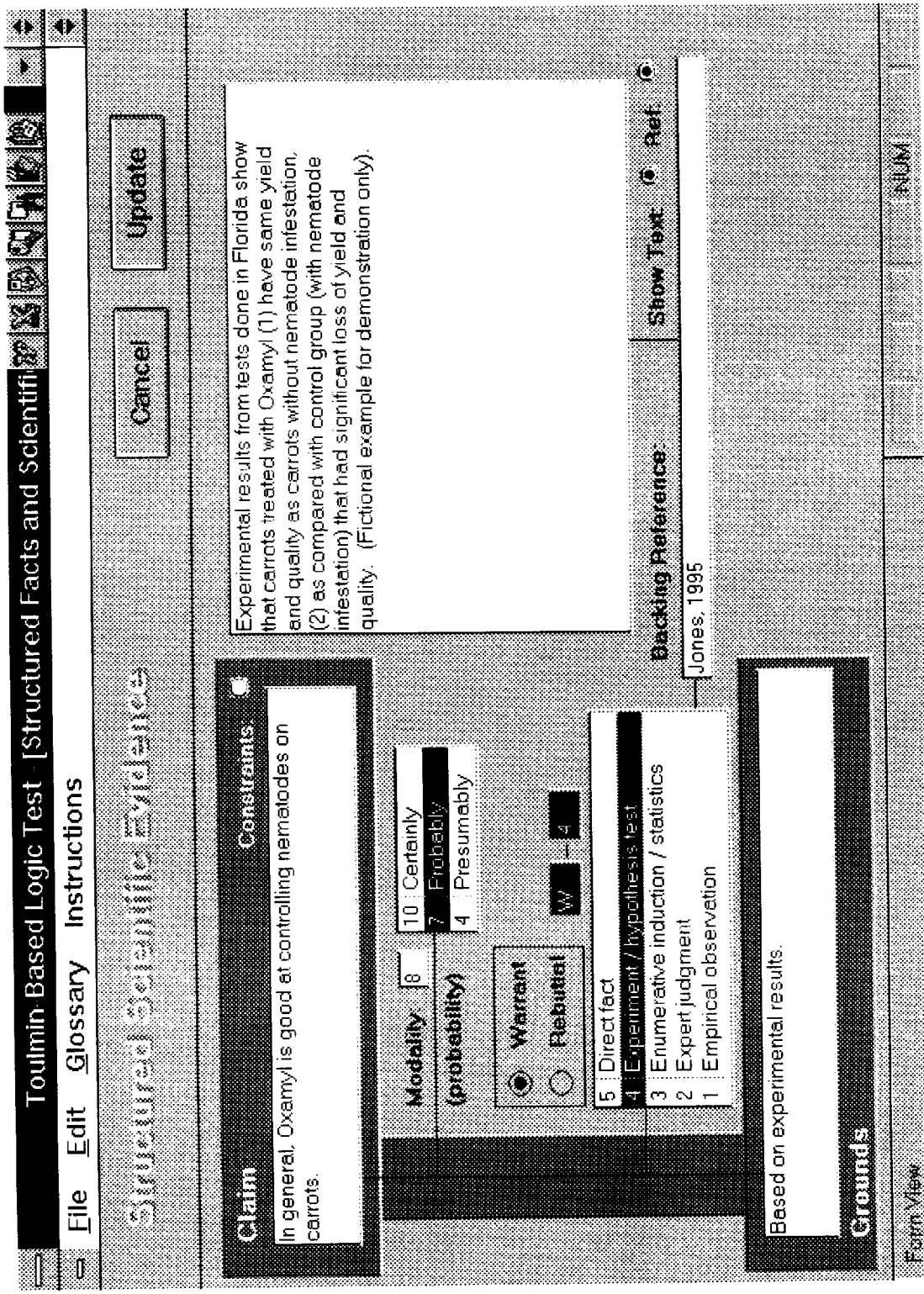
Figure 12S:
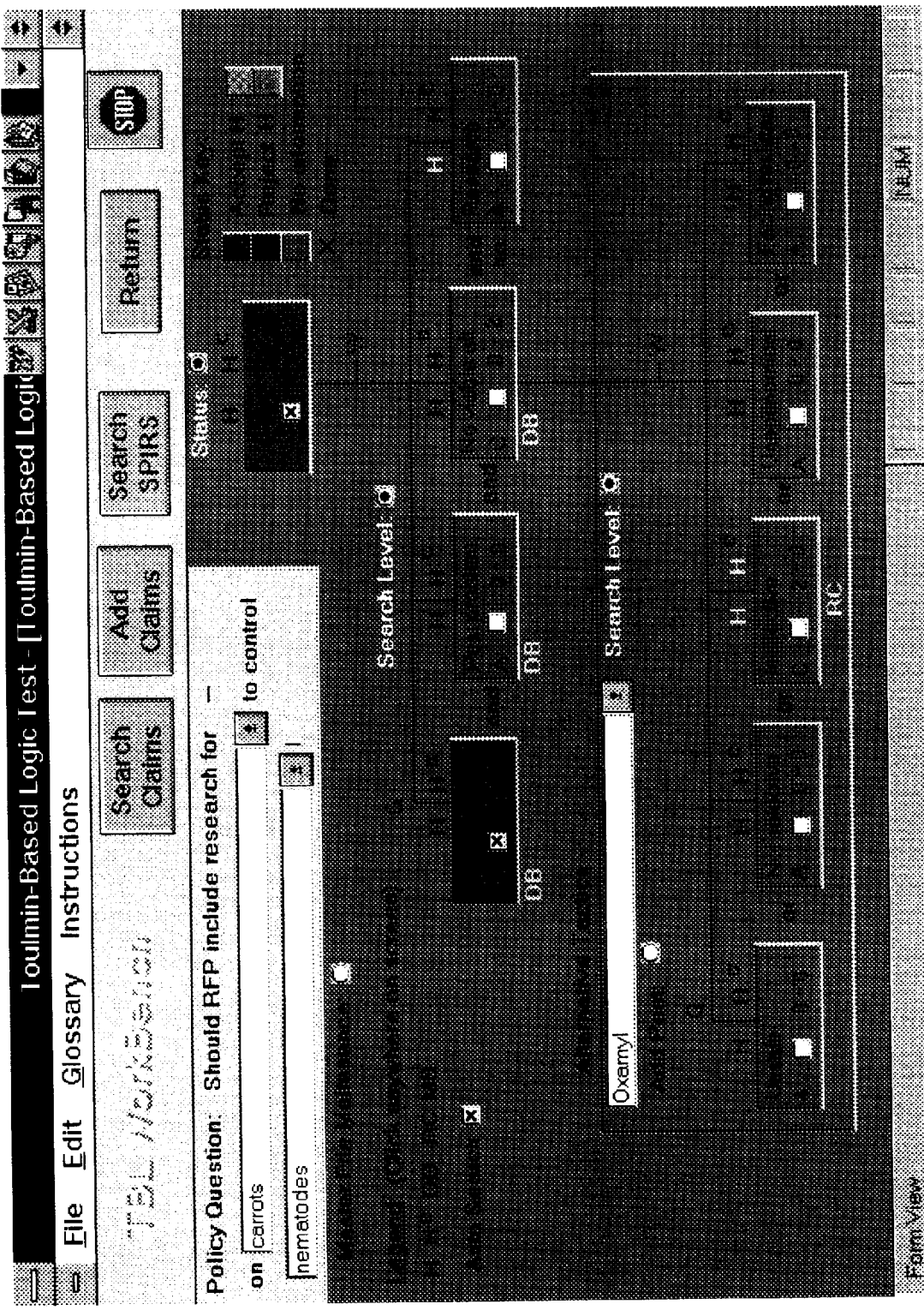
Figure 12T:
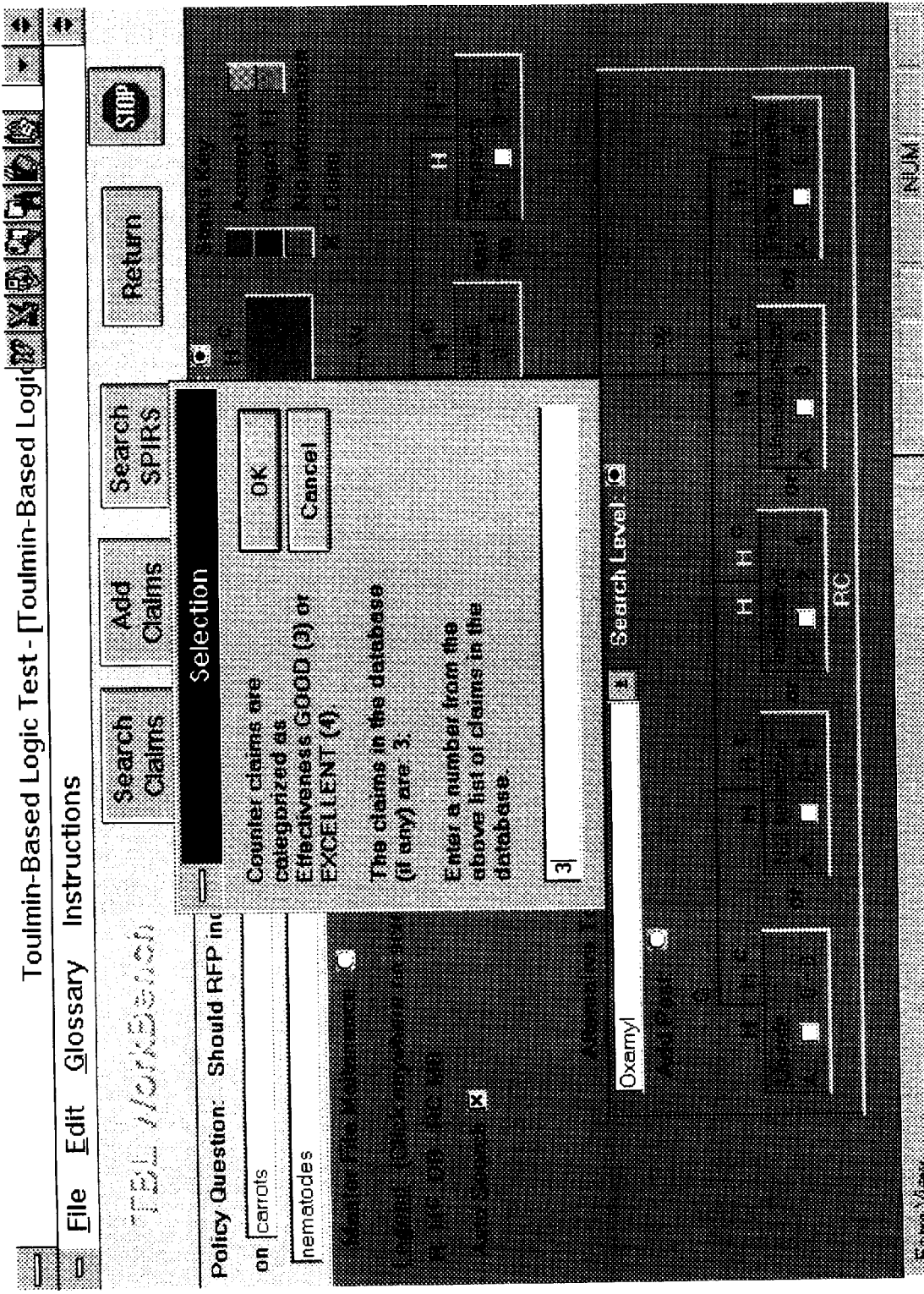
Figure 12U:
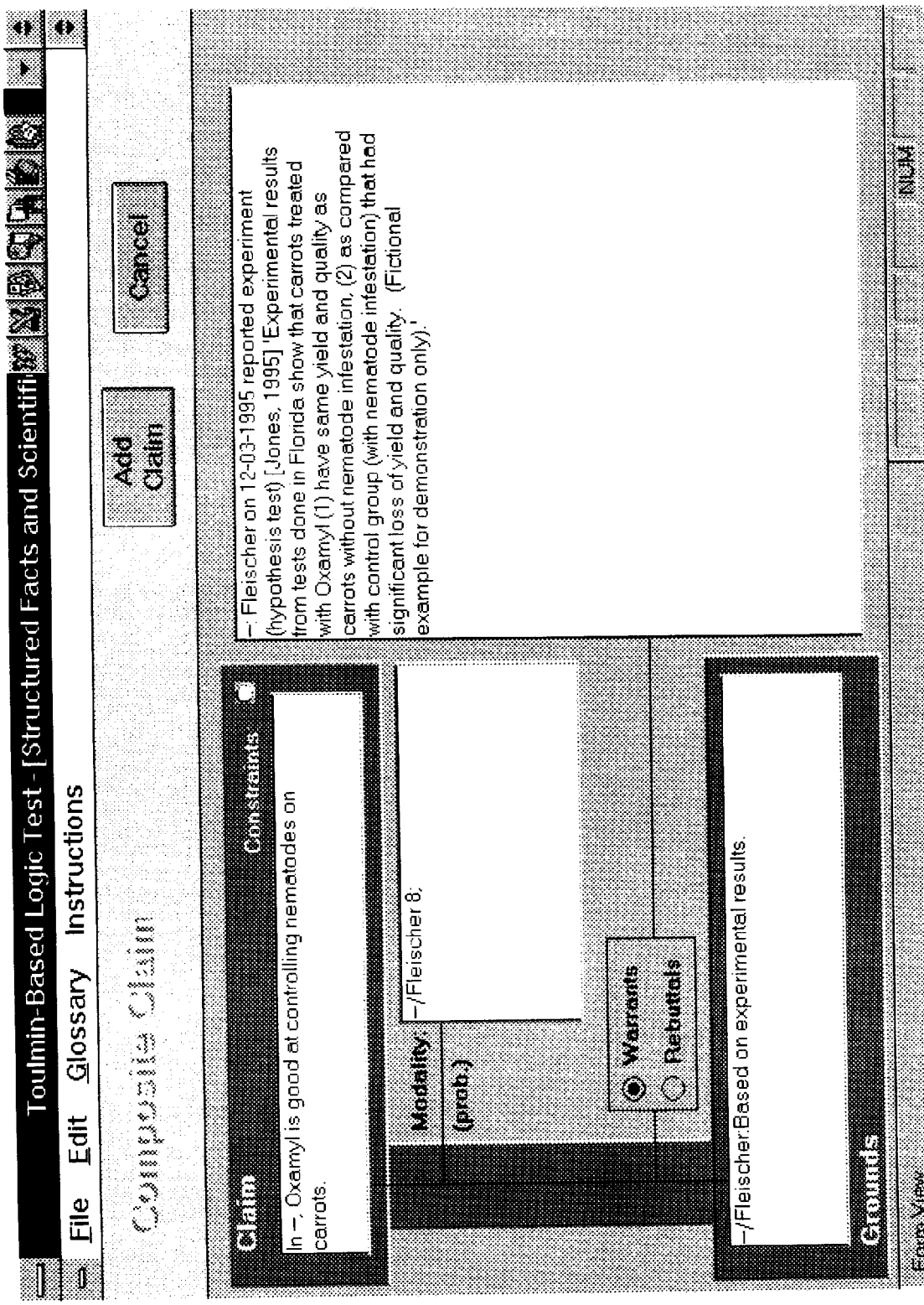
Figure 12V:
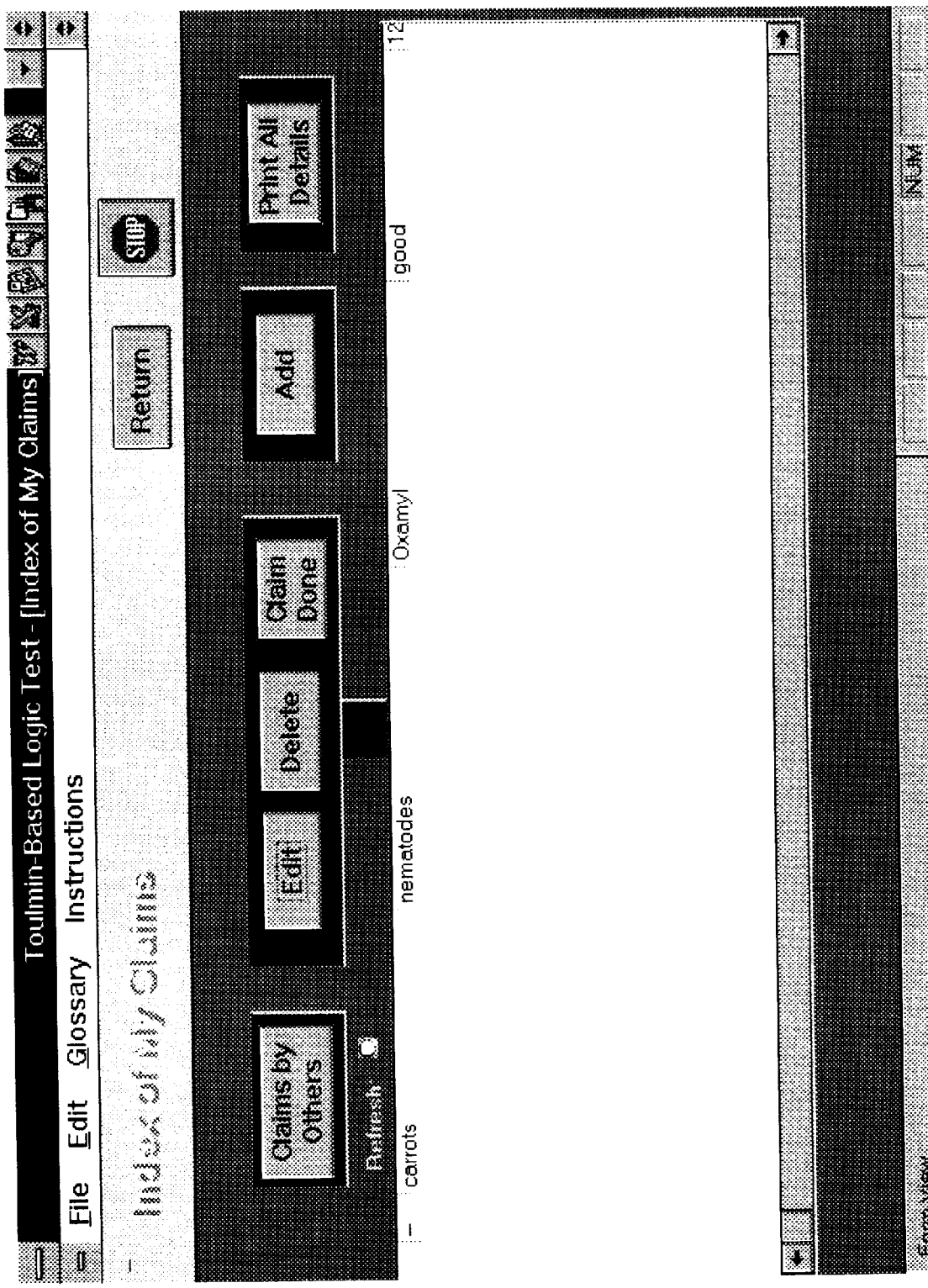
Figure 12W:
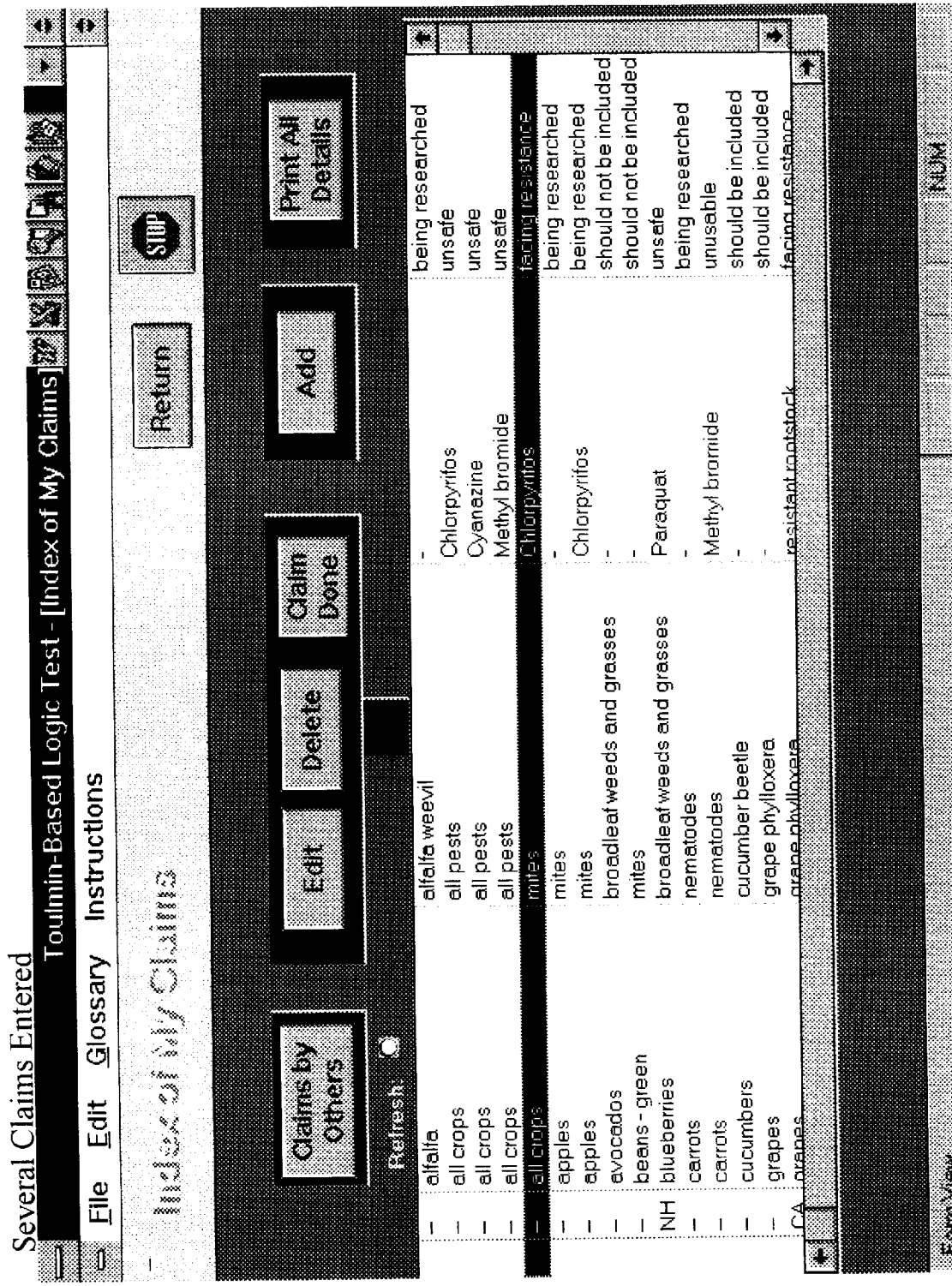
Figure 12X:
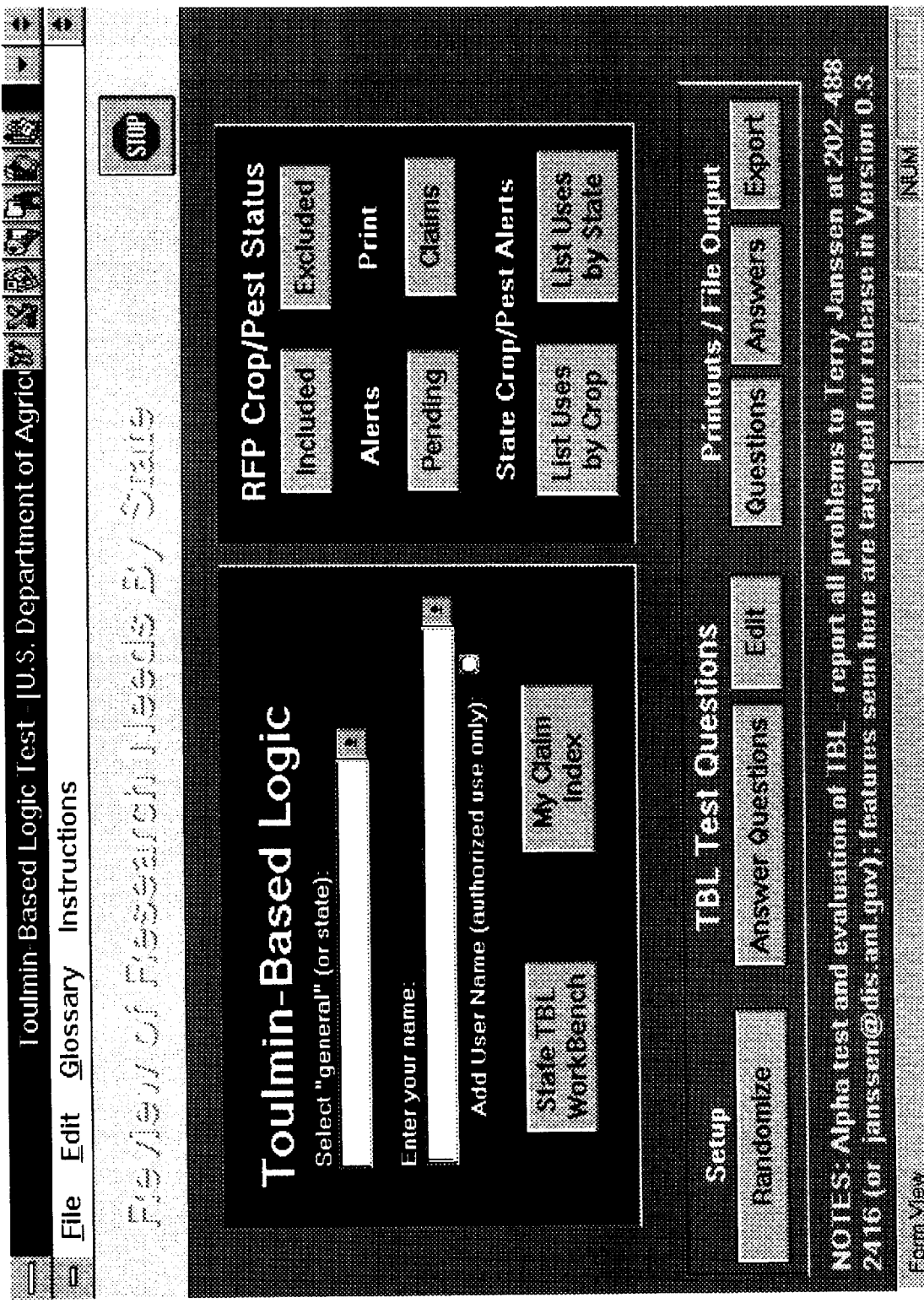
Figure 12B:
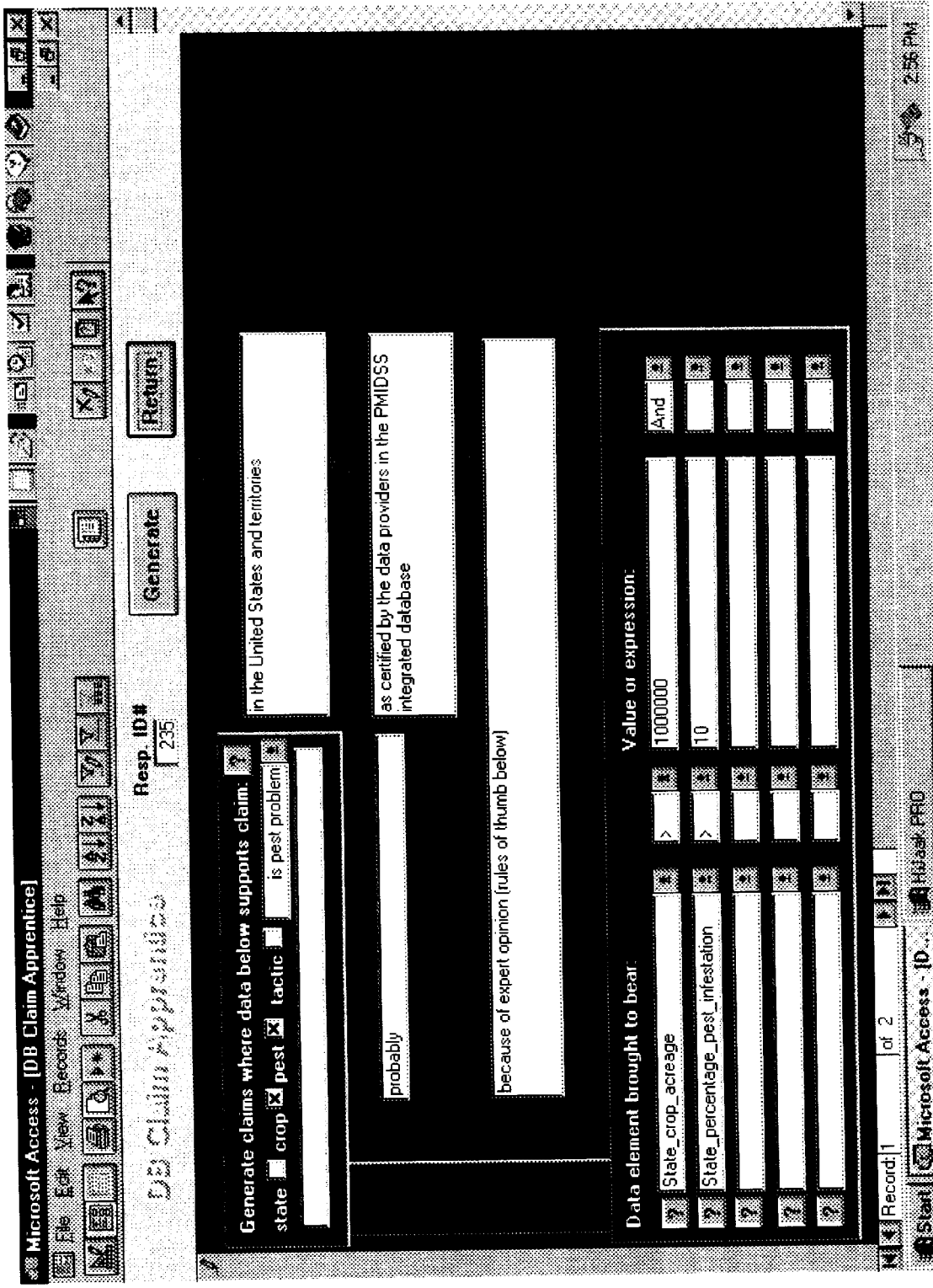
Figure 12D:
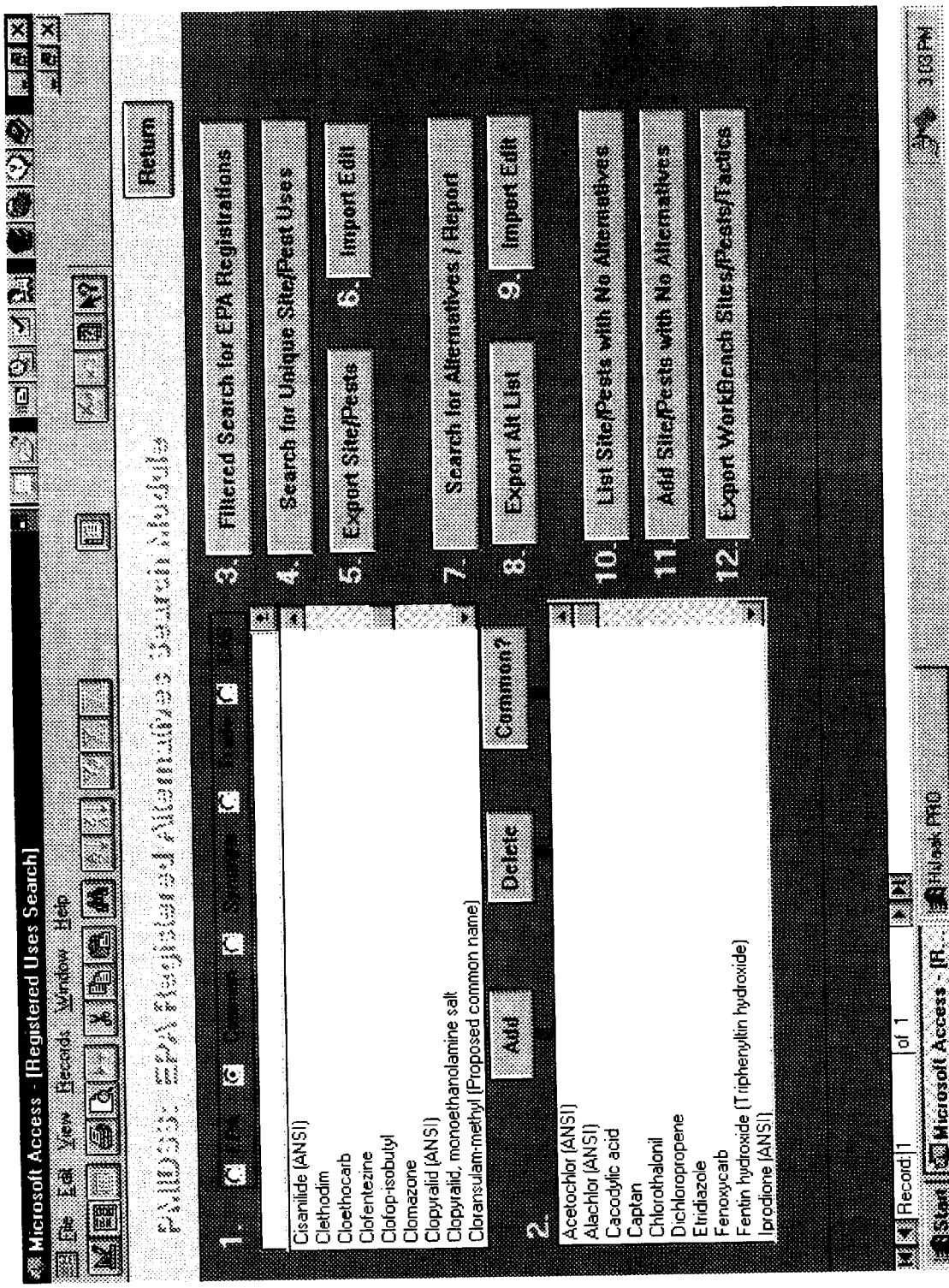
Figure 12E:
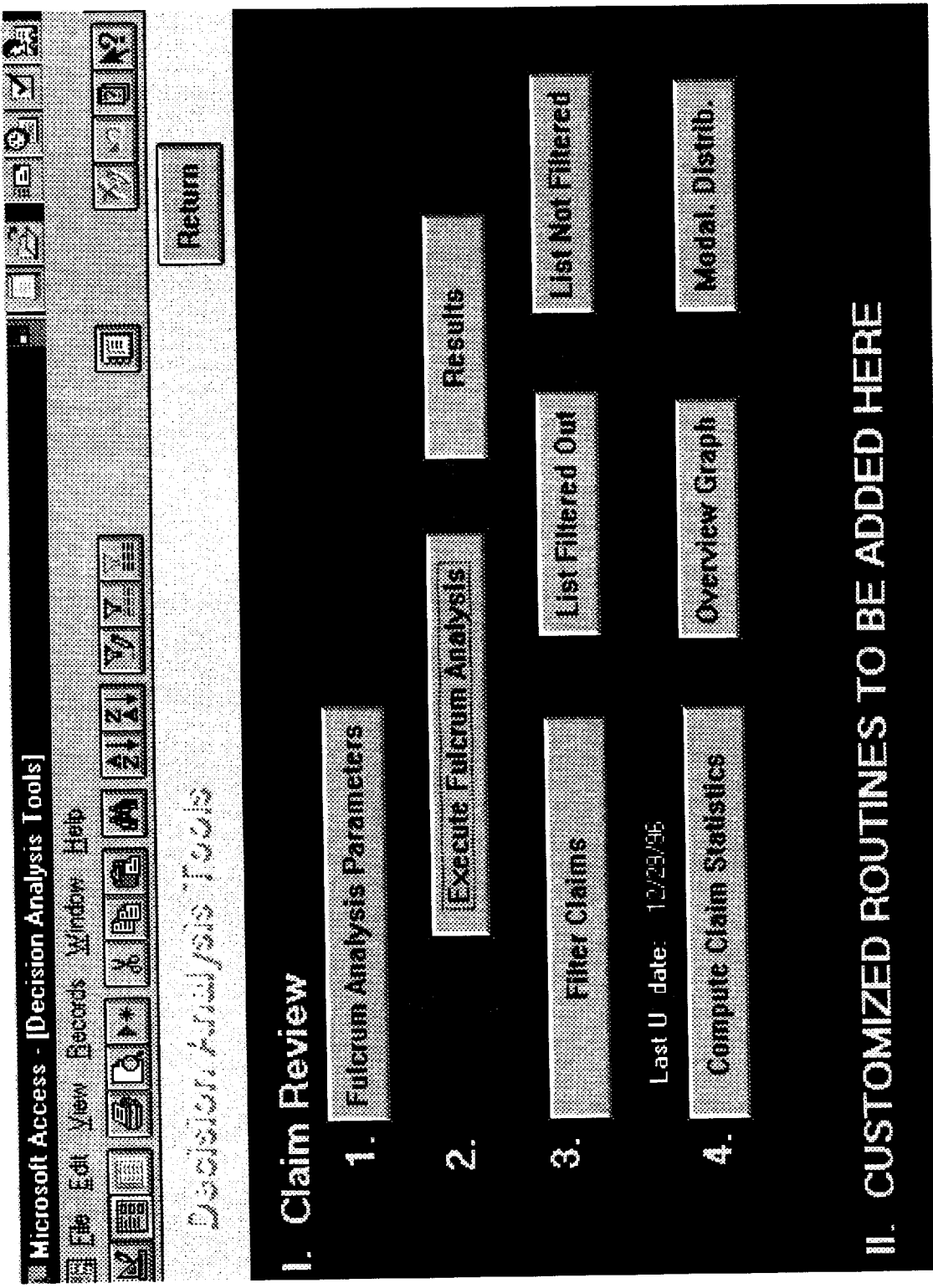
Figure 12F:
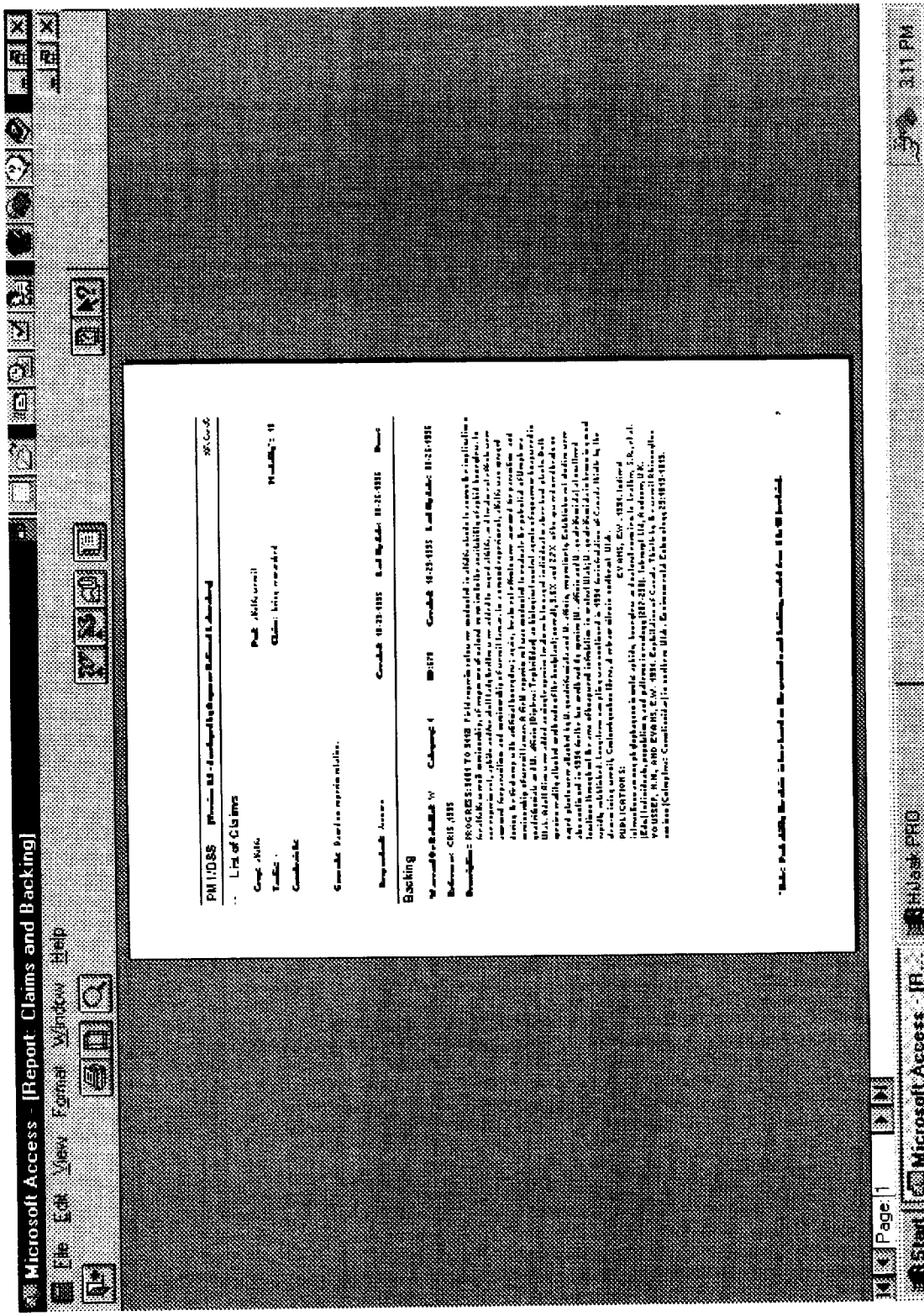
Figure 12H:
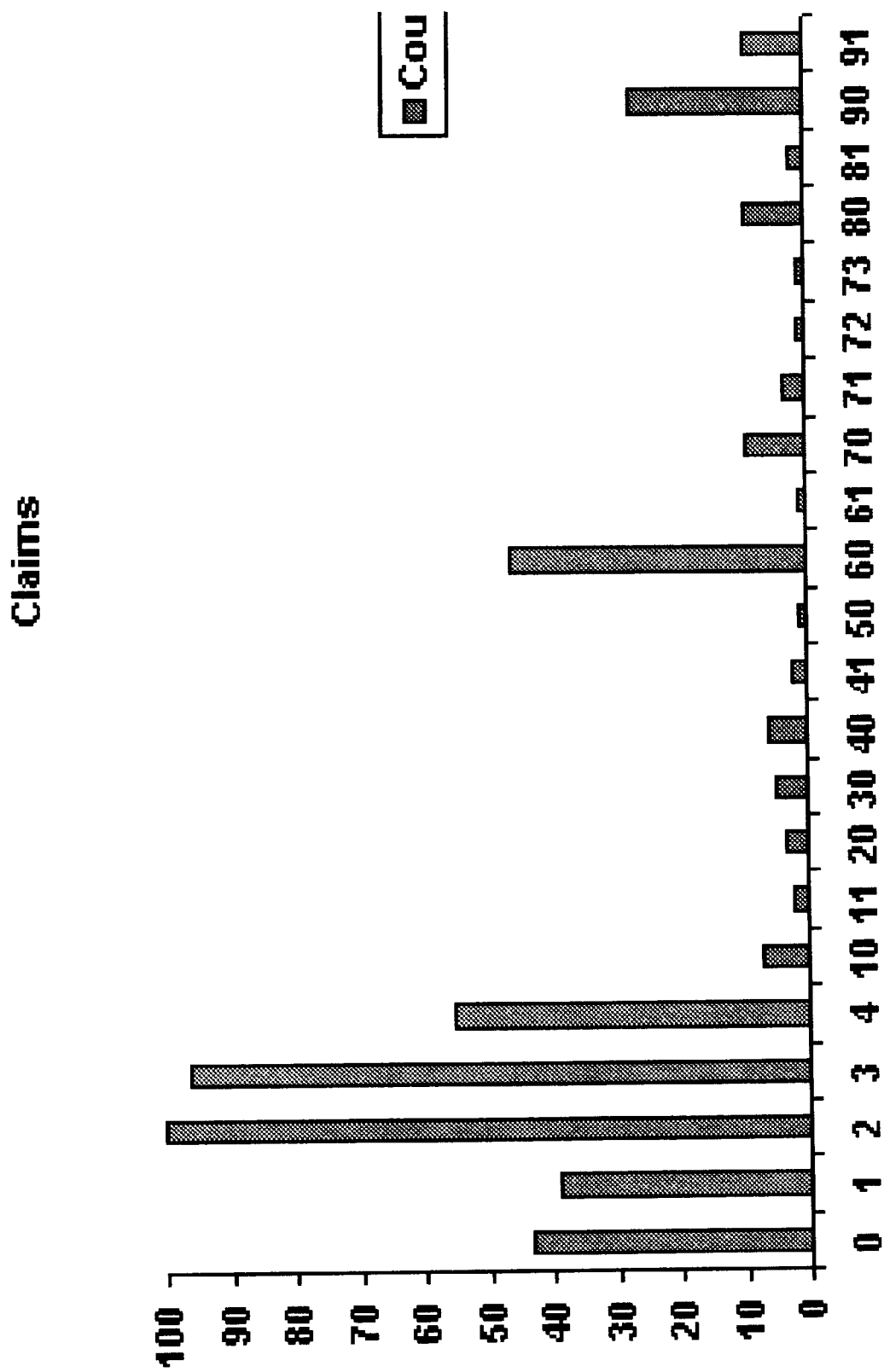
Figure 12I:
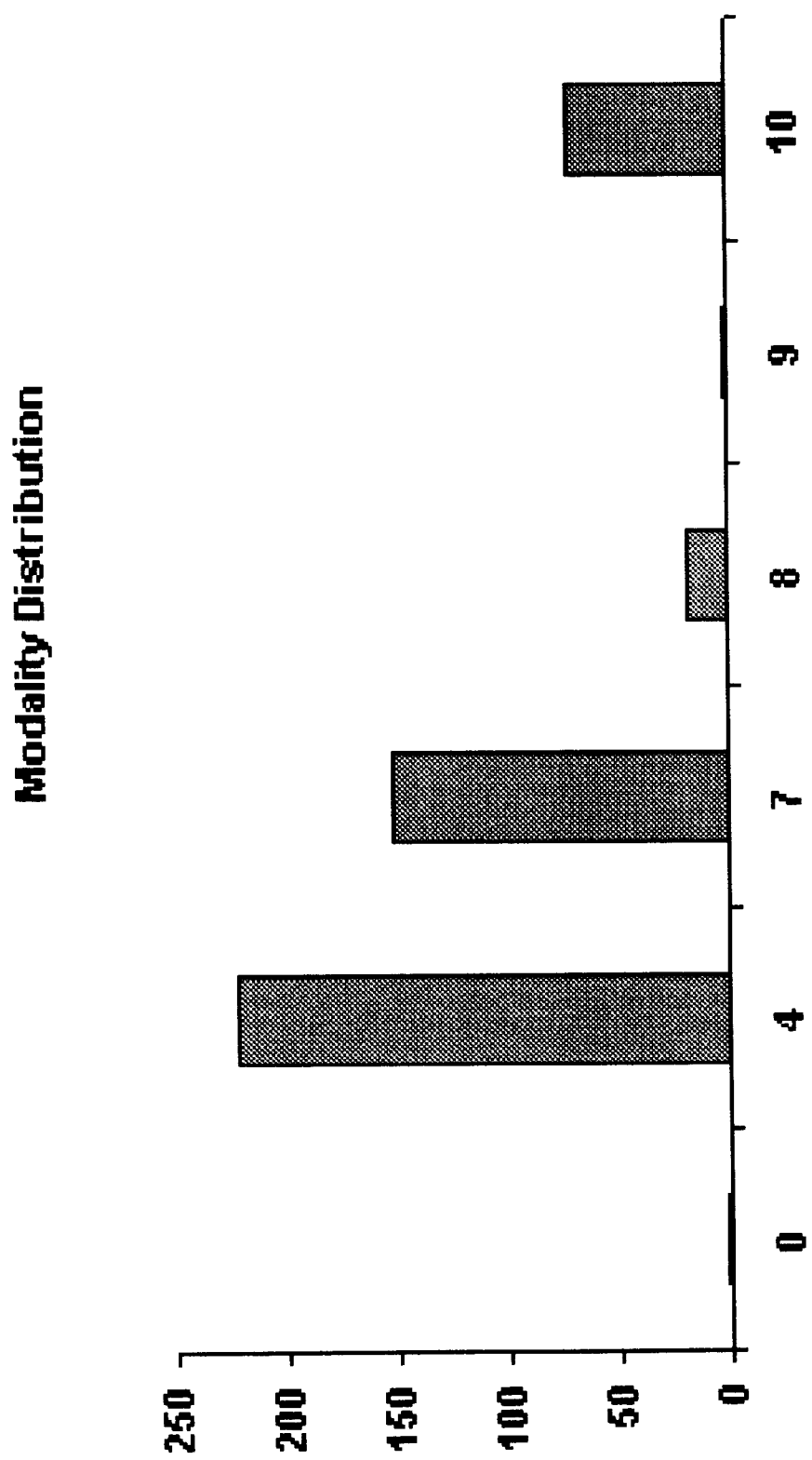
Figure 12J:
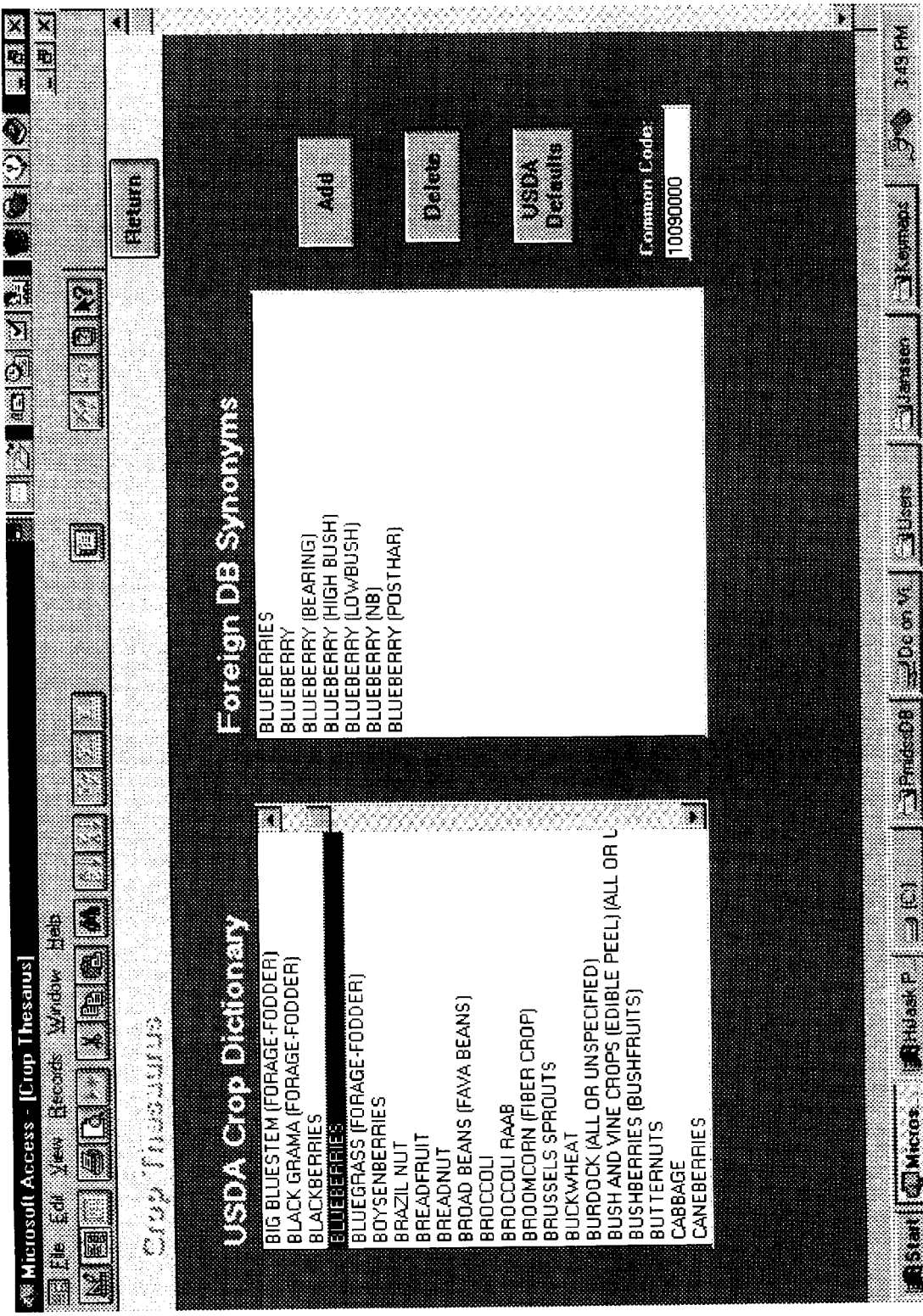
Figure 12K:
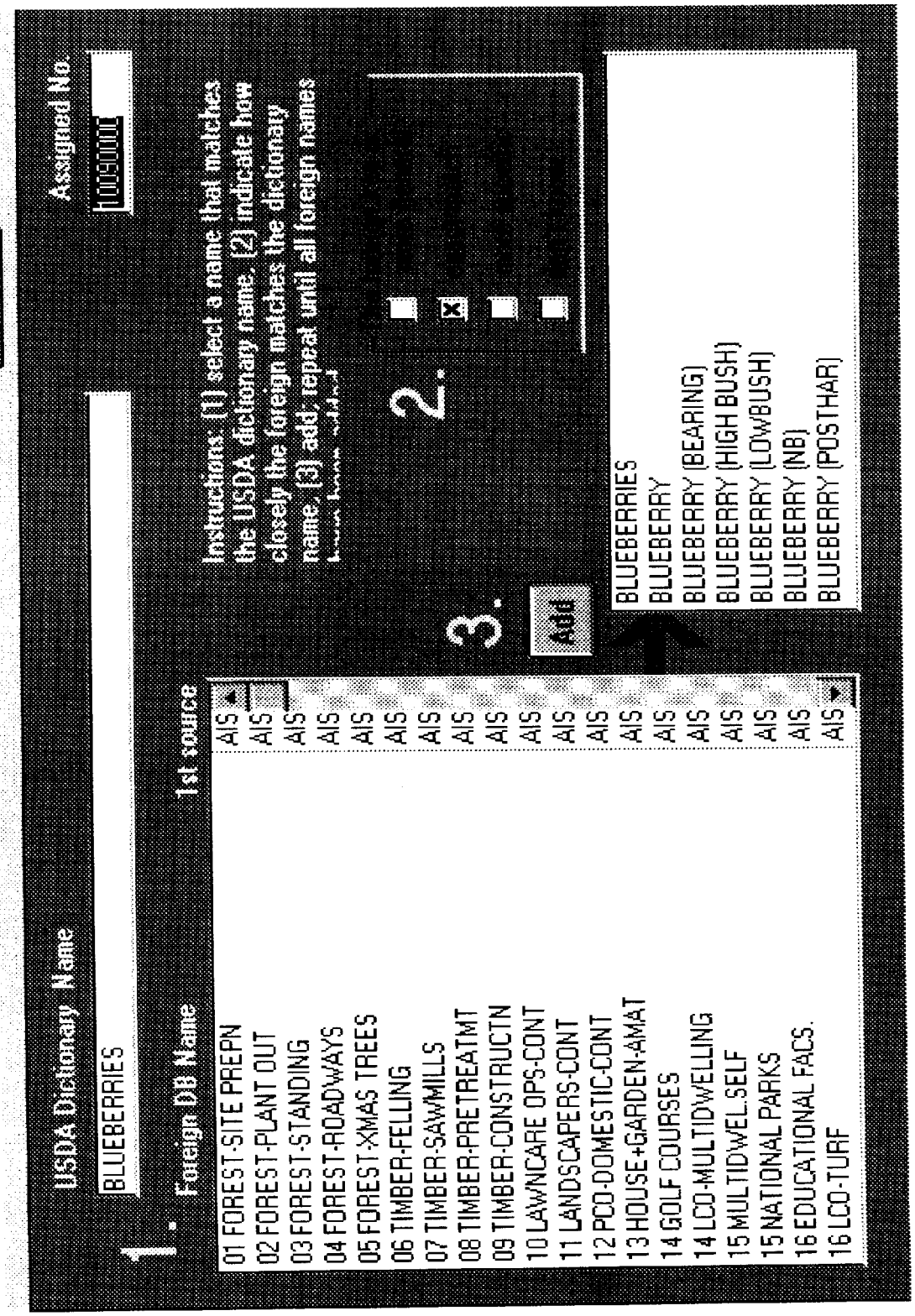
Figure 12L:
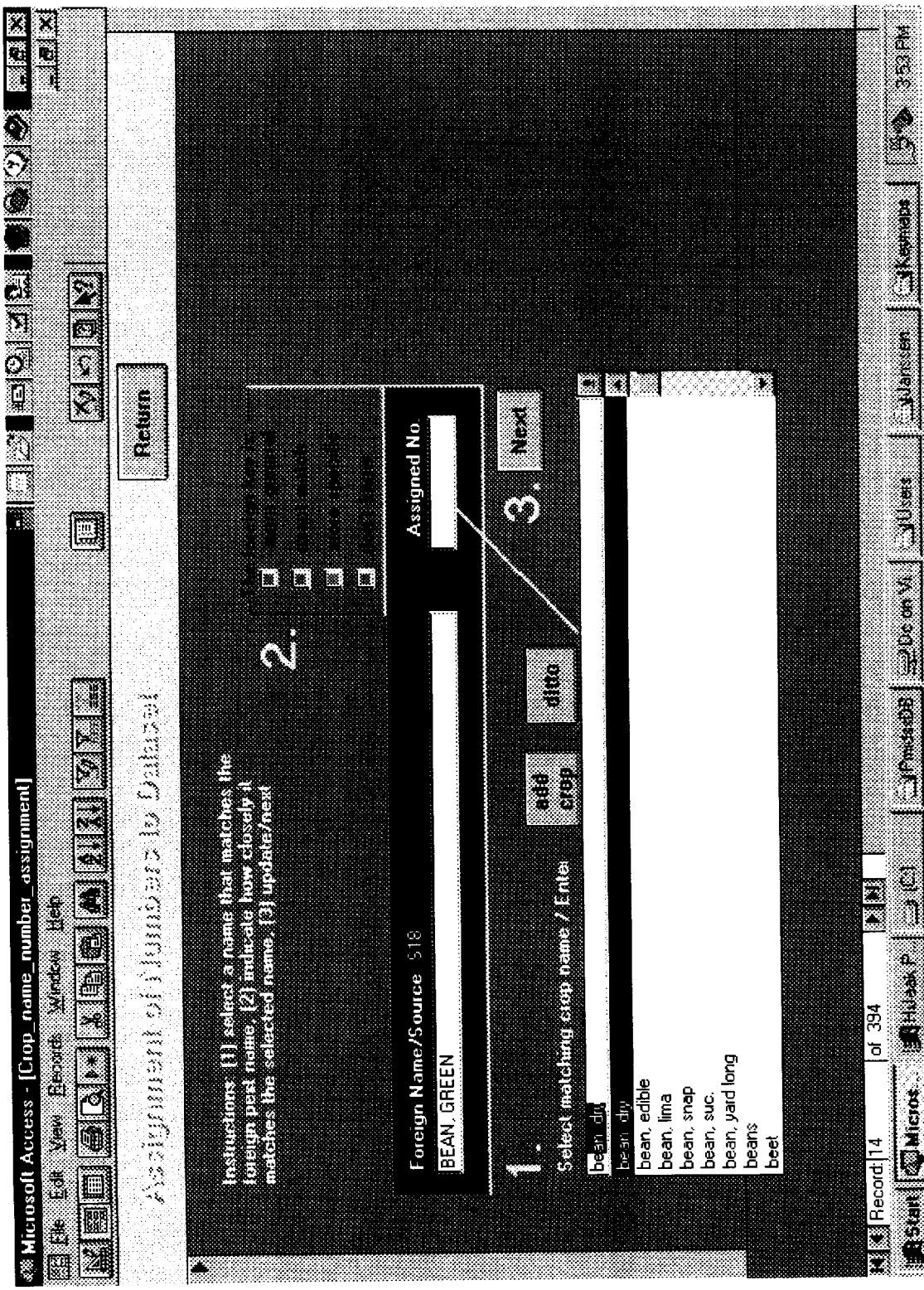
Figure 12M:
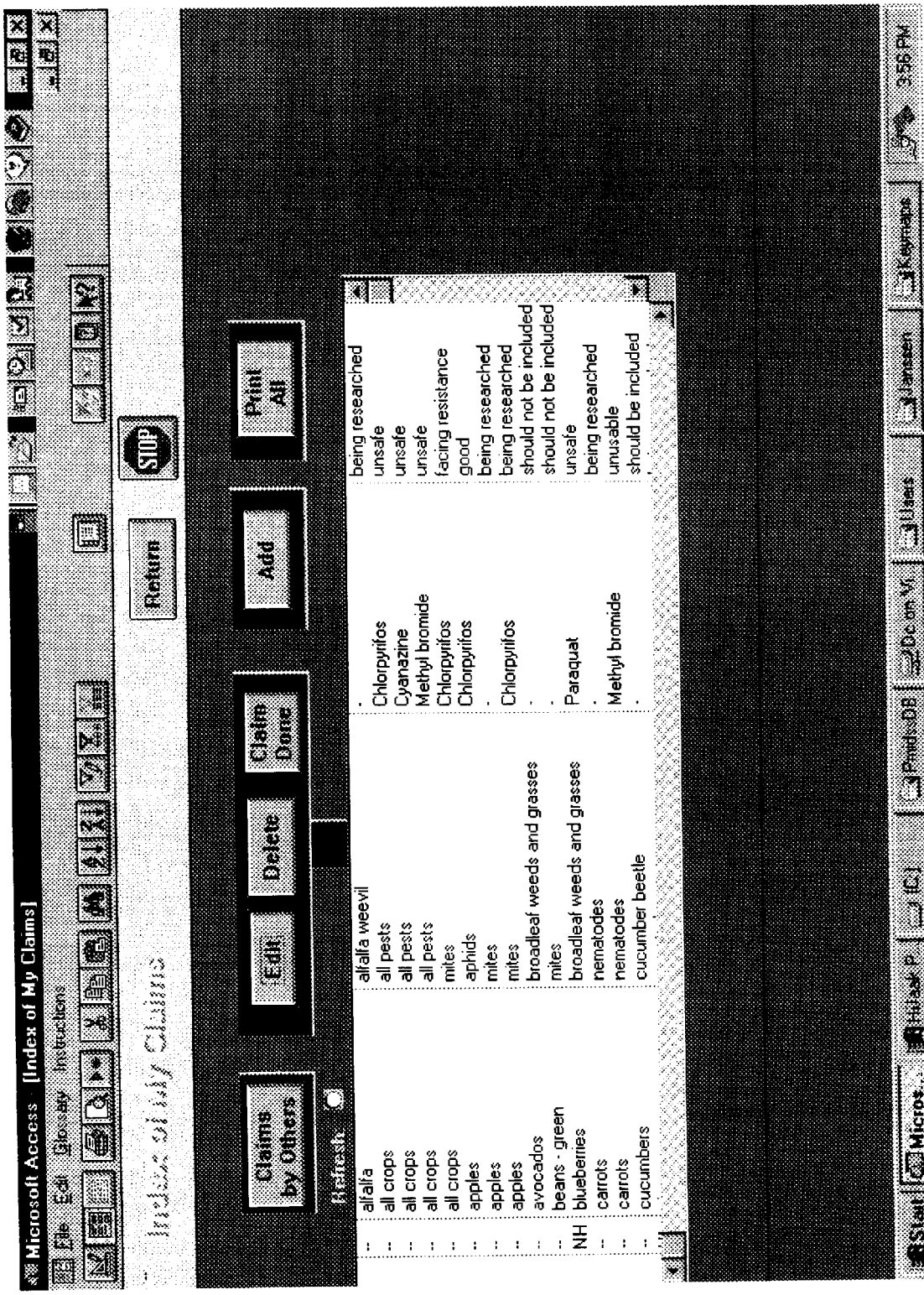
Figure 12N:
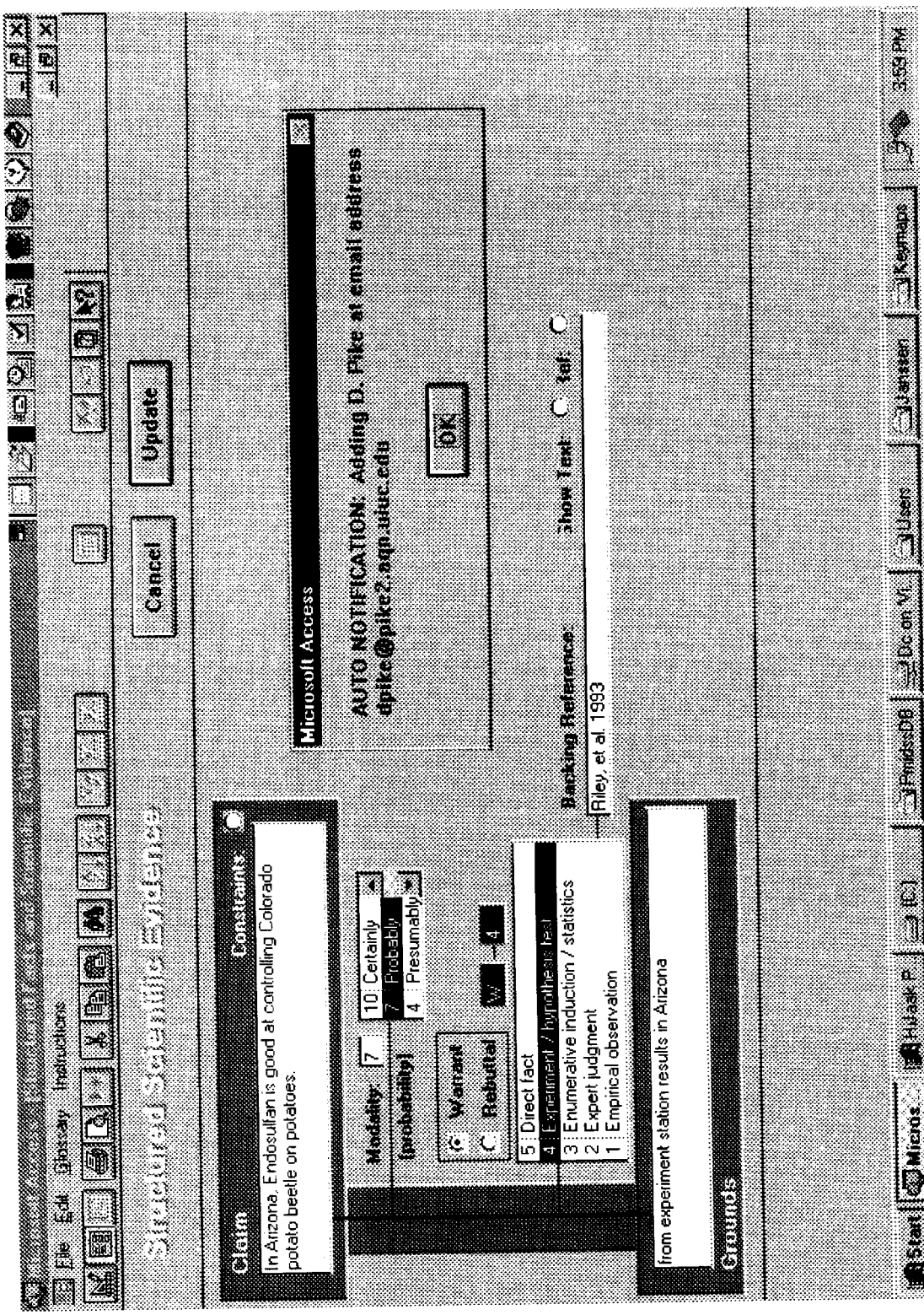

In another embodiment of the system, the software program 14 includes a further feature that automatically sends new or modified claims to any contributor having a contributor profile that meets certain configurable conditions. As mentioned above in connection the embodiment of FIGS. 1–3, each of the contributors may review the claims made by any of the other contributors and may also make additional claims, counterclaims, and so on. In this further embodiment of the system, this review aspect is enhanced. For example, in some scientific assessments, the size of the hierarchical argument structure may be so large that it would become difficult and time-consuming for each of the contributors to review all the contributions made by all the other contributors. In the embodiment of the system shown in FIG. 10, there is provided an automatic review generation program 140. This program 140 may operate as part of the software program 14. The review generation program 140 operates in response to the update hierarchy code program 88. After the hierarchical argument structure is updated and/or augmented by the addition of new claims (i.e., argument structure units 28) by contributors, the newly added claims are reviewed by the review generation program 140. The review generation program 140 compares the newly added claims to a contributor profile 142. The contributor profile 142 contains some or all of the contributors who were originally invited to participate as contributors. The contributor profile 142 may have a listing of contributors with their respective specialties of expertise, interests, background and so on. In the review generation program 140, whenever a new claim is to be added to the hierarchical argument structure, the subject matter to which the claim refers is compared to the profiles 142 to ascertain all the contributors whose areas of interest match the subject matter of the new claim. Then, the review program 140 sends the new claim and/or the entire updated hierarchical argument structure 144 to all the contributors whose areas of interest match the new claim. This may be done by e-mail over the Internet or any other suitable means. These contributors are then specifically requested to review the new claim and make any rebuttals, provide additional support, and so on. The review program 140 facilitates review by reducing the need for each of the contributors to examine all the contributions made by all the other contributors, including all iterations.

The contributor profile 142 may be developed by the user-decision-maker at the start of the contribution process based upon the credentials of the contributors. Alternatively, the contributor profile 142 may be developed automatically by each of the contributors when they make their initial contributions by completing a electronic form attached to the original copy of the hierarchical argument structure that is sent to the contributors. When each contributor returns the electronic form with their contributions, the electronic form used to develop the contributor profile 142. Alternatively, the contributor profile may be developed automatically based upon the type of contribution submitted by each contributor. For example, if any contributor's contribution is further augmented (by rebuttal or further contribution by another contributor), the first contributor is automatically notified.

E. Fulcrum Analysis of Claims

In a further embodiment, the system includes a feature that allows for weighting and view of the hierarchical argument structure. A fulcrum analyzer program 192 is responsive to the show support code 88. The fulcrum analyzer program 192 permits certain views of the hierarchical structure to be provided to the user-decision-maker. The fulcrum analysis program allows certain grounds to be emphasized and others filtered. For example, the fulcrum analyzer program 192 allows for filtering of the hierarchical structure to eliminate all claims of probability of less than a certain definable percentage. Also, the fulcrum analyzer program 192 allows for providing "what if" scenarios to see how decisions are influenced by changes or filtering of different factors and parameters.

IV. Example

An embodiment of the system described above was demonstrated in the following example. Realizing that sound science assessment is critical, USDA/EPA selected an embodiment of the system 10 for a test case. The embodiment of the system 10 was used to demonstrate its usefulness for organizing information used by participants (policy decision makers and Experts/Scientists) in public policy debate based on science assessment. The embodiment was demonstrated to bridge the gaps between experts and policy decision makers in a science assessment. Table I lists the sub-hypotheses that were tested to support or refute this primary hypothesis.

A single test case was selected independently by USDA from a high priority EPA/USDA pest management policy program. It is one instance of a policy decision situation that requires science assessment. Subjects were independently selected from the actual policy decision makers and experts in EPA, USDA, and the Land Grant University system.

The specific test case was independently selected—that of deciding which pest management research area should be included in a Request for Proposal (RFP) to find alternatives pest controls on crops that are impacted by pesticide regulations. The specific purpose of this science assessment is to support research funding allocation decisions, based on scientific evidence collected and brought to bear on these decisions. The test case is an annual science assessment performed for the Pest Management Alternatives for Farmers Competitive Grants RFP. As described above, policy decision makers in this case have been experiencing a gap between themselves and the Experts/Scientists. Even though they know the information exists, it has been too time consuming to effectively tap the experts to get the information in a form that links the expert's claims to the sound scientific basis from which the claims were inferred. Because of these information gaps and lack of structure in bringing the science to bear on the policy decisions, the policy makers have not been properly considering all the available evidence in deciding which crop/pest areas to include in the RFP. As described above EPA has found that this process is largely driven by unsubstantiated expert opinion, even where sound objective science exists. As a result the policy decision makers usually have to use that opinion without a clear understanding of what the expert's opinion is based on. Without the policy makers clearly understanding and considering sound objective science, he or she is vulnerable to the biases of those making the claims.

This test case had considerable importance because an omission of crop/pest problem from the RFP can lead to ineffective pest control, and huge financial losses to the growers, or the continued use of a potentially harmful pesticide, possibly resulting in loss of life or environmental harm.

Figure 13:
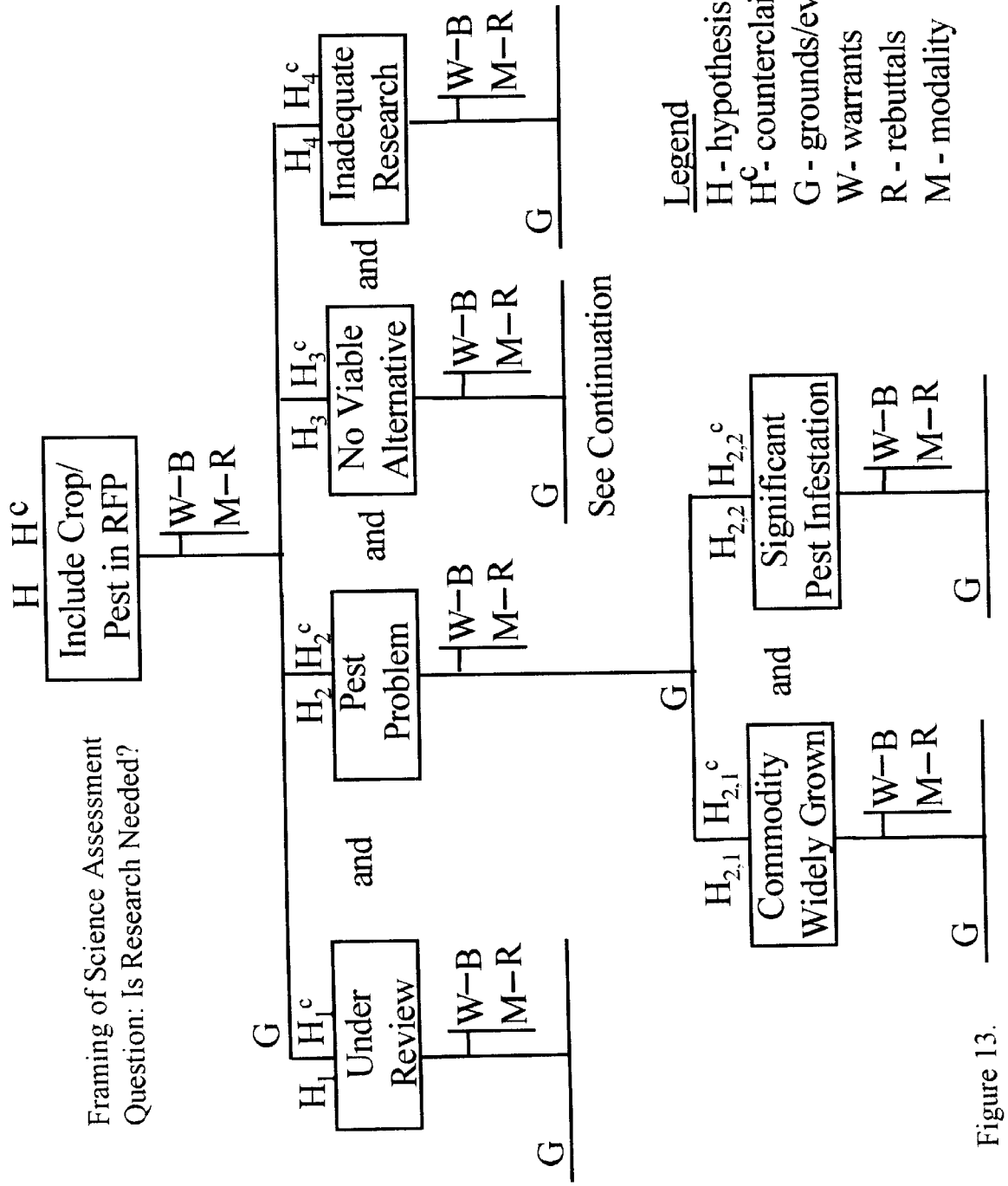
Figure 14:
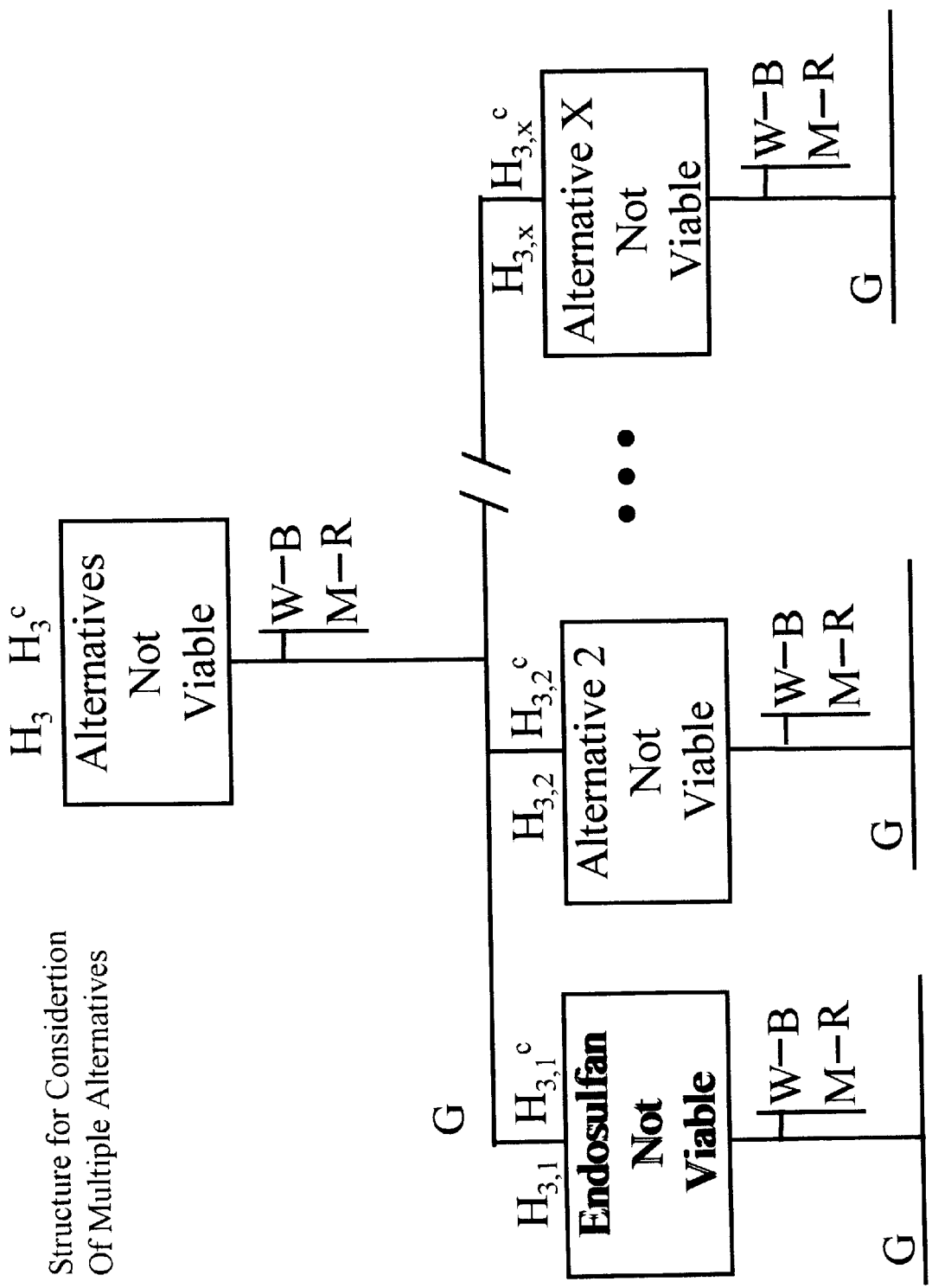

To do this test, the argument structure unit was extended in several minor ways to map it to science assessment in the area of pest management decision making. These minor extensions are clearly not to the Toulmin representation, but they are key to implementing Toulmin structure in a way that is practical for science assessments where there are multiple Experts/Scientists and policy decision makers. As with most large science assessments at the national level, science assessments in this test problem domain involve dozens or hundreds of experts and several policy decision makers. The extensions done here have made Toulmin structure possible to test, whereas without them it would clearly be tedious to use Toulmin structure. The minor extensions included the addition of:

claims and counter-claims;

a graphical representation for hierarchical structuring of Toulmin structure claims and counter-claims (see FIG. 13);

incorporation of the structures into a hyper-linked environment; and other features that make Toulmin structure practical for multiple experts and policy makers to use Toulmin structure interactively within the test case problem domain.

A prototype system was developed to implement the test case in a way that is easy for multiple policy decision makers and Experts/Scientists located across the country to enter claims and to perform the test using the test software. The software prototype provided a hyper-linked environment with other software features that make Toulmin structures practical for multiple experts and policy makers to use interactively within the test case problem domain.

A test prototype of the system 10 was implemented in Windows 3.1 on a personal computer. The software can be installed on several computers and the claims and counter-claims transferred over the Internet, as was done in this test.

Methodology

Three steps were performed in the test:

independent selection of the test case, mapping of the test case to Toulmin structure, and the hypothesis test procedure.

The test was conducted with actual experts and policy makers doing science assessment, as part of their pest management policy (strategy) decision making process. To avoid bias USDA selected the test problem and a primary test group of seven test subjects, all of whom have doctors degrees, and are directly associated with actual USDA/EPA pest management science assessment and policy decision making. USDA and Argonne National Laboratory selected a secondary test group of three subjects. The secondary group were from outside pest management policy making. (One was an air quality policy decision maker and two were information technologists). All subjects were explicitly instructed to be unbiased and objective.

Mapping of the test case was necessary attempt to capture all the aspects of this test science assessment in Toulmin structure. A methodology was developed for the test that centered around the use of Toulmin structure. The test is an attempt to find one instance where Toulmin structure bridges gaps in science assessment as described above.

The hypothesis test procedure consisted of four additional steps:

implementation of the test case, initial statement of claims by Experts/Scientists, use and evaluation by scientists and policy decision makers, and analysis of the results.

The software prototype (named TBL Test) was implemented for use by each subject using a personal computer. The prototype was developed in using the MS Access Database and Basic language; it required a 486 with at least 4 MB RAM, 10 MB available disk space, and Windows 3.1. The TBL Test is the added-value software implementation of Toulmin structure that included the minor extensions described above. TBL Test provided two primary test functions: a means of using Toulmin structure for this science assessment and a means to collect the answers to 77 questions from the subjects after they completed the test. The subjects judged the test system on whether it supported the hypothesis and sub-hypotheses. The results were imported directly, from disk files that stored the answers from each test subject, into a database for analysis.

Mapping of Test Case to Toulmin Structure

USDA/EPA policy decision and Experts/Scientists framed the science assessment. The policy decision makers need to do science assessment for the Pest Management Alternatives for Farmers Competitive Grants Program. The test case involved many pesticides that are under regulatory review, i.e., hundreds of crop and pest combinations that may loose viable pest management tactics because of the regulatory process and hundreds of plausible alternatives. The purpose of this science assessment was to determine what crop/pest areas qualified for federal research money, and to find alternative pest management tactics.

FIG. 13 shows an extension of Toulmin structure into a hierarchical framework, and has been included here to represent several Toulmin structures linked together. In this general framework each rectangular shaped node represents a claim (H), and counter-claim ($H^C$). The components of Toulmin structure include the following: G for grounds, W for warrant, B for backing, M for modality, and R for rebuttal. This framework was used to make and relate specific claims in the pre-test setup and during the test, using a field dependent rule established by the decision makers and experts that stated "it is generally sufficient to include a crop/pest research area in the list of priority research needs (accept H) if four criteria are met: the pest management on the crop/pest area could be effected by loss of a pesticide that is under regulatory review ($H_1$), there is pest problem that is significant enough to justify research for an alternative control tactic ($H_2$), there are no other viable alternatives that can be used to control this pest on this crop ($H_3$), and any current research being funded to find an alternative pest control for this crop/pest is inadequate for finding a viable alternative in the near future ($H_4$)."

Furthermore, to properly consider whether there was a significant pest problem ($H_2$), they established another field dependent rule that stated:

"to conclude that no alternative pest control tactics is viable ($H_3$) for this crop/pest problem, it must be shown that all tactics, including all pesticides that are registered for use on this crop/pest, are not viable ($H_{3,1} \ldots H_{3,x}$)."

Figure 15:
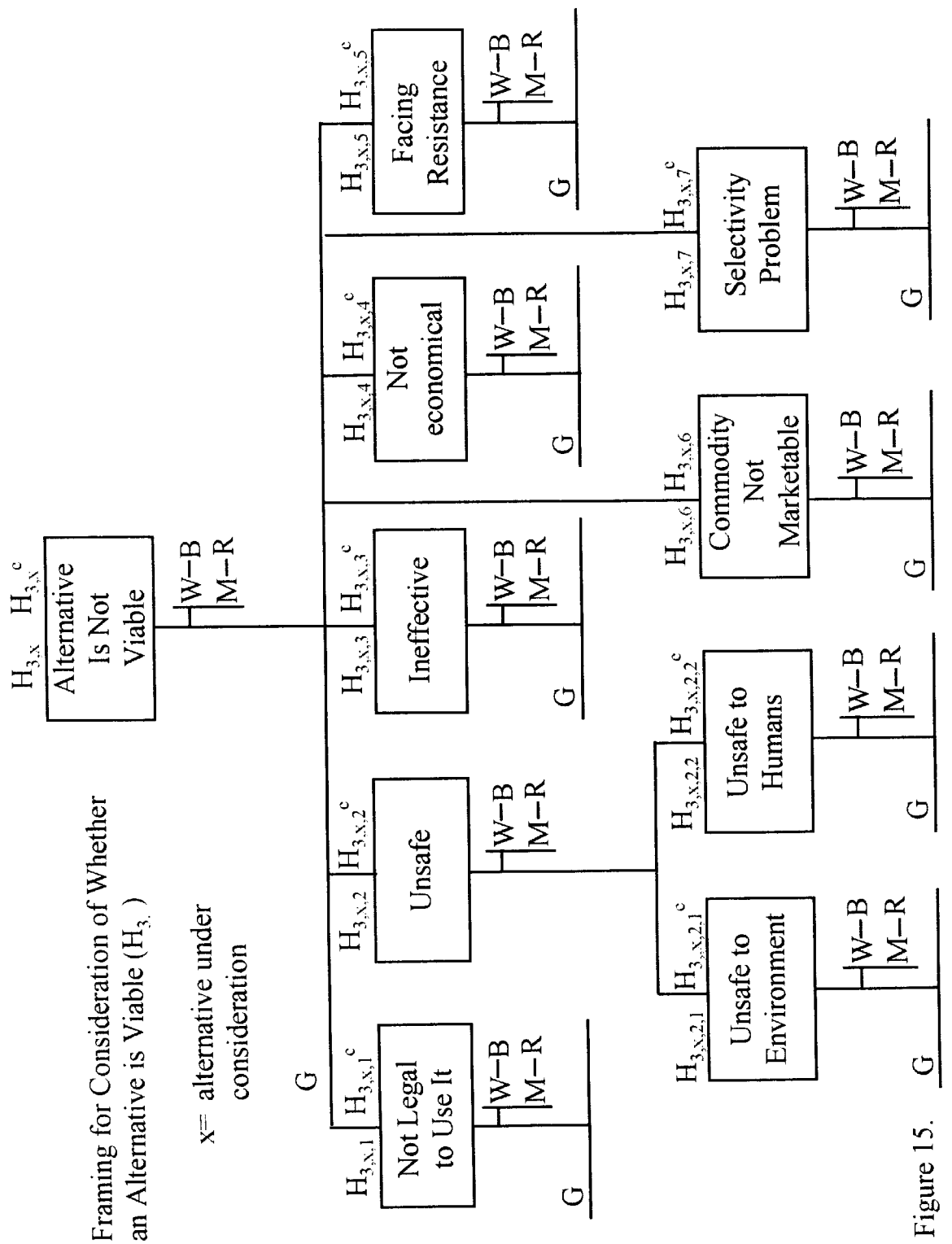

The viability of each alternative was based on a number of factors. Using a field dependent rules established by the decision makers and experts on a case-by-case basis, "it is generally sufficient to accept $H_{3,x}$ if at least one of the following sub-hypotheses can be accepted, as shown in FIG. 15: (1) the pest management tactic (e.g. pesticide) is illegal to use ($H_{3,x,1}$), (2) it is unsafe to humans or the environment ($H_{3,x,2}$), (3) it is not effective toward controlling the targeted pest ($H_{3,x,3}$), (4) it is not economical ($H_{3,x,4}$), (5) it is facing genetic resistance in the pests it is suppose to control ($H_{3,x,5}$), it is not marketable due to poor taste caused by this pest management alternative ($H_{3,x,6}$), or this alternative kills beneficial insects that control other pests, i.e., a selectivity problem ($H_{3,x,7}$)."

Warrants were individually established by USDA/EPA policy decision makers and expert scientists for claims of "no viable alternative" for each crop/pest that was under review, based on one or more accepted sub-hypotheses from the above list.

Hypothesis $H_1$ was relatively easy to determine since an alternative (X) is either legal or not. However, the absence of federal regulations on an alternative pest management tactic did not necessarily mean it was legal since the individual states also have regulatory bodies that pass laws and regulations governing pesticides. This legality issue had to be answered in context of all federal and state regulations.

Hypothesis $H_{3,x}$ was much more complex because of all the possible environmental and human health risks posed by toxicants like pesticides. Federal pesticide policy decision makers consider regulatory action based on regulatory statutes put in place by Congress. This science assessment, however, was not focused exclusively on the legal statutes regarding pesticide risk versus safety. A pesticide is considered unsafe ($H_{3,x,2}$) based on evidence that it is unsafe to the environment ($H_{3,x,2,1}$), or unsafe to humans ($H_{3,x,2,2}$), as was defined above. In general pesticides were considered unsafe by USDA/EPA policy decision makers in this science assessment if there was sound scientific basis for significant environmental or human health risk posed by the use of the alternative pest control tactic, whether the alternative already has a regulatory action against it or not. In other words, when a pesticide like Endosulfan was considered to be unsafe, it was not a viable alternative, even if it was legal to use it under current laws governing environmental and human safety.

Although the policy decision makers have generally agreed in the past that these factors are relevant and sufficient to answer this science assessment question, they have not been able to consider all of them in past science assessments, because there has been no practical way for them to bridge the gaps with the experts who have this knowledge. Instead, the policy decision makers have used only partial knowledge about some of the above factors. For example, the policy decision makers have known for some time that resistance is a major consideration, and experts in the Land Grant Universities have known what pests are currently, or are becoming, resistant to pesticides. This gap has lead to research needs having been set without fully considering genetic resistance in these decisions. Again, although USDA/EPA policy decision makers have had a network of experts in place for many years (in the Land Grant Universities), they have not been able to (1) effectively tap them, (2) understand how their knowledge should be brought to bear, and (3) in these cases they have often had to rely on the opinions of these experts without sufficient knowledge of what the experts were basing their opinions on.

Now consider an actual example involving the regulation of a pesticide, Carbofuran, and assessment of whether research is needed to find an alternative means of pest control of Colorado potato beetles on potatoes. EPA has taken regulatory action against Carbofuran, the pesticide widely used for controlling outbreaks of Colorado potato beetles on potatoes. Policy decision makers needed this science assessment to decide whether to include this Colorado potato beetle on potatoes problem in a request for proposal for government funded research to find an alternative. FIGS. 16 through 38 show Toulmin structures representing arguments with scientific basis (grounds) and that have been brought to bear on this policy decision. Each figure shows reference to a hypothesis or sub-hypothesis, as indicated by the large H with subscript. The grounds, warrant and modality are summarized for each, and a reference to a scientific journal or data upon which the summary was based is included as indicated by square brackets (for those claims based on scientific data or other published findings).

Figure 16:
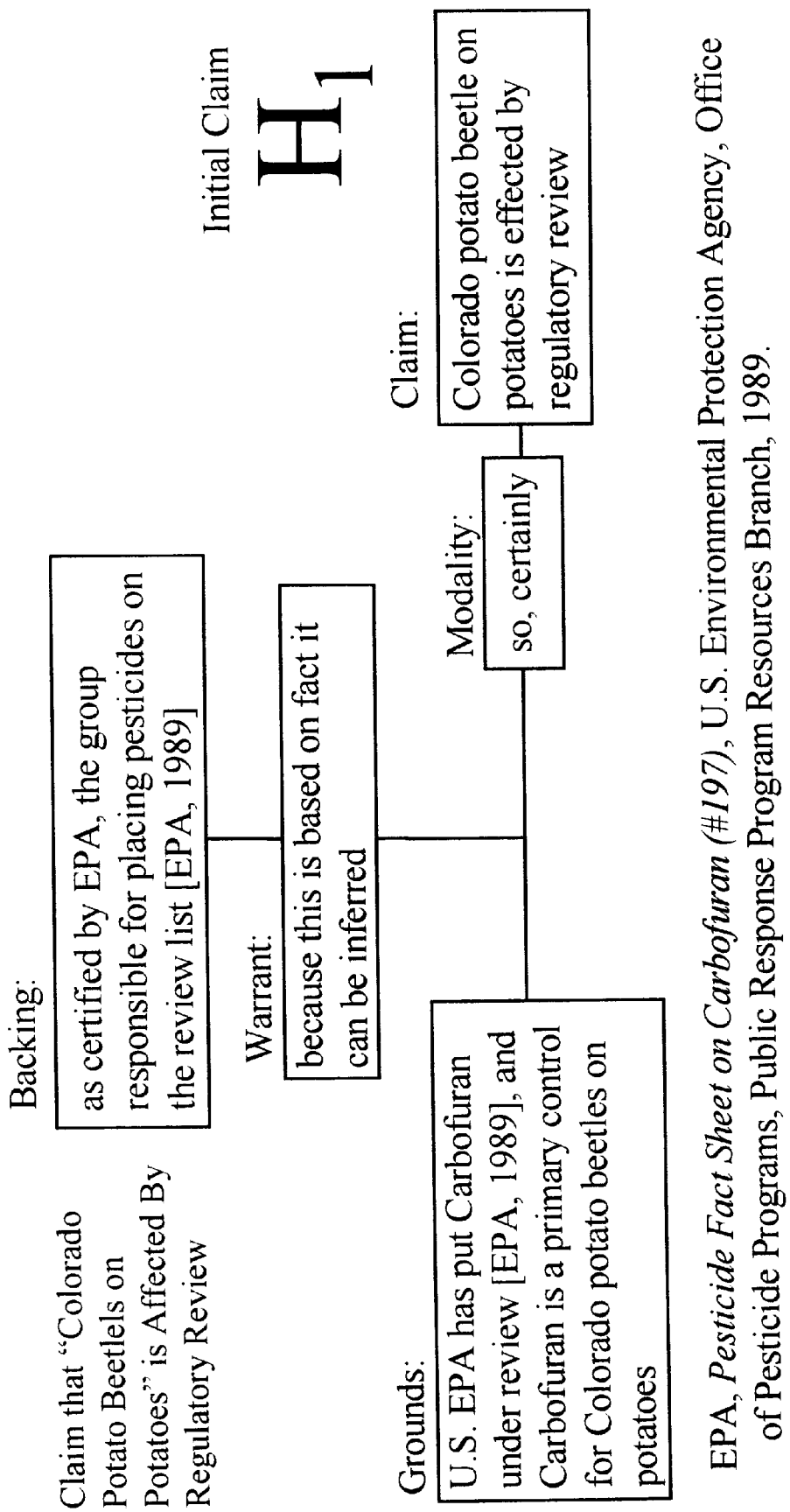

The first, FIG. 16, is the claim that regulatory review is being conducted on a pest management tactic used to Colorado potato beetles on potatoes, i.e. Carbofuran is under review. The data in these figure may be read in the following sequence: grounds to modality to claim to rebuttal to warrant to backing. In FIG. 16, this reads (G) "U.S. EPA has put Carbofuran under review [EPA, 1989] and Carbofuran is a primary control for Colorado potato beetles on potatoes" (M) "so, certainly," (C) "Colorado potato beetles on potatoes is effected by this regulatory review" (No R so skip to W) "because this is based on facts we can infer this, as certified by EPA, the group responsible for placing pesticides on the review list [EPA, 1989]." This claim is supporting evidence that Colorado potato beetles on potatoes qualifies for inclusion in the RFP.

Figure 17:
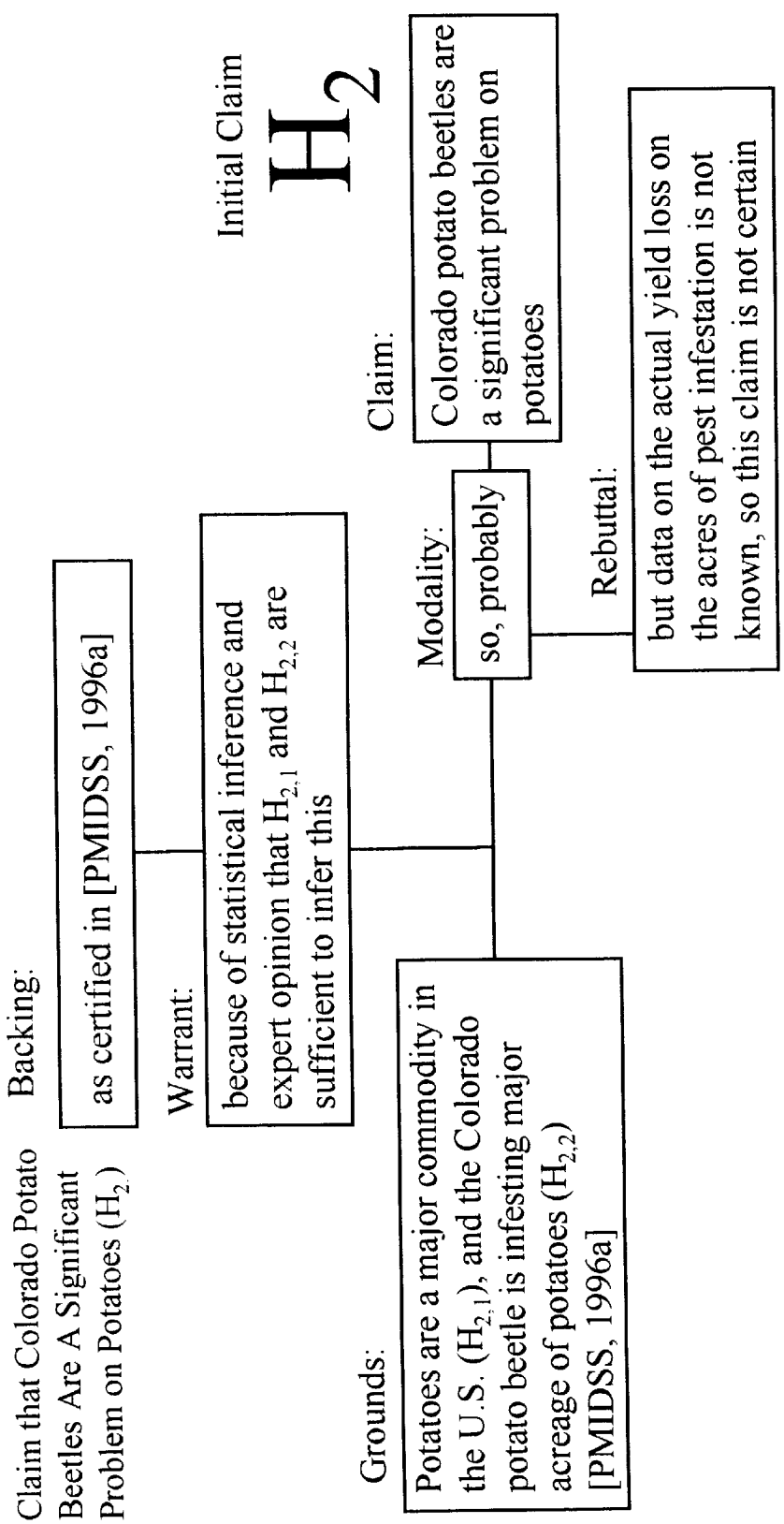
Figure 18:
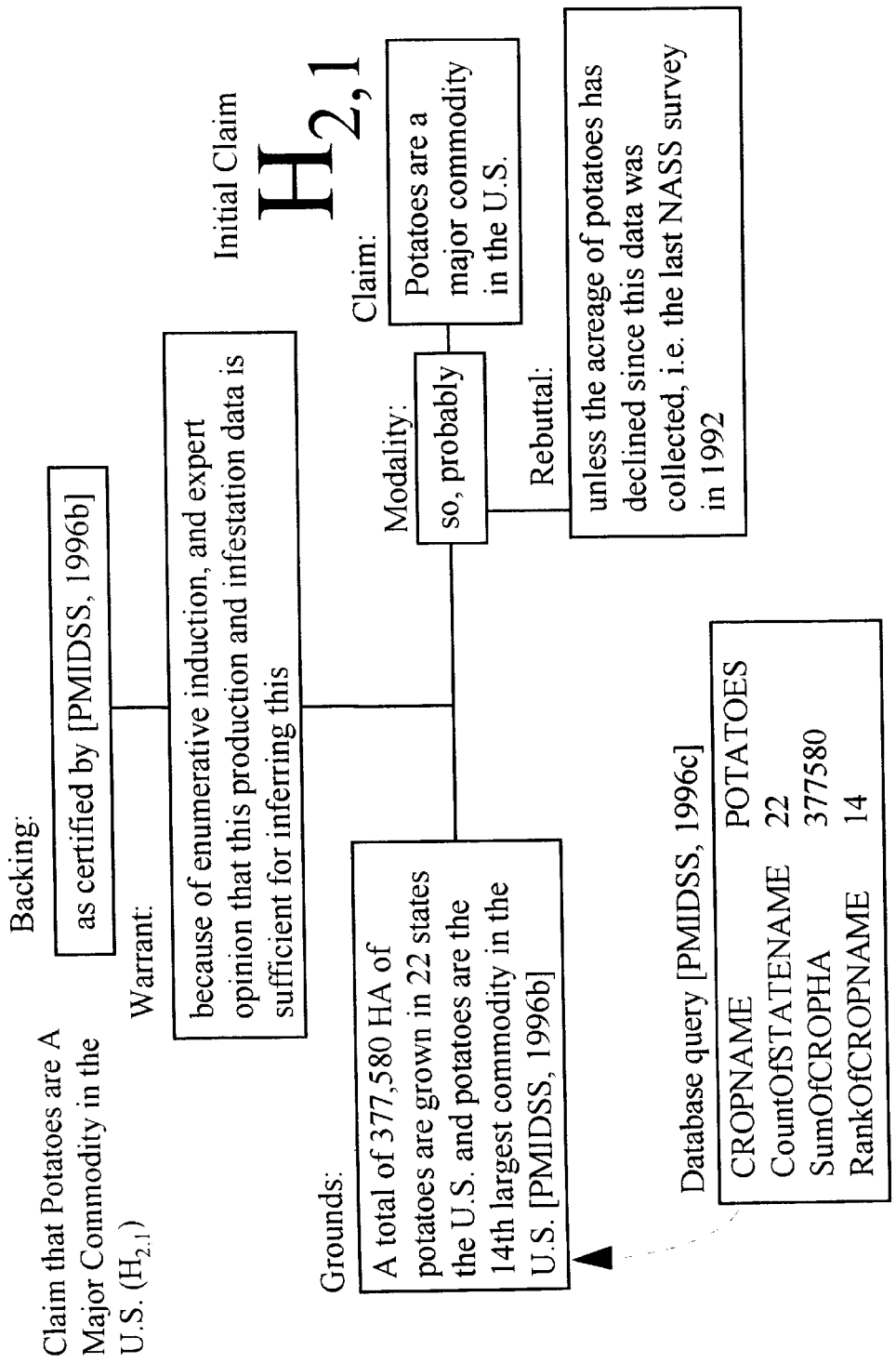
Figure 19:
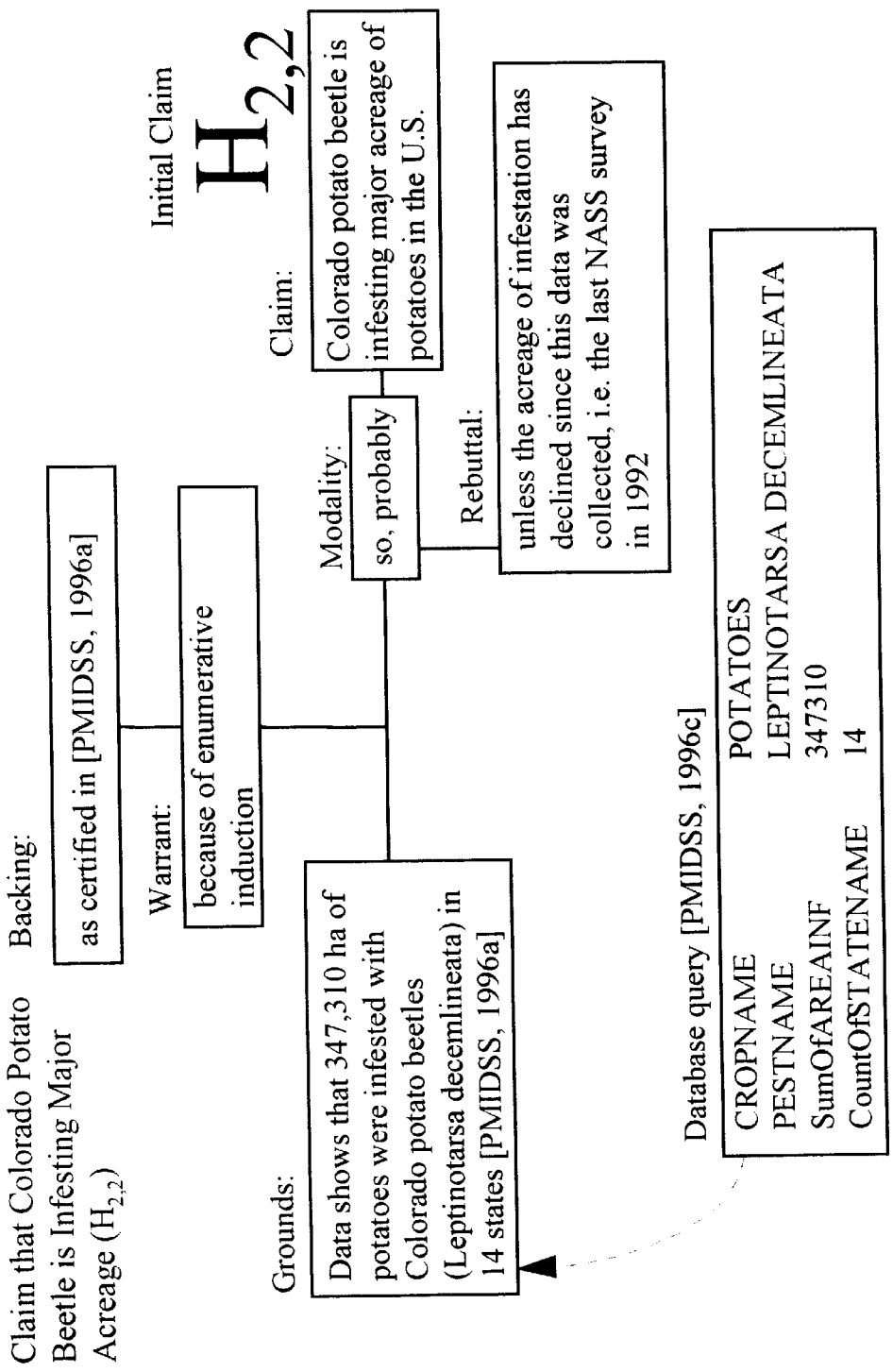

FIG. 17 states the claim that "Colorado potato beetles are a significant problem on potatoes." The grounds for this claim rest on two sub-hypothesis $H_{2,1}$ and $H_{2,2}$, shown in FIGS. 18 and 19.

Figure 20:
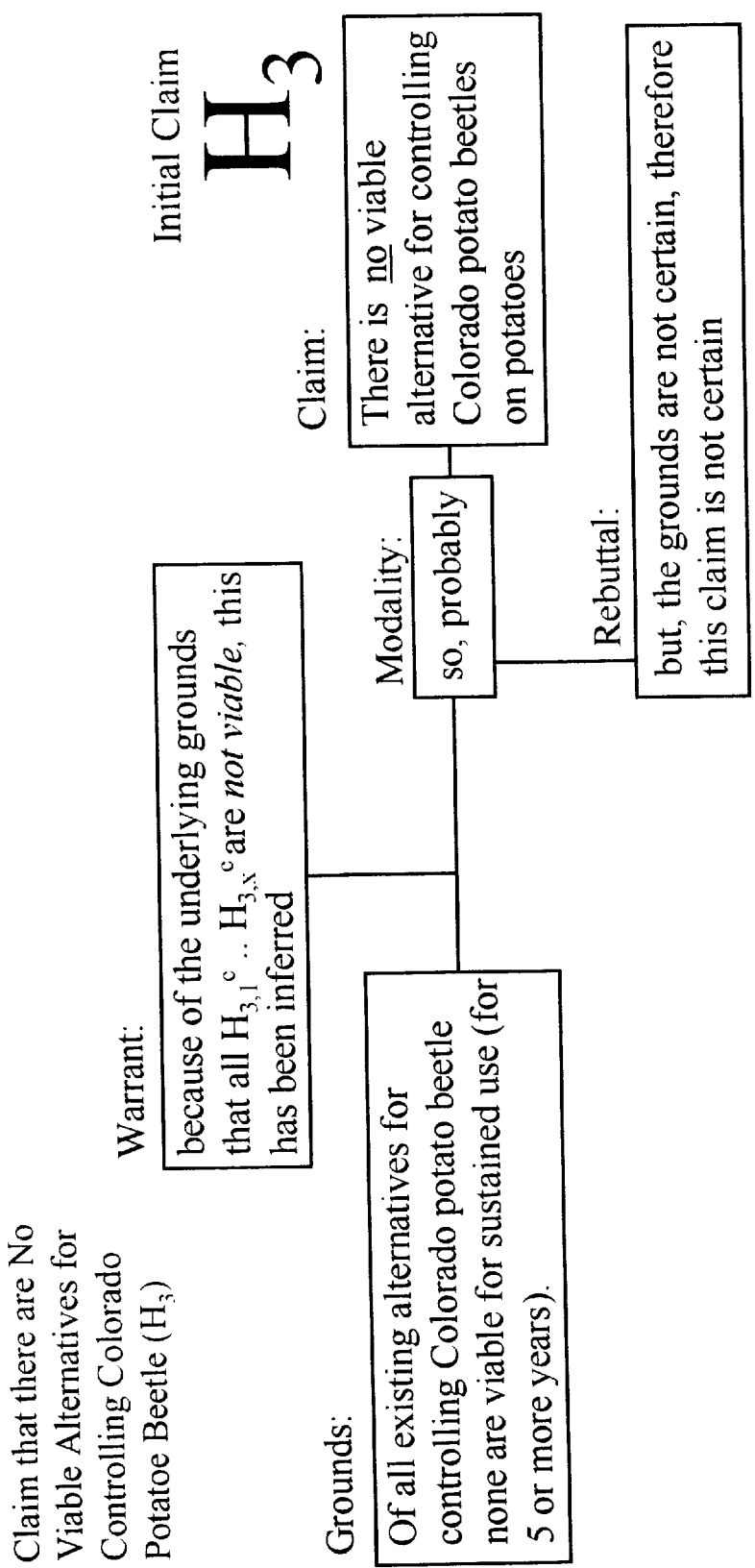
Figure 21:
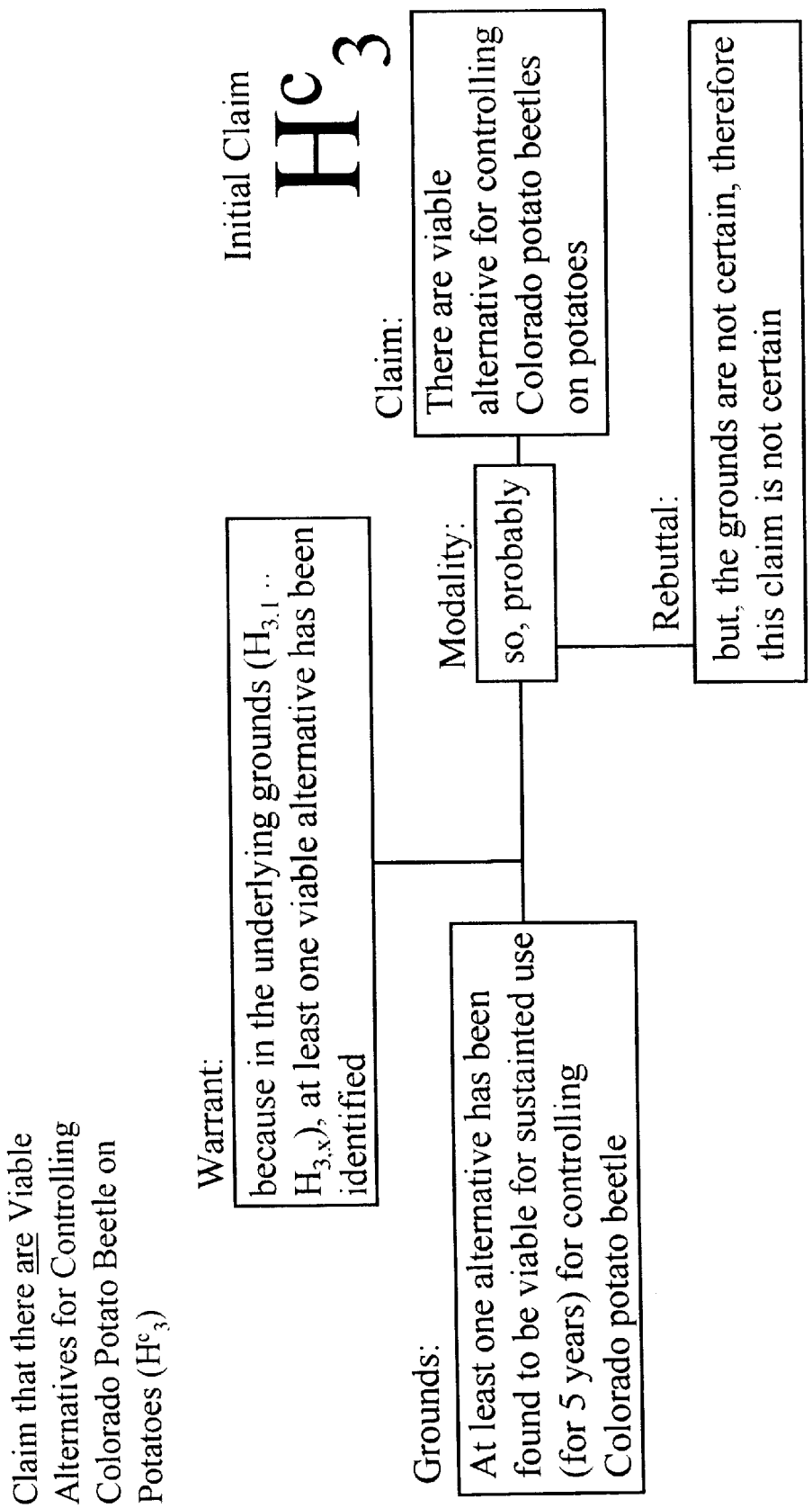
Figure 22:
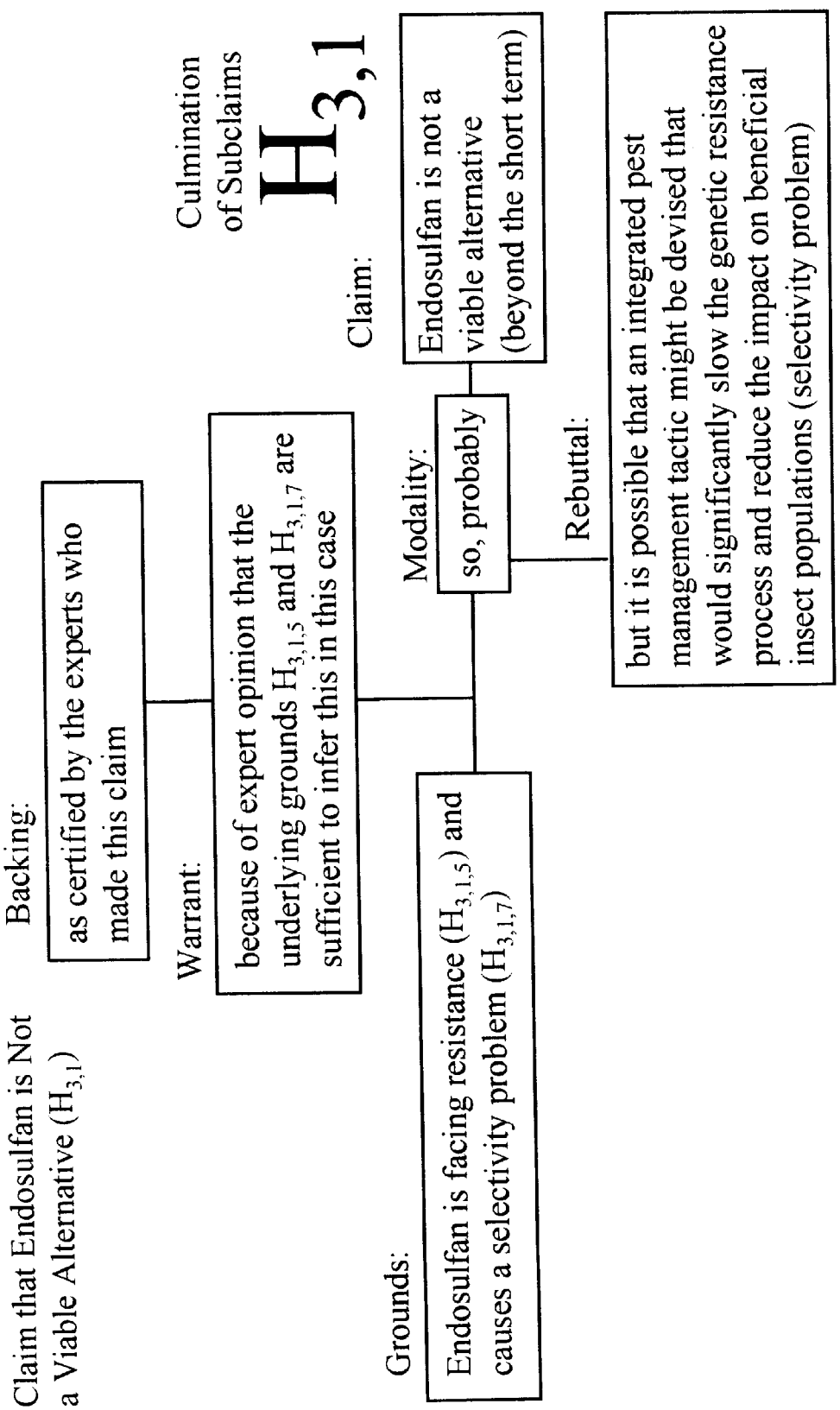
Figure 23:
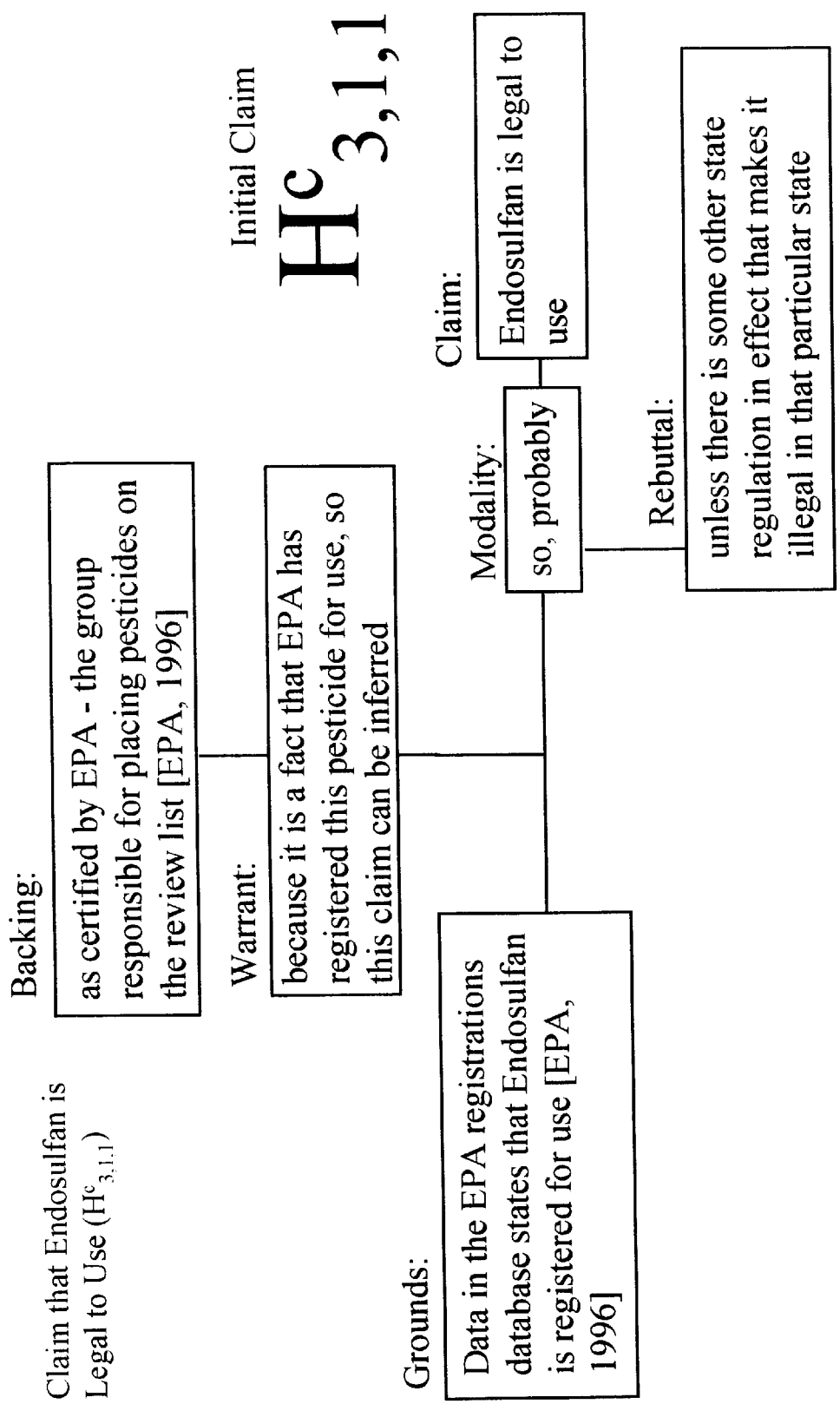

In some cases there are conflicting claims. FIGS. 20 and 21 illustrate the claim that no viable alternative exists ($H_3$), and counter-claim ($H^C_3$) that a viable alternative does exist. To support either claim we need to assess other plausible pesticides that can legally be applied to potatoes to control Colorado potato beetle to determine if at least one other pest control tactic is a viable alternative now and over the next few years. FIG. 22 shows the counter-claim that "Endosulfan is not a viable alternative" ($H^C_{3,1}$). As stated, viability is based on the general rule used by policy decision makers that Endosulfan is not viable if it is illegal to use ($H_{3,1,1}$) or unsafe ($H_{3,1,2}$) or ineffective ($H_{3,1,3}$) or uneconomical ($H_{3,1,4}$) or facing resistance ($H_{3,1,5}$) or not marketable ($H_{3,1,6}$) or causes a selectivity problem ($H_{3,1,7}$). Again, this general rule is applied on a case-by-case basis, i.e., whether or not one or more of these grounds is sufficient to make the claim ($H_{3,1}$) is dependent largely on additional factors the claimant must consider, such as the degree and time-frame of genetic resistance ($H_{3,1,5}$). It is important to note that each warrant is stated by the claimant based on these grounds he/she is bringing to bear on the claim. In the test case the experts and policy decision makers generally agreed on the general sufficiency of these grounds based on expert opinion of what is sufficient.

Toulmin structure as used here is a way to record summaries of what is brought to bear on a claim (grounds),
what gives license to make the claim (warrant), and
how it is certified (backing) by the those stating the claim.

Figure 24:
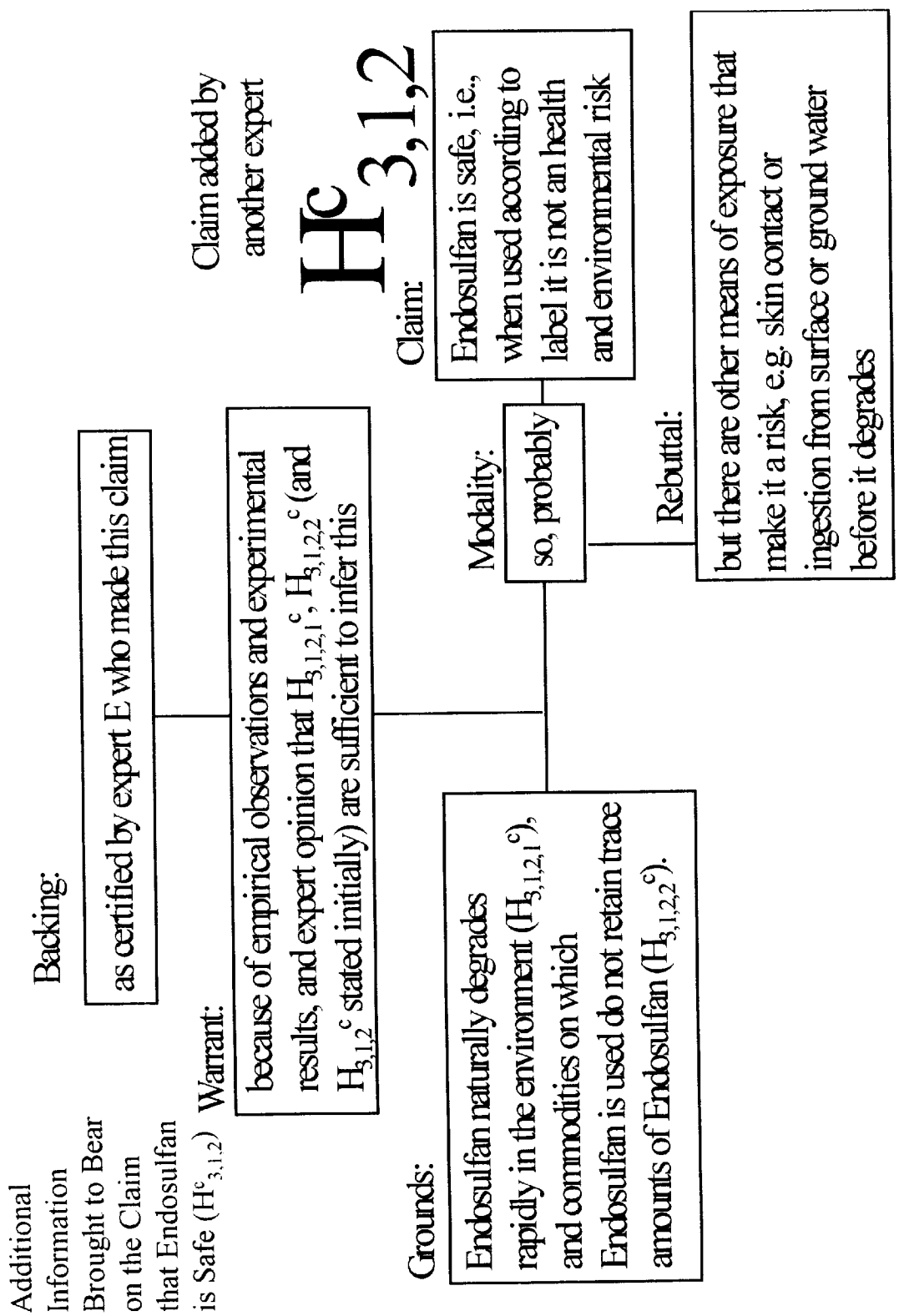
Figure 25:
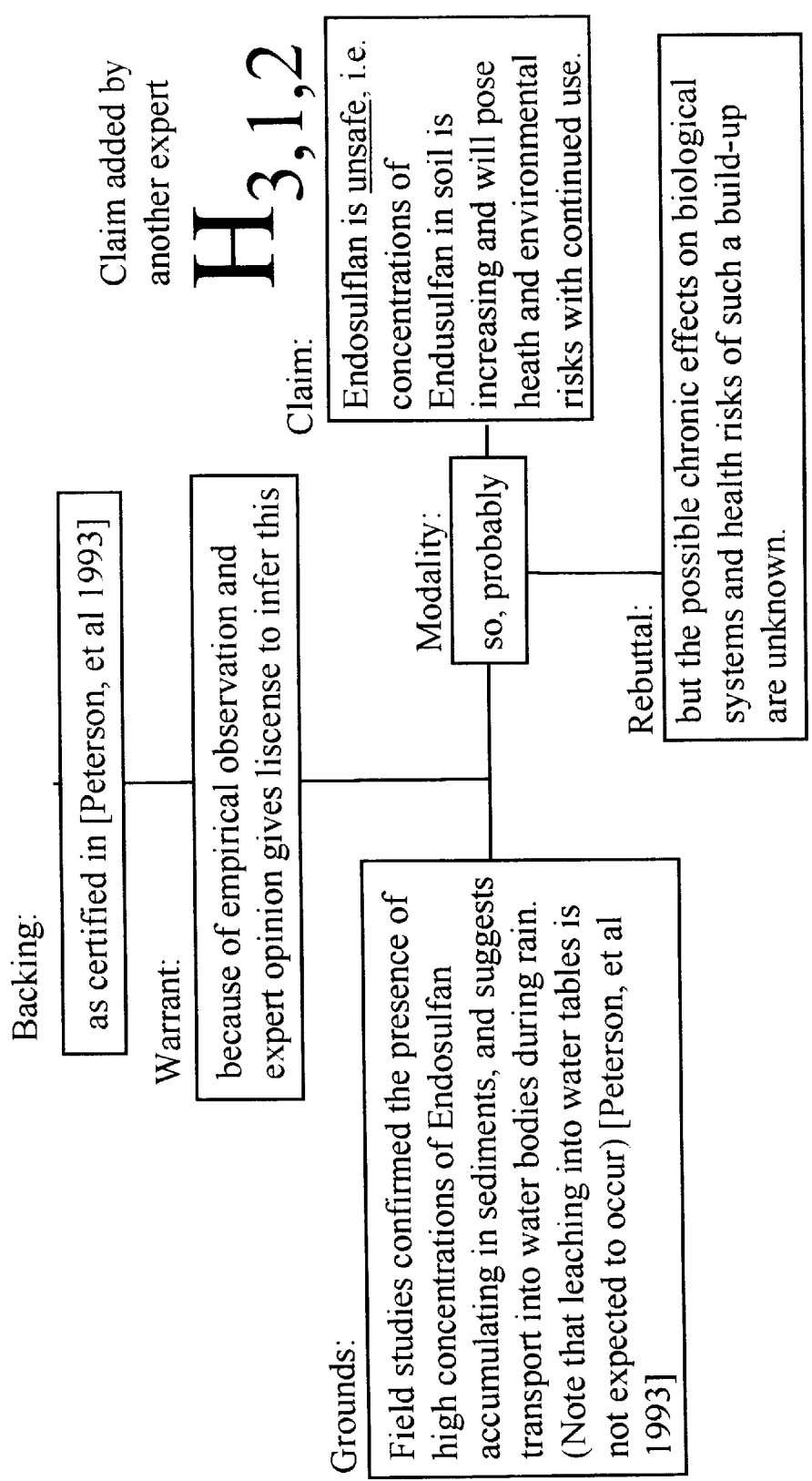
Figure 27:
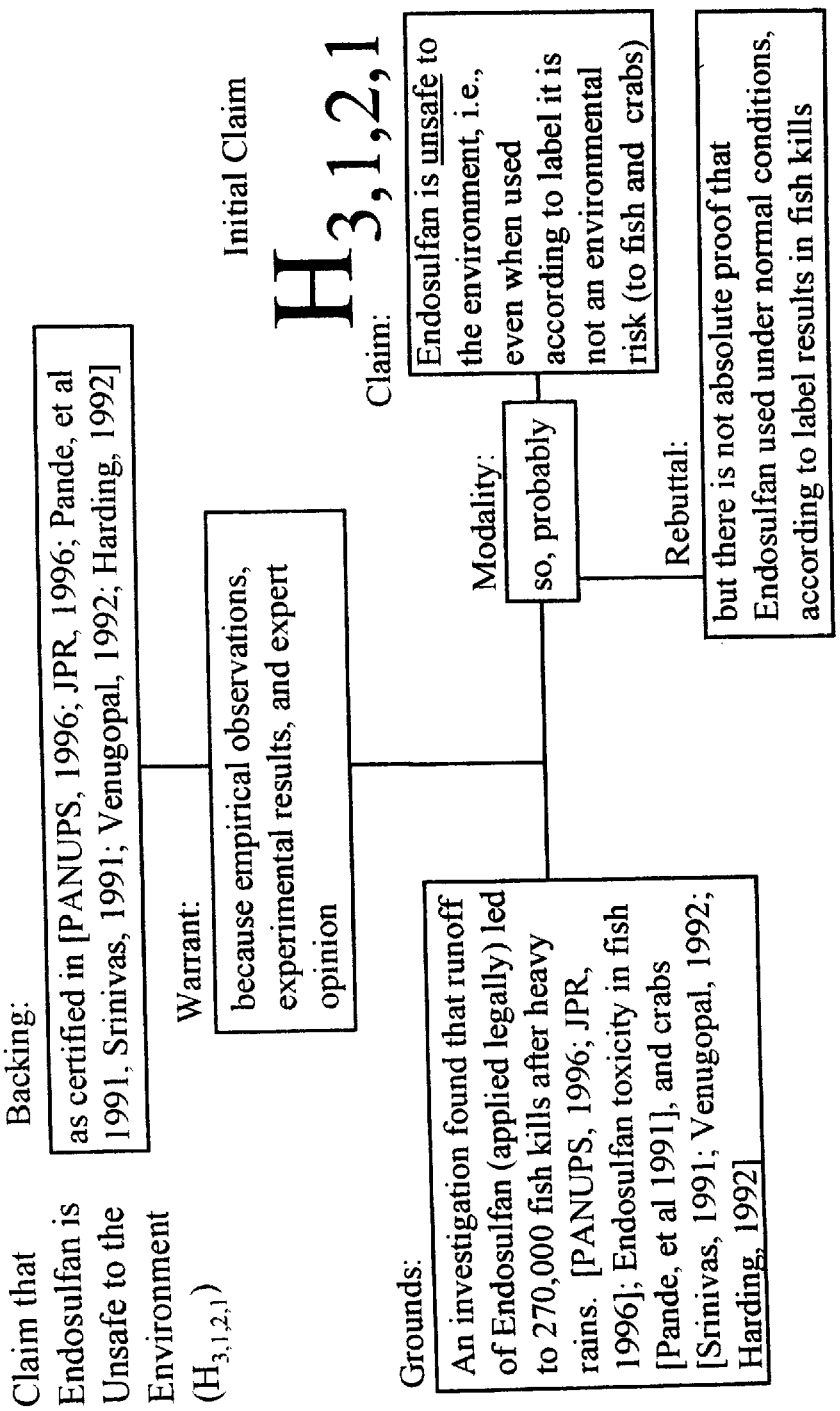
Figure 28:
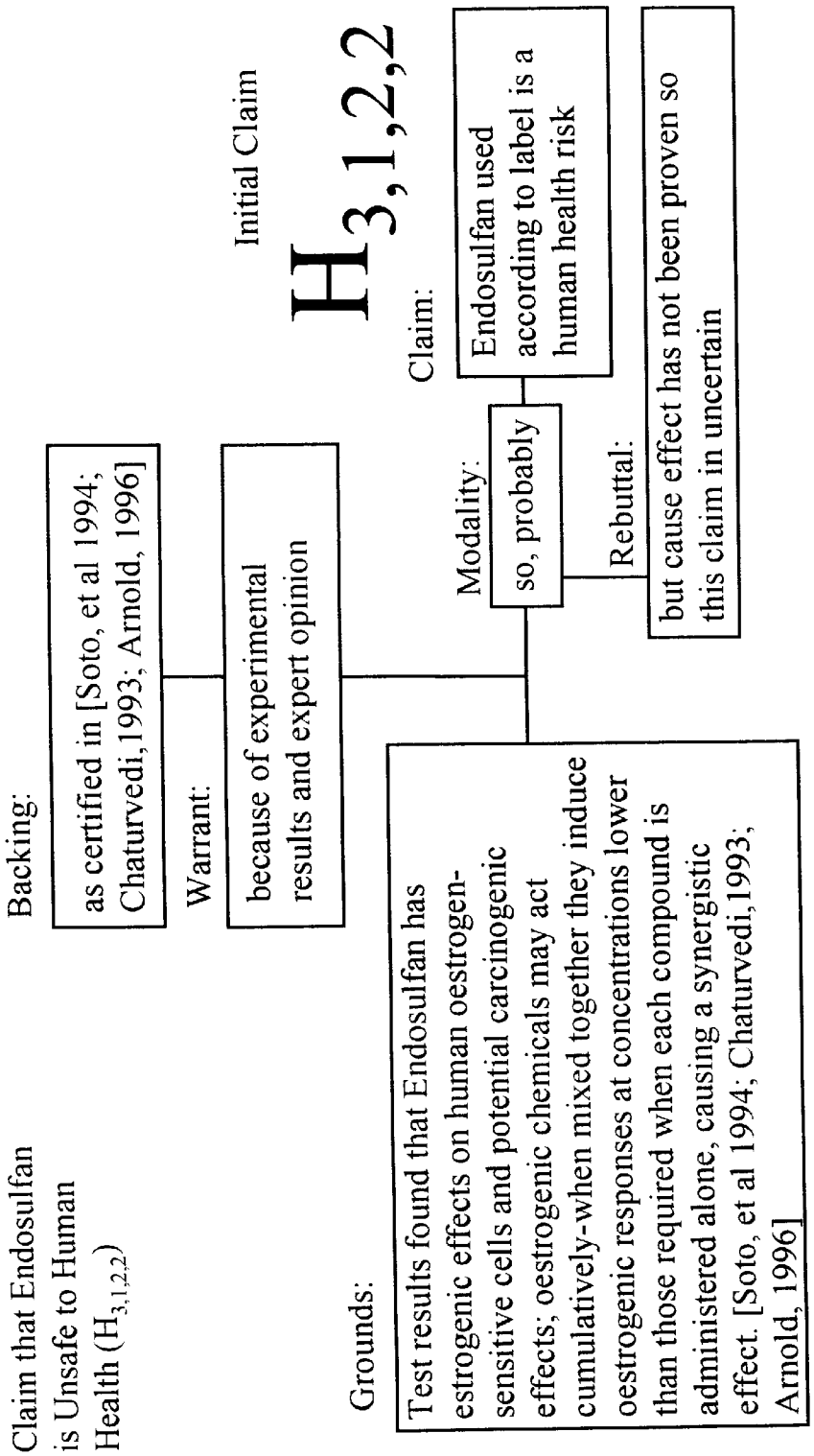
Figure 29:
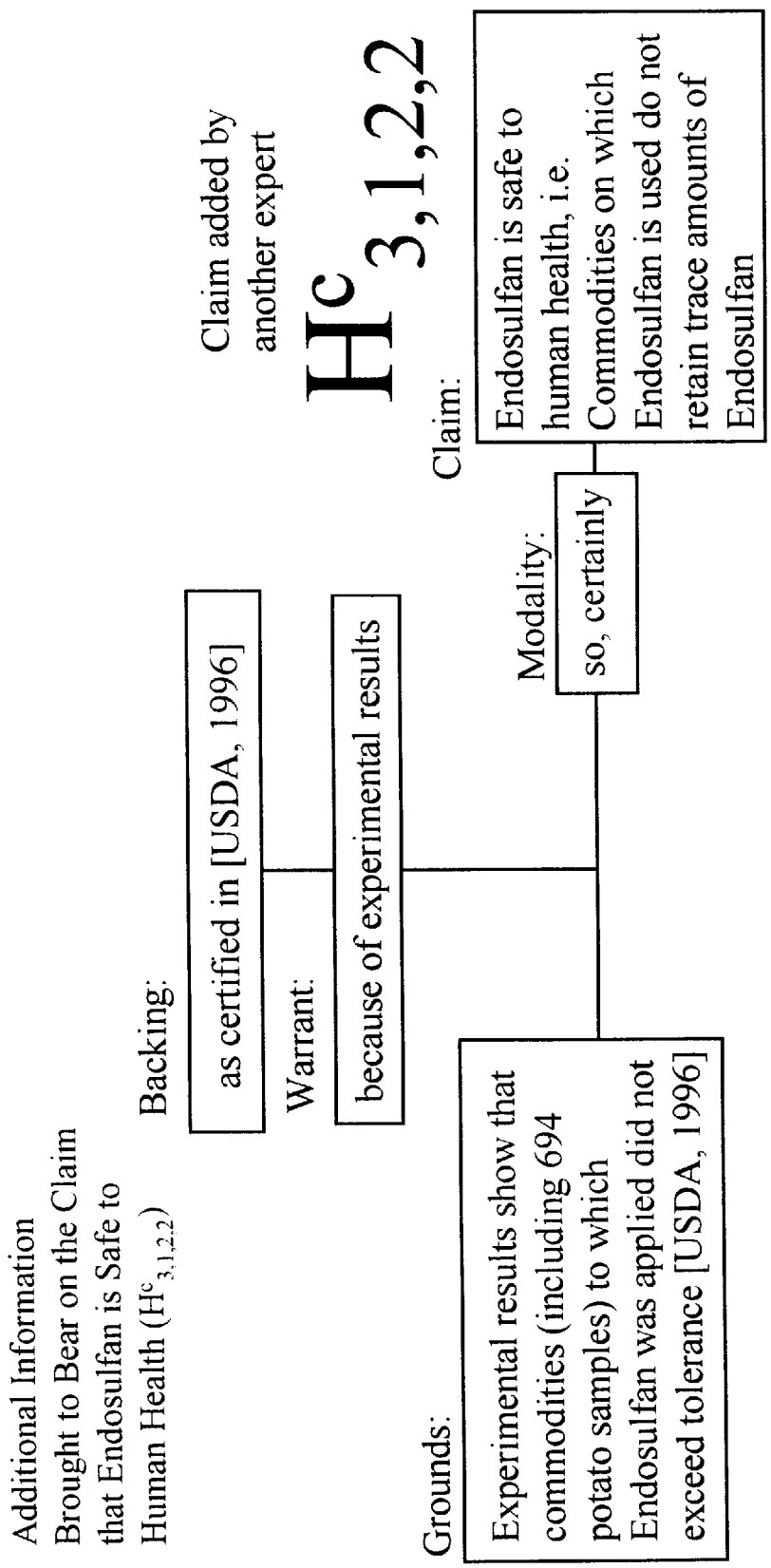
Figure 31:
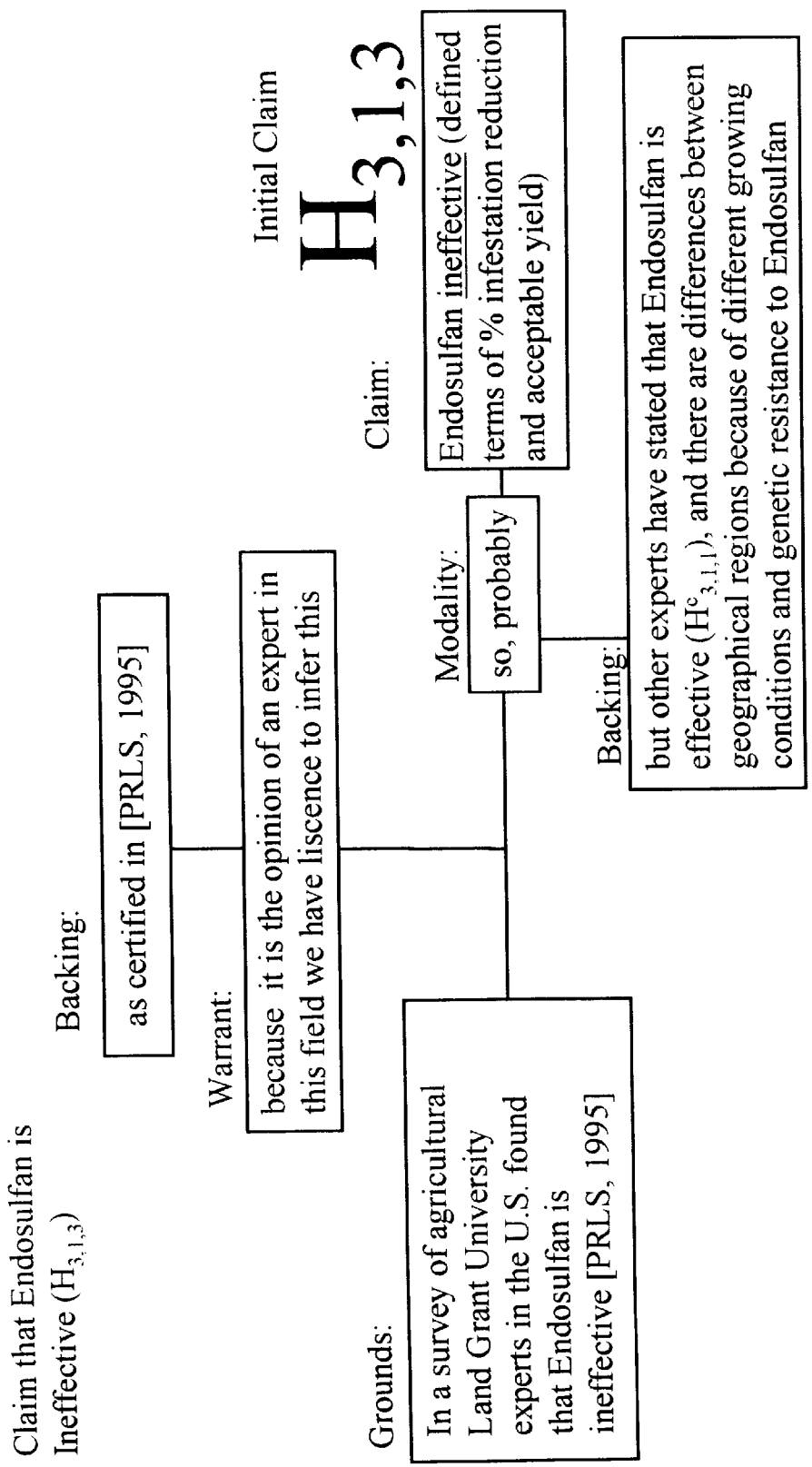
Figure 32:
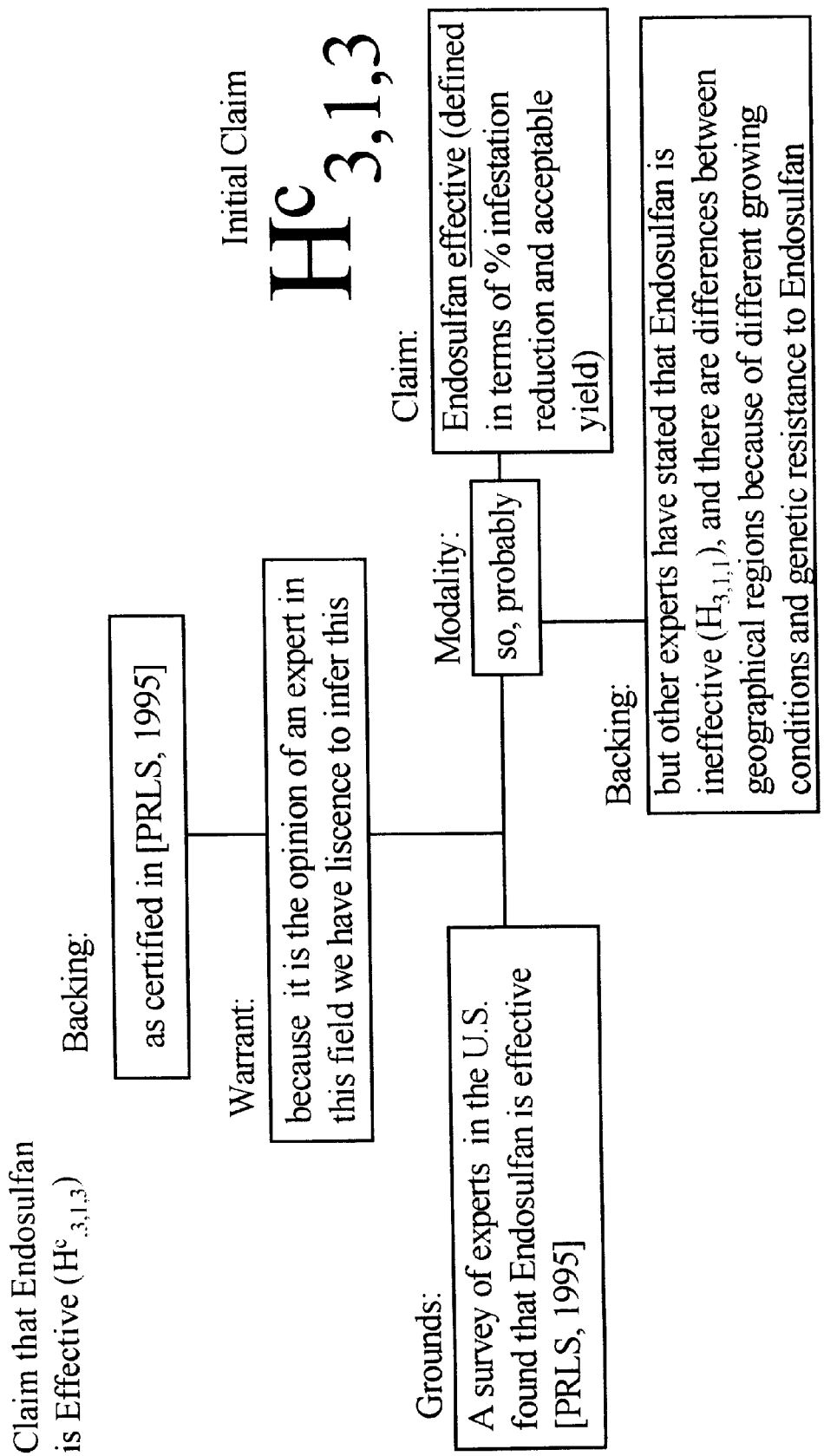
Figure 33:
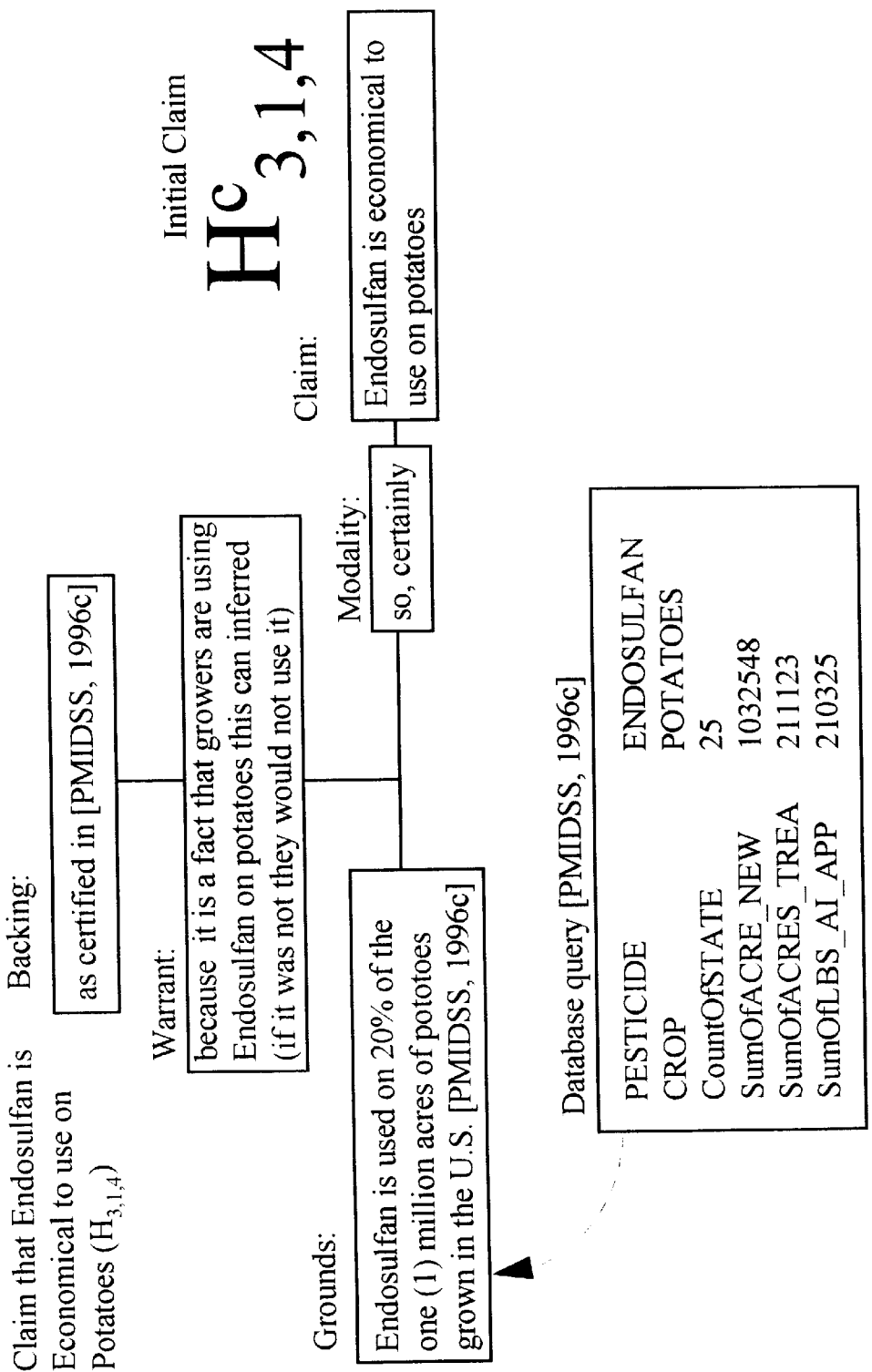
Figure 34:
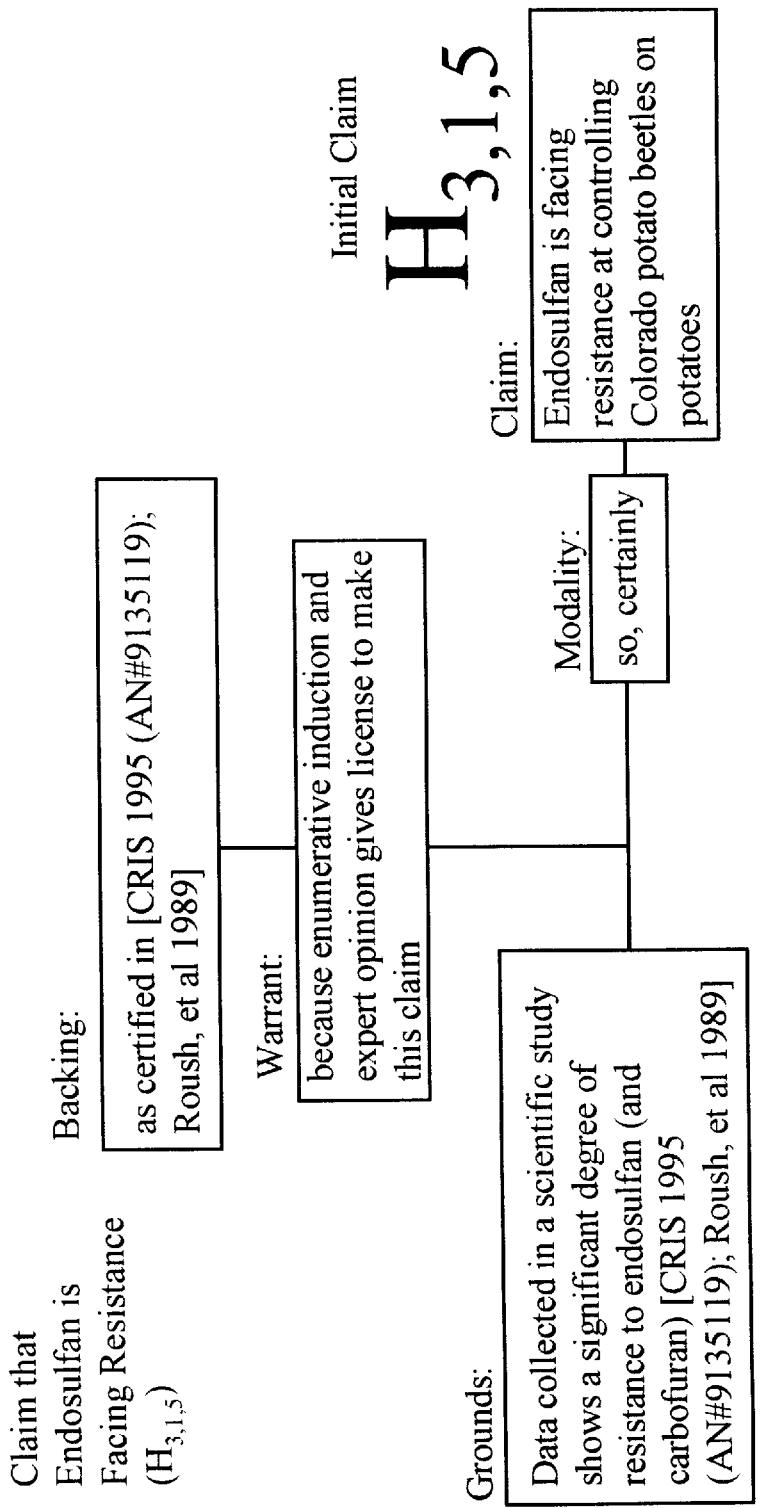
Figure 35:
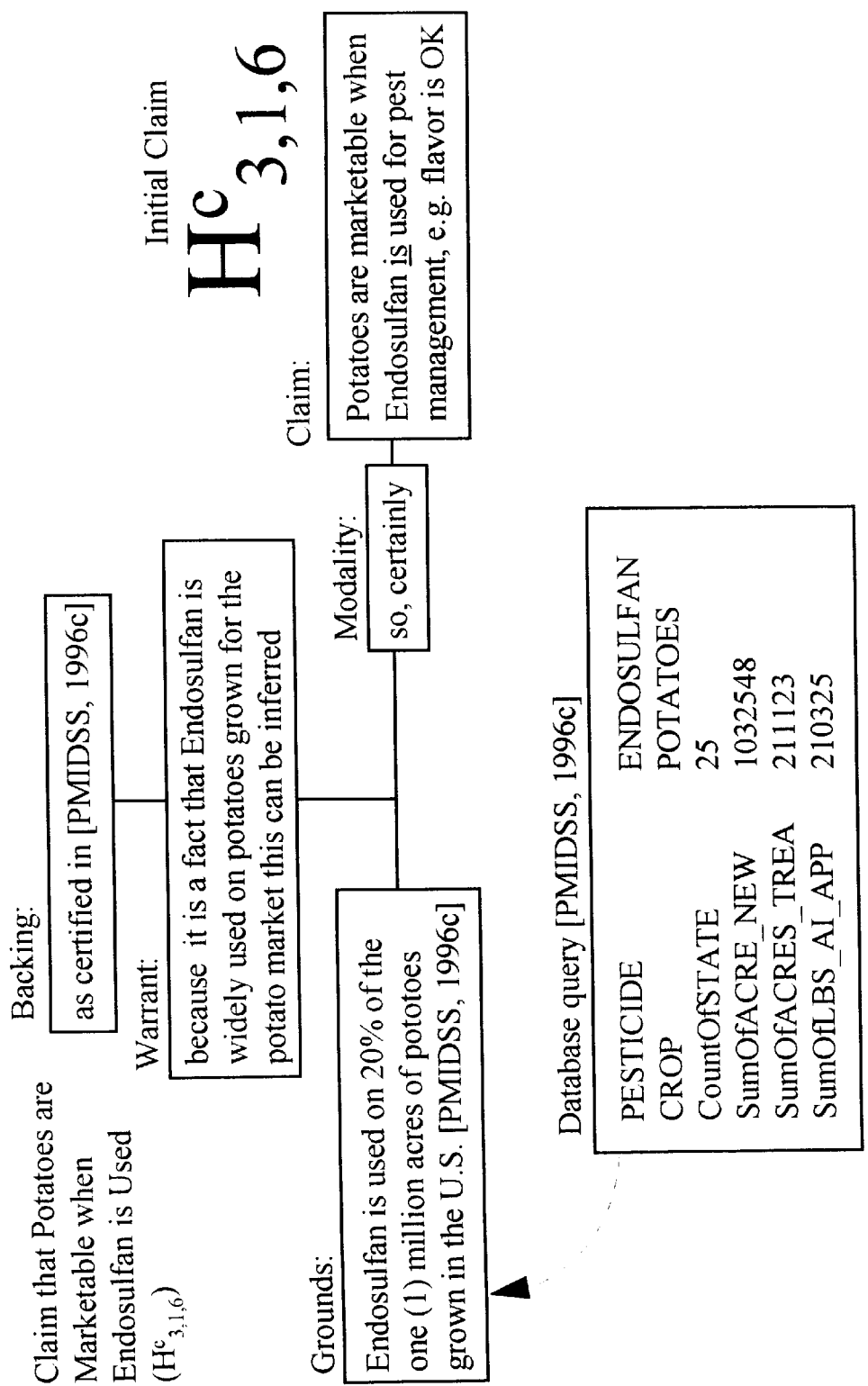
Figure 36:
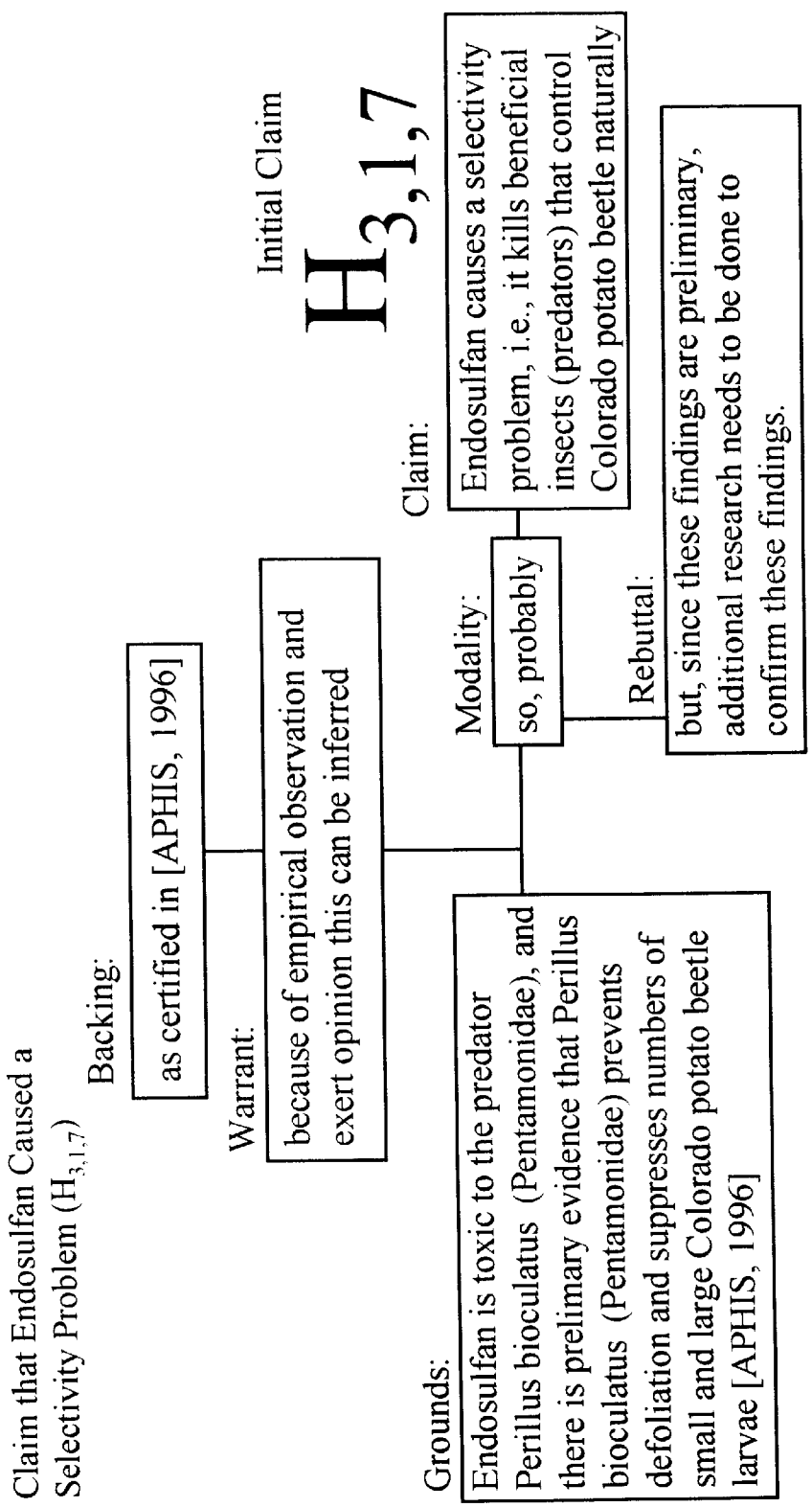

The Toulmin structures corresponding to the claims of viability of the alternatives in this example are shown in FIGS. 23 through 36. Note that a claim may be based on grounds provided by more than one expert, which is referred to here as a culmination of subclaims as seen in FIG. 24, and that two or more experts may make the same claim and bring different information to bear on that claim, as apparent by the additional evidence (grounds) brought to bear in FIG. 25.

Figure 37:
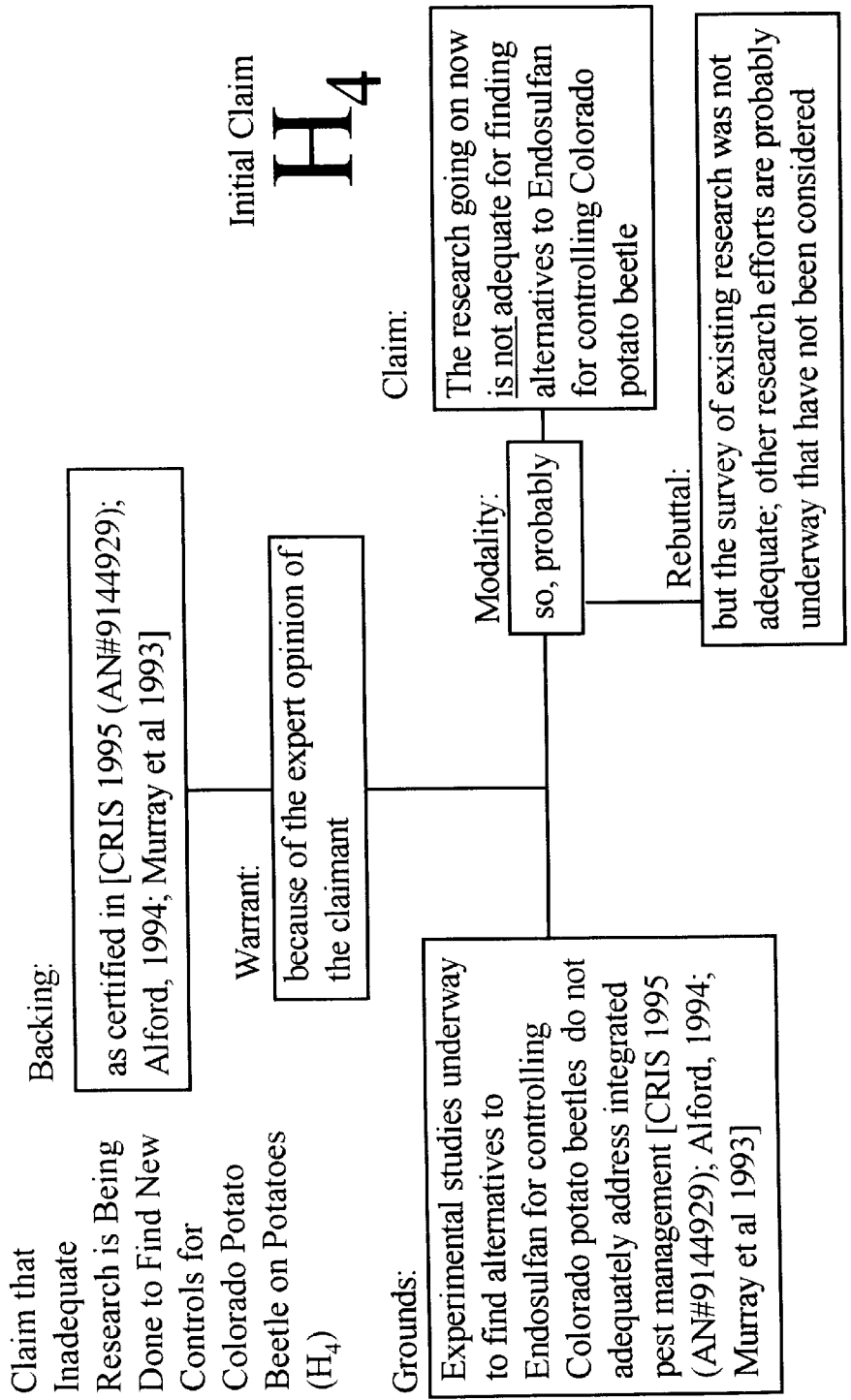
Figure 38:
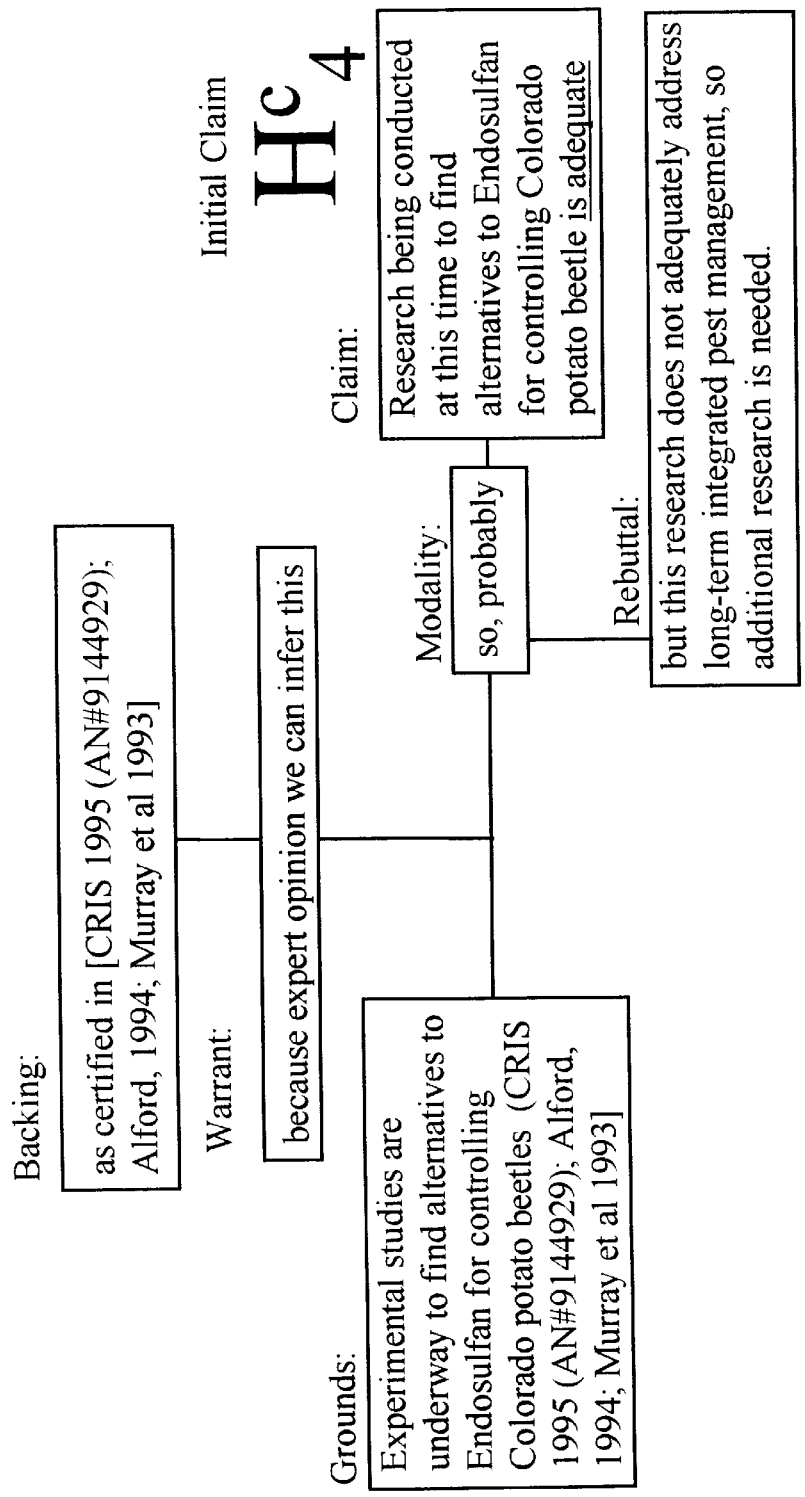

The final arguments for the primary science assessment question are shown in FIGS. 37 and 38: research for finding an alternative is inadequate ($H_4$), and the counter-claim that it is adequate ($H^C_4$).

Figure 39:
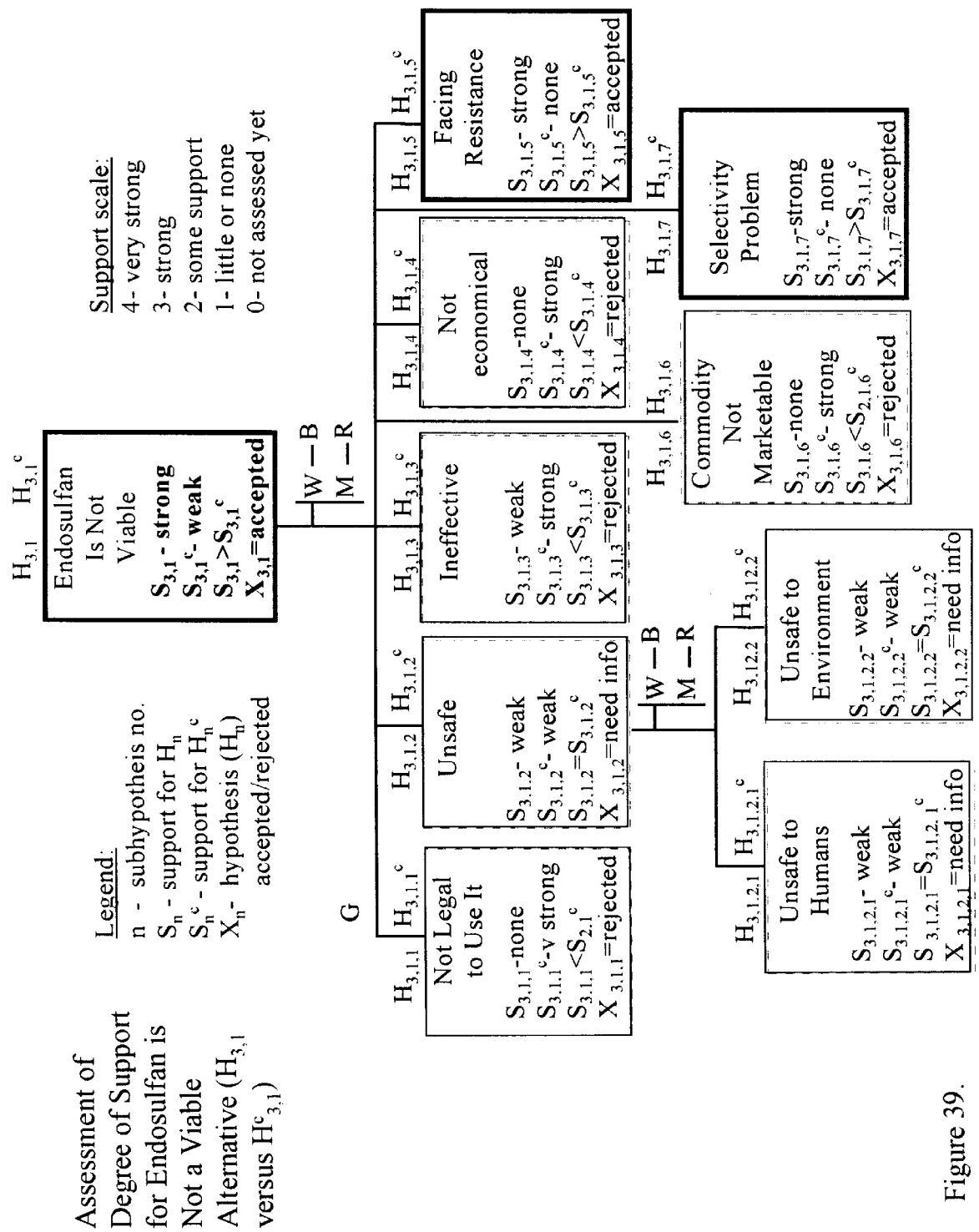

Now consider the degree of support for each individual hypothesis and sub-hypothesis at the bottom of the hierarchy in FIG. 39. The policy decision makers and experts used a crude technique for assessment of degree of support, and three simple rules for accepting or rejecting hypotheses based on those estimates: if the support for the hypothesis (S) is greater than the degree of support for the counter-hypothesis ($S^C$) it is accepted; if the support for the counter-hypothesis ($S^C$) is greater than the degree of support for the hypothesis (S) it is rejected ; if the support for the hypothesis (S) is the same as the degree of support for the counter-hypothesis ($S^C$) it is concluded that more information in needed before the hypothesis can be accepted or rejected.

FIG. 39 shows the assessment of support (S) and the status of each sub-hypothesis (X) for the hypothesis that Endosulfan is not viable ($H_{3,1}$). In this example all hypotheses were either rejected or inconclusive except two, i.e. Endosulfan is facing resistance ($H_{3,1,5}$) and Endosulfan causes a selectivity problem ($H_{3,1,7}$). By the domain dependent rule (warrant), the hypothesis that Endosulfan is not viable is accepted ($H_{3,1}$). The same steps shown here are done for all other alternatives and for $H_1$, $H_2$, $H_3$, and $H_4$. After all sub-hypotheses are considered, the top level H is either accepted or rejected using the field depend rules (warrants) stated above, or left pending if more information is needed before a decision can be made.

Population of Test Software

Initial claims and counter-claims were collected from experts via an electronic pre-test survey sent out by USDA to 52 specialists in Land Grant Universities in the 50 U.S. states and Guam and Puerto Rico. The specialists were asked to confer as necessary with other experts in the various academic disciplines for collecting claims, counter-claims and rebuttals concerning the decision factors described above. Of these, 19 responded with claims and counter-claims, for 17 types of claims, covering 103 pest management tactics, used on 129 crop/pest combinations in 19 states and territories, totaling 404 claims. These claims, rebuttals and counter-claims were all relative to alternatives to pesticides being reviewed by EPA, as described above. All claims, counter-claims and rebuttals were directly entered by the specialist, returned electronically, and included in the TBL Test prototype for evaluation of the Toulmin structure approach.

The initial set of claims and counterclaims collected in the pre-test software, together with the test questions, were loaded into the TBL Test software and distributed to the test subjects.

The Test

As described earlier, the primary group, composed of seven professionals all with doctors degrees, were actually part of the USDA/EPA science assessment team doing this science assessment in real-life. The secondary group, composed of three professionals working in areas related but outside of pest management science and policy decision making.

The test was conducted as follows. Each test subject was given the TBL Test software and an instruction booklet with instructions to read it. The instructions booklet included a tutorial that gave a cookbook style step-by-step instructions on how use each feature of the TBL Test software, including help and explanation features built into the software. At the end of the tutorial the subject was instructed to use the TBL Test software until he/she was filly familiar with it.

In this test any number of claims could be made by experts; when the same claim was made by more than one expert the details of the claims could be displayed (in the prototype software) either individually or as a composite for ease of seeing the information together. The subjects were encouraged to use the system by making their own claims, rebuttals and counter-claims. Furthermore the subjects were told to enter the information in the right places in the structure, but no checks were made for poorly stated claims or incomplete information. The purpose of the test was to test the system prototype rather than collect perfect claims.

IV. Alternative Embodiments

The system described above for developing and using a hierarchical argument structure for decision-making is applicable to a wide array of science assessment and decision making situations, such as the policy debates involving science assessment of the health risks of acid rain, tobacco and breast implants, and decisions on drug approval and transportation safety.

An embodiment of the hierarchical argument structure a may be used in a distributed group decision support system (GDSS). Implementation of a hierarchical argument structure in GDSS could make it easier for experts and policy decision makers to use in conjunction with databases and models within a decision support system, facilitating the statement of claims based on the data and modeling results.

It is intended that the foregoing detailed description be regarded as illustrative rather than limiting and that it is understood that the following claims including all equivalents are intended to define the scope of the invention.

I claim:

1. A system for facilitating a decision-making process comprising:
   a first computer having the computer readable program code means embodied on the first computer readable medium comprising:
      a first program code means for linking of a plurality of argument structure units into single hierarchial argument structure, wherein each of said argument structure unit includes data corresponding to a hypothesis and its corresponding counter-hypothesis;
      a second computer program code means for accepting inputs from a plurality of contributors and augmenting said inputs into said single hierarchial argument structure, wherein each input comprises data corresponding to at least one argument structure unit and that supports at least one of said hypothesis and the corresponding counter-hypothesis thereof;
      a third computer program means responsive to said second computer program code means and adapted to represent a degree of support for said hypothesis and said corresponding counter-hypothesis in said single hierarchial argument structure; and
      a fourth computer readable program code means responsive to said third computer readable program code means and adapted to visually display said degree of support for and against each claim in said single hierarchy;
   a plurality of contributor input programming means each stored in a computer readable medium located on one of a plurality of computers remote from said first computer, wherein each of said contributor input programming means comprises:
      programming means for accepting contributor input data from one of the plurality of contributors, wherein each input comprises data corresponding to at least one argument structure unit that supports at least one of said hypothesis and the corresponding counter-hypothesis thereof,
      and wherein said contributor input data are provided to said second computer program code means for combining into said single hierarchial argument structure.

2. The invention of claim 1 wherein said plurality of argument structure units comprises:
   a top level argument structure unit; and
   a plurality of subordinate level argument structure units, wherein each one of said plurality of subordinate level argument structure units comprises at least a portion of the grounds of an argument structure unit to which said one of said plurality of subordinate level argument structure units is subordinate.

3. The invention of claim 1 wherein each one of said plurality of argument structure units comprises:
   data corresponding to a hypothesis and its corresponding counter-hypothesis;
   data corresponding to grounds that provide a basis for inference of one of the hypothesis and its corresponding counter-hypothesis;
   data corresponding to a warrant linking said grounds to one of said hypothesis and its corresponding counter-hypothesis;
   data corresponding to backing that certifies said warrant; and
   data corresponding to grounds that provide a basis for inference of one of the hypothesis and its corresponding counter-hypothesis.

4. The invention of claim 1 wherein said input further comprises:
   data indicating a geographical region of applicability of said hypothesis.

5. The invention of claim 1 wherein said input further comprises:
   an indication of efficacy associated with said hypothesis.

6. The invention of claim 1 wherein said input further comprises:
   a warrant associated with said hypothesis.

7. The invention of claim 6 wherein said warrant comprises at least one of:
   direct fact;
   experimental test;
   enumerative induction;
   expert judgment; and
   empirical observation.

8. The invention of claim 1 wherein said input further comprises:
   grounds for making an inference that said hypothesis is true.

9. The invention of claim 8 wherein said input further comprises:
   a backing reference for said grounds.

10. The invention of claim 9 wherein said input further comprises data including a full citation corresponding to said backing reference.

11. The invention of claim 1 wherein said input further comprises:
    data indicating a constraint associated with said contributor's input.

12. The invention of claim 1 wherein said input further comprises:
    a probability estimate associated with said contributor's input.

13. The invention of claim 12 wherein said probability estimate includes data corresponding to one of:
    certainty;
    probably correct;
    presumably correct; and
    low probability of correctness.

14. The invention of claim 1 wherein said input further comprises:
    a modality associated with said contributor's input.

15. The invention of claim 1 wherein said first computer readable program code means further comprises:

programming means responsive to said second computer program code means for presenting claims by others to each of said contributors.

16. The invention of claim 1 wherein said second computer program code means further comprises:

programming means adapted to receive said inputs over the Internet.

17. The invention of claim 1 wherein said contributor input programming means is downloadable at said plurality of workstations via the Internet.

18. The invention of claim 17 wherein said contributor input programming means is comprised of an executable applet embodied in a HTML page.

19. A method of facilitating a decision-making process involving objective science assessment, comprising the steps of:

determining a top level hypothesis;

using a software program code means embodied on a computer readable medium comprising:

a first program code means for linking of a plurality of argument structure units into single hierarchial argument structure, wherein each of said argument structure unit includes data corresponding to a hypothesis and its corresponding counter-hypothesis;

a second computer program code means for accepting inputs from a plurality of contributors and augmenting said inputs into said single hierarchial argument structure, wherein each input comprises data corresponding to at least one argument structure unit and that supports at least one of said hypothesis and the corresponding counter-hypothesis thereof;

a third computer program means responsive to said second computer program code means and adapted to represent a degree of support for said hypothesis and said corresponding counter-hypothesis in said single hierarchial argument structure; and a fourth computer readable program code means responsive to said third computer readable program code means and adapted to visually display said degree of support for and against each claim in said single hierarchy;

entering said top level hypothesis into a top level node established in said software program code means;

determining a plurality of sub-hypothesis that comprise grounds that logically warrant at least one of the top level hypothesis and another of the plurality of the sub-hypothesis;

using said software program code means, entering said plurality of sub-hypothesis into a respective plurality of subordinate nodes linked to said top level nodes;

using said software program code means, using scientific data that provides grounds supporting at least one of the top level hypothesis, its corresponding counter-hypothesis and another of the plurality of sub-hypothesis;

using said software program code means, represent a degree of support for said hypothesis and said corresponding counter-hypothesis based upon a combination of said scientific data.

20. The invention of claim 19 wherein said step of determining a top level hypothesis further comprises:

determining said top level hypothesis and its corresponding counter-hypothesis.

21. The invention of claim 20 wherein said step of determining a plurality of sub-hypotheses further comprises:

determining a corresponding null sub-hypothesis for each of said plurality of sub hypothesis.

* * * * *